(12) United States Patent
Yamamoto et al.

(10) Patent No.: US 7,066,490 B2
(45) Date of Patent: Jun. 27, 2006

(54) AIRBAG DEVICE

(75) Inventors: Tadashi Yamamoto, Aichi-ken (JP); Hitoshi Iida, Aichi-ken (JP); Hirohisa Yokoyama, Aichi-ken (JP); Tadashi Yamada, Aichi-ken (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 0 days.

(21) Appl. No.: 10/926,036

(22) Filed: Aug. 26, 2004

(65) Prior Publication Data

US 2005/0023809 A1 Feb. 3, 2005

Related U.S. Application Data

(62) Division of application No. 10/253,504, filed on Sep. 25, 2002, now Pat. No. 6,899,352.

(30) Foreign Application Priority Data

| Sep. 28, 2001 | (JP) | ............................. 2001-303127 |
| Feb. 6, 2002 | (JP) | ............................. 2002-30172 |
| Feb. 8, 2002 | (JP) | ............................. 2002-32182 |
| Feb. 8, 2002 | (JP) | ............................. 2002-32188 |

(51) Int. Cl.
*B60R 21/16* (2006.01)
*B60R 21/20* (2006.01)

(52) U.S. Cl. .................... 280/743.2; 280/731; 280/740

(58) Field of Classification Search ................ 280/731, 280/743.2, 743.1, 740, 729
See application file for complete search history.

(56) References Cited

U.S. PATENT DOCUMENTS 5,282,646 A 2/1994 Melvin et al.
5,494,314 A * 2/1996 Kriska et al. ................ 280/740
5,568,938 A 10/1996 Lindstrom
5,573,270 A 11/1996 Sogi et al.
5,678,858 A 10/1997 Nakayama et al.
5,848,805 A 12/1998 Sogi et al.
5,913,535 A * 6/1999 Taguchi et al. ............. 280/729
5,997,037 A 12/1999 Hill et al.
6,022,046 A 2/2000 Isomura et al.
6,089,599 A 7/2000 Schimmoller et al.

FOREIGN PATENT DOCUMENTS

| EP | 0 835 786 A1 | 4/1998 |
| JP | U-6-1007 | 1/1994 |
| JP | A-7-149199 | 6/1995 |
| JP | A-8-104196 | 4/1996 |
| JP | A-8-119052 | 5/1996 |
| JP | A-8-301037 | 11/1996 |
| JP | A-10-203280 | 8/1998 |
| JP | A-11-321506 | 11/1999 |
| WO | WO 97/36768 | 10/1997 |

\* cited by examiner

*Primary Examiner*—Ruth Ilan
(74) *Attorney, Agent, or Firm*—Posz Law Group, PLC

(57) ABSTRACT

An airbag device comprises a folded and housed airbag including: a vehicle front-facing wall portion having a gas inlet through which inflating gas can enter; and a passenger-facing wall portion directly opposite the gas inlet port. In the airbag, there is arranged a flow regulating cloth. This flow regulating cloth regulates the inflow of the inflating gas so that the unnecessary protrusion of the passenger-facing wall portion toward the passenger is prevented. Moreover, the flow regulating cloth breaks at a portion made to be easily torn, before the completion of inflation of the airbag. In other words, the airbag is released from the regulation of the inflow of the inflating gas before the completion of inflation.

9 Claims, 25 Drawing Sheets

Fig.17  A.
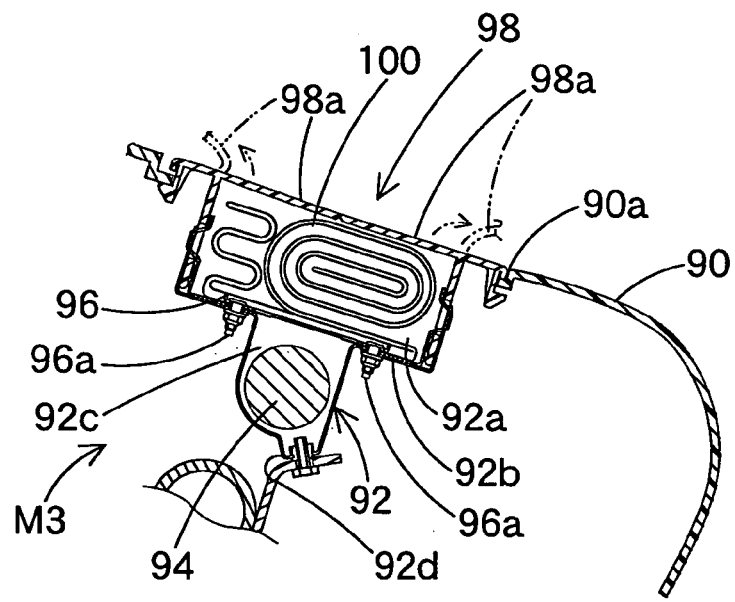
Fig.17  B.
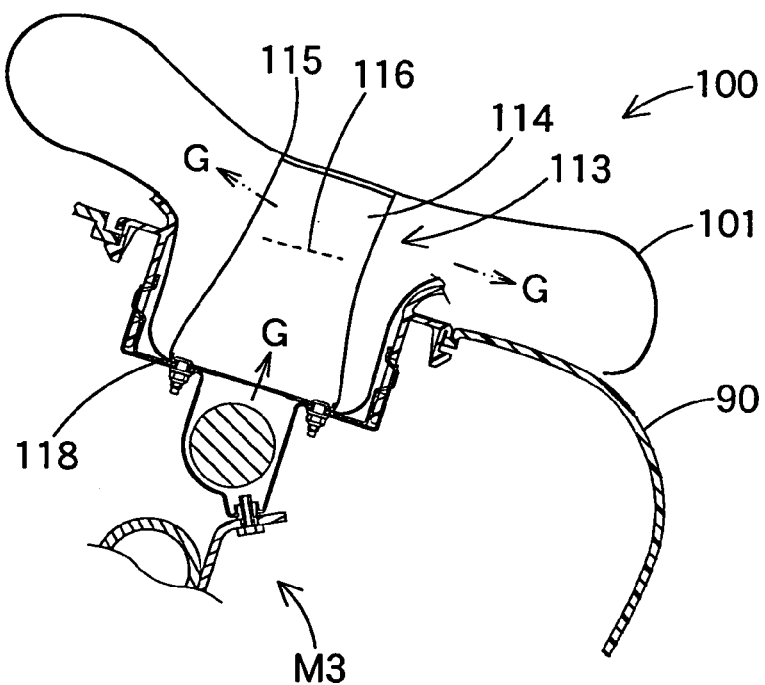

AIRBAG DEVICE

CROSS REFERENCES TO RELATED APPLICATIONS

This application is a divisional application of U.S. application Ser. No. 10/253,504, which was filed on Sept. 25, 2002 now U.S. Pat. No. 6,899,352. The present application claims priority to the Japanese patent application of Yamamoto et al., filed Sept. 28, 2001, No.2001-303127, the Japanese patent application of Yamamoto et al., filed Feb. 6, 2002, No.2002-30172, the Japanese patent application of Yamamoto et al., filed Feb. 8, 2002, No.2002-32182, and the Japanese patent application of Iida et al., filed Feb. 8, 2002, No.2002-32188, the entirely of each is hereby incorporated herein by reference.

BACKGROUND OF THE INVENTION

1. Field of the Invention

The present invention relates to an airbag device, which comprises an airbag to be folded and housed and an inflator for feeding an inflating gas into the airbag.

2. Description of Related Art

In the prior art, the airbag device of this kind is known, as disclosed in Unexamined Published Japanese Patent Application No. 149199/1995. The airbag device disclosed is used in the steering wheel of a vehicle.

The airbag of this airbag device is provided with two circular wall portions, i.e., a side facing the engine (facing the steering wheel) and a wall portion facing the passenger (or the driver). Moreover, the airbag is formed by sewing the circumference of the vehicle front-facing wall portion and of the passenger-facing wall portion to each other. In the vehicle front-facing wall portion, on the other hand, there is opened a gas inlet port for admitting an inflating gas from an inflator. In the vehicle front-facing wall portion, moreover, there is arranged a flow regulating cloth for clogging the gas inlet port. This flow regulating cloth regulates the flow of the inflating gas flowing from the gas inlet port to limit the protruding motion of the passenger-facing wall portion of the airbag to the passenger (or the driver) passenger-facing wall portion. This airbag can expand widely while inflating in the flow direction of the inflating gas so that it is difficult for it to apply an unnecessary pushing force to the approaching passenger.

In the airbag thus constructed, however, the flow of the inflating gas is regulated from the beginning to the completion of inflation by the flow regulating cloth. In other words, the flow of the inflating gas is regulated until just before the completion of inflation by the flow regulating cloth. In the airbag device having the aforementioned construction, therefore, there is room for improvement in shortening the time period from the beginning to the completion of inflation of the airbag. This is because it is desired that the inflating gas flow freely from the gas inlet port into the airbag without being regulated in its flow in the time period before the completion of inflation of the airbag as to shorten the time required for the airbag to completely inflate.

On the other hand, an airbag device for a steering wheel, having an airbag arranged the flow regulating cloth therein, is exemplified by International Laid-Open No. WO97/36768. In the airbag device of this laid-open application, the airbag is so folded at two stages and housed in the steering wheel so that the vehicle front-facing wall portion and the driver-facing wall portion are folded flat so that their edges come toward the gas inlet port.

In the airbag device of the above-specified laid-open application, the flow regulating cloth in the airbag regulates the inflow of the inflating gas into the airbag body to go in two directions, i.e., to the front and to the back. In the folding of the airbag, at the first stage, the left and right side portions of the airbag are folded to approach the gas inlet port so that the two folds line up with each other on the left and right. At the second stage, the respective portions of the edges of the two folded portions of the first stage projecting forward and located at the rear are folded so as to also bring these folded portions closer to the gas inlet port. In short, at the second stage, the two new folded portions line up with each other at the forward and rear.

When the inflating gas flows into the airbag body, moreover, the airbag is expanded and inflated to complete the inflation while opening the folds of the second stage and the first stage.

If the portion of the driver-facing wall portion directly opposite the gas inlet port is raised at the beginning of inflation of the airbag by the inflating gas, however, the airbag device thus constructed is expanded to unfold at the two folded portions of the second stage. Simultaneously with this, moreover, the two folded portions of the first stage are also unfolded to separate from each other. This is because the portions of the airbag on the right and left sides are folded at the first stage so as to form two folded portions lined up with each other on the right and left. Moreover, the unfolding of the two folded portions of the first stage is the expansion to the left and right, thereby to obstruct the flow regulating effect of the flow regulating member. Specifically, the airbag device of the aforementioned construction has room for improvement in that its effect to regulate the flow of the inflating gas by the flow regulating cloth arranged in the airbag body, allowing the airbag to expand widely and quickly in the regulating direction of the inflating gas.

In the airbag device, on the other hand, it is has been proposed that a construction made by inflating an auxiliary inflation portion arranged in the airbag at the beginning of inflation in low temperatures would provide protection for the passenger.

One known airbag device of this kind is Unexamined Published Japanese Patent Application No. 8-119052. The disclosed airbag device is used in the steering wheel of a vehicle.

In the airbag of this airbag device, the vehicle front-facing wall portion and the passenger-facing wall portion are sewn to each other with a rupturable sewing thread so as to surround the gas inlet port spaced away from the outer edge of the wall portions. In the portion surrounded by this sewing location, moreover, there is arranged the auxiliary inflation portion communicating with the gas inlet port.

In this airbag, even at a low temperature where the inflating gas which enters is of a small volume, the passenger (or the driver) to interfere at the beginning of inflation at the low temperature can be protected at the beginning of inflation by the auxiliary inflation portion. This is because inflating gas is made to flow into the auxiliary inflation portion with a smaller capacity than that of the airbag body, raising the internal pressure and so completing the inflation.

In the airbag of the aforementioned Patent Application, however, the sewn junction of the vehicle front-facing wall portion and the passenger-facing wall portion formed on the outer edge of the auxiliary inflation portion is ruptured when the inflation of the airbag itself is completed to enlarge the capacity for a cushioning action. As a result, it is difficult to maintain the airbag at a predetermined internal pressure and to complete the inflation. This is because the holes passed by the sewing thread in the vehicle front-facing wall portion and the passenger-facing wall portion may be enlarged and leak the inflating gas when the sewing thread of the sewn portions is ruptured. Especially at low temperature, the aforementioned problems are serious because it is difficult to maintain the internal pressure by the inflating gas can.

Therefore, the airbag of the Patent Application is provided at the sewn portion with measures for applying a sealing material so that the gas may not leak from the sewn portion. Thus, the airbag production has an increased number of steps of which raises the cost.

On the other hand, the airbag device of this kind is desired to expand and inflate the airbag by regulating the inflow of the inflating gas so as to suppress the unnecessary protrusion to the passenger.

Therefore, there is known an airbag device having a construction, as disclosed in Unexamined Published Japanese Patent Application No. 104196/1996. In this airbag device, a flow regulating cloth for closing the gas inlet port is arranged at the vehicle front-facing wall portion in the airbag. This flow regulating cloth regulates the inflow of the inflating gas from the gas inlet port thereby to suppress the protrusion of the passenger-facing wall portion in the airbag toward the passenger. Moreover, the flow regulating cloth is so sewn near its center that it can be separated from the passenger-facing wall portion.

In this airbag, from the beginning to a point midway in inflation, the protrusion of the portion of the passenger-facing wall portion directly opposite the gas inlet port is prevented from extending to the passenger by the joining of the flow regulating cloth to the passenger-facing wall portion. Moreover, the airbag is enabled to extend its width through the flow of the inflating gas in the directions as guided by the flow regulating cloth, and then the junction of the flow regulating cloth to the passenger-facing wall portion is released, thereby completing the inflation.

In the airbag of the aforementioned Patent Application, however, there remains room left for improvement, because the unnecessary protrusion of the passenger-facing wall portion to the driver (or the passenger) cannot be avoided after the junction of the flow regulating cloth to the passenger-facing wall portion is released. This is because the airbag of the Patent Application is not provided with a regulating member for regulating the shape at the completion of inflation.

In case the airbag device of this kind is arranged in the steering wheel, moreover, it is desired that the abdomen of the driver be properly protected when the airbag is expanded and inflated.

Therefore, there is known an airbag device having a construction, as disclosed in Unexamined Published Japanese Utility Model Application No. 1007/1994. In this airbag device, tethers for regulating the shape of an airbag at the completion of inflation are arranged in the airbag. However, the airbag is inflated into an expanded shape that protrudes away from the engine toward the abdomen of the driver at the completion of inflation.

In the airbag device of the aforementioned Utility Model Application, however, the airbag that has completed its inflation protrudes away from the engine toward the abdomen of the driver but at the beginning of inflation of the airbag there is no control of its shape. Usually in the airbag device of this kind, in order to protect the driver properly, it is necessary to expand the airbag to quickly provide a thick cushion immediately after the beginning of inflation of the airbag between the rear-most (lower) portion of the steering wheel and the abdomen of the driver. This is because the steering wheel is positioned in proximity to the driver when the inflator acts.

SUMMARY OF THE INVENTION

A first object of the invention is to provide an airbag device which can suppress the protrusion of an airbag to a passenger at the beginning of inflation and can shorten the time period from the beginning to the completion of inflation of the airbag.

On the other hand, a second object of the invention is to provide an airbag device for a steering wheel, which has enhanced flow regulating effect of the inflating gas by a flow regulating member arranged in the airbag body so that can its airbag can widely and quickly be expanded by the inflating gas in the regulating direction, at the beginning of inflation of the airbag.

Moreover, a third object of the invention is to provide an airbag device provided with an airbag, which can be manufactured with a smaller number of steps of and at a lower cost while preventing unnecessary gas leakage from the airbag, even when an auxiliary inflation portion capable of protecting the passenger at a low temperature is arranged in the airbag.

Still further, a fourth object of the invention is to provide an airbag device which can protect the passenger properly with an airbag by suppressing the unnecessary protrusion of the airbag to the passenger from the beginning to the completion of inflation.

Furthermore, an object of the invention is to provide an airbag device for a steering wheel which can inflate a predetermined portion around the gas inlet port of an airbag quickly to provide a thick cushion immediately after the beginning of inflation to protect the driver properly.

The first object of the invention can be achieved by an airbag device comprising a folded and housed airbag including a vehicle front-facing wall portion and a passenger-facing wall portion, wherein the vehicle front-facing wall portion includes a gas inlet port for allowing the entry flow of an inflating gas, wherein the passenger-facing wall portion is arranged to directly face the gas inlet port, wherein during inflation of the airbag the inflow of the inflating gas is regulated so that expansion of the passenger-facing wall portion is prevented from unnecessarily protruding toward a passenger, and wherein this regulation of the flow of the inflating gas into the airbag is released before the completion of inflation.

When this airbag device is activated, the folded and housed airbag is expanded by inflation with a gas whose inflow is regulated. Moreover, the regulation of the flow of the inflating gas into the airbag is released before the completion of inflation of the airbag.

In other words, in the flow of the inflating gas into the airbag is regulated from the beginning to a point midway in its inflation. Therefore, the airbag increases in width as it inflates due to the flow direction of the inflating gas so that unnecessary protrusion of the passenger-facing wall portion directly opposite the gas inlet port formed in the vehicle front-facing wall portion toward the passenger is prevented. Here, it is desired that at this time the regulated direction of the flow of the inflating gas not force the passenger-facing wall portion away from the gas inlet port but to go parallel to surface of the portion of the passenger-facing wall portion directly opposite the gas inlet port.

Before the completion of inflation of the airbag, moreover, the inflating gas is released from its flow regulation and flows freely into the airbag so that at the final stage, rapid inflation is promoted. Therefore, the time period from the beginning to the completion of inflation can be shortened.

In the airbag device thus constructed, therefore, it is possible to suppress the protrusion of the airbag toward the passenger at the beginning of inflation, and to shorten the time period from the beginning to the completion of inflation of the airbag.

In the airbag device of the aforementioned construction, on the other hand, it is preferable that the airbag has such tethers arranged as to regulate the distance from the gas inlet port to the passenger-facing wall portion at the completion of inflation.

With this construction of the airbag device, the airbag is prevented from unnecessarily protruding toward the passenger by the tethers even at the completion of inflation.

In the airbag device thus constructed, moreover, it is preferable that the airbag is preferably constructed for the steering wheel of a vehicle, and that in a vehicle mounted state, the inflating gas is regulated to flow toward the right and left of the vehicle and in a direction along the ring portion of the steering wheel.

In the airbag device thus constructed, the airbag is inflated from the beginning so as to extend to the forward and rearward projecting sections of the ring portion of a steering wheel while being prevented from protruding toward the passenger. In other words, a portion of the airbag can be arranged from the beginning of inflation on the rearward projecting section of the ring portion of the steering wheel. Even if the driver is close to the ring portion, therefore, the portion of the airbag can be easily brought into the narrow clearance between the abdomen of the driver and the rearward projecting section of the ring portion of the steering wheel.

In the airbag device of the aforementioned construction, moreover, it is preferable that the airbag has a flow regulating member arranged therein and having such a flexibility as can regulate the flow of the inflating gas, and that the regulation of the flow of the inflating gas is released by the breakage of the flow regulating member.

With this construction of the airbag device, no useless gas leakage occurs from the airbag at the completion of inflation. This is because the regulation of the flow of the inflating gas is released by the breakage of the flow regulating member having flexibility and arranged in the airbag. If there is a construction in which the flow regulating member is sewn to the portion at the circumference of the airbag by means of the sewing thread so that the regulation of the gas flow is released by rupturing the sewing thread, more specifically, the holes in the circumferential wall passed by the sewing thread may be enlarged. Therefore, the inflating gas may leak from those holes. If however the flow regulating member itself is ruptured, however, the holes passed by the sewing thread in the circumferential wall of the airbag can be prevented from becoming large even if the flow regulating member is sewn to the circumferential wall.

In the airbag device of the aforementioned construction, still further, it is preferable that the flow regulating member includes an vehicle front-facing joint portion connected to the gas inlet port periphery section of the vehicle front-facing wall portion and a passenger side joint portion to be connected to the passenger-facing wall portion, so that the flow regulating member can be connected to the gas inlet port periphery section of the vehicle front-facing wall portion and the passenger-facing wall portion, and that the portion between the vehicle front-facing joint portion and the passenger-facing joint portion is broken before the completion of inflation of the airbag.

With this construction of the airbag device, the distance between the gas inlet port periphery section of the vehicle front-facing wall portion and the passenger-facing wall portion can be suppressed while inflation of the airbag is still incomplete, that is, before the breakage between the vehicle front-f acing joint portion and the passenger side joint portion. This is because the vehicle front-facing wall portion and the passenger-facing wall portion are connected by the flow regulating member. From the beginning to a point midway in inflation, therefore, the airbag can prevent the passenger-facing wall portion from unnecessarily protruding toward the passenger by means other than changing the flow direction of the inflating gas. If the tethers are arranged in this airbag, it is quite natural that the unnecessary protrusion of the passenger-facing wall portion to the passenger can be prevented even at the completion of inflation of the airbag after the flow regulating member is broken.

In the airbag device of the aforementioned construction, still moreover, it is preferable that the flow regulating member is formed of one band of fabric material and is so arranged in the airbag as to cover the gas inlet port of the vehicle front-facing wall portion.

In the airbag device of the aforementioned construction, on the other hand, it is acceptable that the flow regulating member is formed of one band of fabric material and is provided with an opening to communicate with the gas inlet port and is so arranged in the airbag that the edge of the opening is arranged on the edge of the gas inlet port of the vehicle front-facing wall portion.

With this construction of the airbag device, the airbag, which can regulate the gas flow and the depth of the airbag at the beginning of inflation, can be easily manufactured merely by using one flow regulating member. In other words, an airbag whose depth and gas flow entry rate at the beginning of inflation is regulated, can be conveniently manufactured with reduced number of manufacturing steps and cost. Here, the flow regulating member may be either so arranged in the airbag as to cover the gas inlet port of the vehicle front-facing wall portion or formed with an opening to communicate with the gas inlet port of the vehicle front-facing wall portion, placed inside the airbag, and arranging the edge of the flow regulating member opening at the edge of the gas inlet port. In case the flow regulating member is arranged to cover the gas inlet port, moreover, it can protect the part of the passenger-facing wall portion directly opposite the gas inlet port against the inflating gas.

Still further, it is preferable that the airbag device comprises: a case for housing the airbag when folded; and an annular retainer which can attach the airbag to the case by holding down the inner side of the airbag at the periphery of the gas inlet port, and that the vehicle front-facing joint portion toward the engine is joined to the vehicle front-facing wall portion by the retainer.

With this construction of the airbag device, the joining of the vehicle front-facing joint portion in the flow regulating member to the vehicle front-facing wall portion can be performed not by using joining means such as sewing but merely by holding it down with a retainer. Therefore, the vehicle front-facing joint portion of the flow regulating member can be easily formed.

The second object of the invention can be achieved with an airbag device for a steering wheel comprising an airbag including a gas inlet port through which inflating gas can flow which is folded and housed, wherein the airbag includes:

an airbag body formed by joining the edges of the vehicle front-facing wall portion having the gas inlet port and of the passenger-facing wall portion directly opposite the gas inlet port to each other; and a flow regulating member arranged in the airbag body and having flexibility for regulating the inflow direction of the inflating gas into the airbag body, wherein the flow regulating member can regulate the inflating gas to flow into the airbag body in two directions symmetric with respect to the gas inlet port, wherein the airbag is first laid out flat, superposing said vehicle front-facing wall portion and the passenger-facing wall portion, and then folded in at least a first stage and a second stage and then is housed, wherein at the first stage, the two points on the edge of the airbag which are along the line passing through the center and perpendicular to the regulated direction of the inflating gas is folded so that the formed creases are parallel to the regulated direction of the inflating gas, and the folded ends come toward the gas inlet port, wherein at the second stage, the airbag folded at the first stage is so folded that the two points on the edge along the line passing through the center and in the regulating direction of the inflating gas come toward the gas inlet port, and wherein the airbag is so folded to be in a shape elongated along the regulating direction of the inflating gas at the first folding stage, the two points on the edge of the airbag which are along the line passing through the center and perpendicular to the regulated direction of the inflating gas so that the direction of their overlapping is roughly perpendicular to the opening plane of said gas inlet port.

In the airbag device for a steering wheel of the aforementioned construction, at the beginning of inflation of the airbag, the portion of the passenger-facing wall portion directly opposite the gas inlet port is raised by the inflating gas. At the first folding stage, however, the airbag is folded so that the areas around the two points on the edge of said airbag which are along the line passing through the center and perpendicular to the regulated direction of the inflating gas overlap, thereby to arrange one folded portion. Therefore, the folded portions of the first stage are not instantly unfolded but rather the portion of the passenger-facing wall portion directly opposite the gas inlet port is raised while keeping the folded state. This is because friction between the overlapping surfaces by the above two points causes resistance. Then, the inflating gas flows into the airbag with its inflow direction regulated by the flow regulating member. Therefore, the airbag expands at first in the regulating direction of the inflating gas to unfold the folded portions of the second stage. After this, moreover, the airbag completes its inflation by inflating to unfold the folded portions of the first stage. In the airbag device for the steering wheel thus constructed, more specifically the folded portions of the second stage are expanded widely and promptly in the regulated direction of the inflating gas in the airbag, and then the portions folded perpendicular to the inflow direction of the inflating gas are expanded to complete the inflation.

In the airbag device for the steering wheel of the aforementioned construction, therefore, the flow regulating effect of the inflating gas by the flow regulating member arranged in the airbag body can be enhanced so that the airbag expands widely and quickly in the regulated direction of the inflating gas, at the beginning of the inflation of the airbag.

In the airbag device for the steering wheel of the aforementioned construction, moreover, it is preferable that the airbag which has completed the first stage is folded at the second stage so that the two sides of the airbag along the line through the center in the regulated direction of the inflating gas come toward the gas inlet port to form two portions folded in the regulated direction of the inflating gas to be adjacent to each other.

With this construction of the airbag device for the steering wheel, if the portions of the passenger-facing wall portion directly opposite the gas inlet port are raised by the inflating gas at the beginning of inflation of the airbag with in flowing gas, the two folded portions of the second stage are expanded away from each other. This is because the two folded portions were folded to be adjacent to each other in the regulated direction of the inflating gas. Moreover, these two folded portions are individually quickly unfolded without any interference with each other. Therefore, the folded state of the second stage in the airbag can be quickly released. As a result, the airbag can be expanded more quickly.

The third object of the invention can be achieved by the airbag device for a steering wheel comprising an airbag inflated by admitting an inflating gas and including an airbag body which has an outer circumferential wall when inflation is completed, and an auxiliary inflation portion arranged in said airbag body, wherein the airbag body includes a gas inlet port for admitting the inflating gas, wherein the auxiliary inflation portion communicates with the gas inlet port and inflates to protect the passenger before the completion of inflation of the airbag body, and wherein the auxiliary inflation portion includes gas outlet ports for allowing the inflating gas flowing at the time of inflation to flow out to the airbag body and is constructed to deflate by rupture at a portion removed from the outer circumferential wall of the airbag body before the completion of inflation of the airbag body.

In the airbag device thus constructed, at the beginning of action, if the inflating gas flows from the gas inlet port into the auxiliary inflation portion of the airbag, the auxiliary inflation portion completes its inflation while flowing a part of the inflating gas from the gas outlet ports to the airbag body side.

If the effective area of the gas outlet ports is set small, moreover, the flow rate of the inflating gas to flow out to the airbag body is reduced. Even if the inflating gas flowing in has a small volume at a low temperature at the beginning of inflation of the airbag, therefore, internal pressure of the auxiliary inflation portion can be raised so that cushioning action is retained and the passenger is protected.

After this, the auxiliary inflation portion ruptures at portions removed from the outer circumferential wall of the airbag body and so deflates. Partially inflated after admitting the inflating gas from the gas outlet ports, the airbag body further admits inflating gas smoothly and promptly f to complete the inflation.

At the time the auxiliary inflation portion deflates, the auxiliary inflation portion ruptures at locations removed from the outer circumferential wall of the airbag body. Even if the auxiliary inflation portion is joined by sewing to the outer circumferential wall of the airbag body, therefore, the sewn portions are not influenced. In other words, the airbag body can complete its inflation while keeping the holes of the outer circumferential wall passed by the sewing thread from being enlarged as in the prior art.

Therefore, the airbag can be conveniently manufactured without such work as applying a seal material on the portions joining the auxiliary inflation portion and the airbag body.

In the airbag device of the aforementioned construction, therefore, even if the auxiliary inflation portion capable of protecting the passenger at a low temperature is arranged in the airbag, unnecessary gas leakage from the airbag can be prevented while the airbag can be manufactured in a smaller number of steps of and at a lower cost as well.

In the airbag device of the aforementioned construction, moreover, it is preferable that the auxiliary inflation portion of the airbag is arranged as such a flow regulating member as can control the outflow direction of the inflating gas to go out from the gas outlet ports into the airbag body so as to prevent the airbag body from protruding to the passenger at the beginning of inflation.

With this construction of the airbag device, at the beginning stage of inflation, the airbag body can admit the inflating gas from the gas outlet ports of the flow regulating member serving as the auxiliary inflation portion so that it can expand widely while suppressing protrusion toward the passenger. At the beginning of inflation, therefore, the airbag body can be easily expanded between the passenger and the airbag device even if the passenger comes close to the airbag device and narrows the clearance between the passenger and the airbag device. By the subsequent inflation of the airbag body, moreover, the cushioning effect can be enhanced so that the airbag body protects the passenger over a wide area.

Here, the direction that the auxiliary inflation portion serving as the flow regulating member feeds the inflating gas to the airbag body by controlling the flow is preferably not the direction in which gas would push the portion of the outer circumferential wall of the airbag body facing the passenger and directly opposite the gas inlet port away from the gas inlet port but rather a direction parallel to that portion.

In the airbag device of the aforementioned construction, moreover, it is preferable that the outer circumferential wall of the airbag body includes a vehicle front-facing wall portion having the gas inlet port, and a passenger-facing wall portion directly opposite the gas inlet port, that the auxiliary inflation portion of the airbag is joined to the passenger-facing wall portion and can regulate the spacing distance of the passenger-facing wall portion from the gas inlet port so as to prevent the protrusion of the airbag body toward the passenger at the beginning of inflation, and that the regulation of the spacing distance is released by the breakage of the auxiliary inflation portion, after which the inflation of the airbag body is completed.

With this construction of the airbag device, before the completion of inflation of the airbag body, i.e., before deflation of the auxiliary inflation portion, the distance in the airbag body between the vehicle front-facing wall portion at the periphery of the gas inlet port and the passenger-facing wall portion can be suppressed. Therefore, the airbag body can prevent the passenger-facing wall portion from unnecessarily protruding toward the passenger from the beginning to a point midway in inflation regardless of the flow direction of the inflating gas.

In the airbag device of the aforementioned construction, still moreover, it is preferable that the auxiliary inflation portion of the airbag is formed into a cylindrical shape extending from the periphery of the gas inlet port of the vehicle front-facing wall portion to the part of the passenger-facing wall portion directly opposite the gas inlet port, and whose encircling wall is provided with gas outlet ports, that the edge of the circumferential wall portion on the side of the passenger-facing wall portion is joined to the passenger-facing wall portion, and that the directly opposing part of the passenger-facing wall portion is the ceiling portion of the auxiliary inflation portion.

In this construction of the airbag device, if the cylindrical circumferential wall portion extending from the periphery of the gas inlet port in the vehicle front-facing wall portion is jointed to the passenger-facing wall portion of the airbag body, the ceiling wall portion of the auxiliary inflation portion on the passenger side can be shared with the passenger-facing wall portion of the airbag body. Therefore, the components of the auxiliary inflation portion are fewer than the case in which there is separately provided a member for covering the opening in the circumferential wall portion of the auxiliary inflation portion at the end toward the passenger.

In the airbag device of the aforementioned construction, moreover, it is preferable that the joint portion joining the circumferential wall portion to the passenger-facing wall portion be further toward the outside away from the center axis defined by the gas inlet port than the joint portion for the vehicle front-facing wall portion.

In the case of this construction of the airbag device, the auxiliary inflation portion inflated shape expands closer to the ceiling wall portion (on the passenger side) than close to the gas inlet port. Moreover, the ceiling wall portion side consists of the passenger-facing wall portion of the airbag body itself so that the auxiliary inflation portion can protect a passenger who is interfering with action of the airbag at the beginning of inflation over a wide area with enhanced cushioning effect.

With this construction, on the other hand, at the time of inflation of the auxiliary inflation portion, the gas outlet ports formed in the circumferential wall portion to feed the inflating gas to the airbag body are directed to the vehicle front-facing wall portion. Therefore, while the airbag body inflates protrusion toward the passenger can be restricted.

In the airbag device of the aforementioned construction, moreover, it is preferable that the airbag includes tethers for regulating the spacing distance of the passenger-facing wall portion from the gas inlet port at the completion of inflation of the airbag body.

In this construction of the airbag device, the airbag body having completed the inflation is regulated in the spacing distance of the passenger-facing wall portion from the gas inlet port by the tethers so that the airbag body can be prevented from unnecessarily protruding toward the passenger even after the completion of inflation.

The fourth object of the invention can be achieved by an airbag device comprising a folded and housed airbag including: a vehicle front-facing wall portion having a gas inlet port for allowing an inflating gas to enter and a passenger-facing wall portion directly opposite the gas inlet port, inflow of the inflating gas being regulated as the airbag expands so as to prevent the unnecessary protrusion of the passenger-facing wall portion toward the passenger, wherein the airbag includes a flow regulating cloth having flexibility for regulating the flow of the inflating gas, a first regulating member and a second regulating member, wherein the first regulating member is joined to the vehicle front-facing wall portion and the passenger-facing wall portion so as to regulate the spacing distance from the gas inlet port to the passenger-facing wall portion directly opposite the gas inlet port from the beginning to a point midway in inflation, and so that the regulation of the spacing distance ends before completion of inflation, and wherein the second regulating member is joined to the vehicle front-facing wall portion and the passenger-facing wall portion so as to regulate the spacing distance from the gas inlet port to the passenger-facing wall portion directly opposite the gas inlet port at the completion of inflation to a distance longer than the spacing distance by the first regulating member.

In the airbag device of this construction, from the beginning to a point midway in inflation of the airbag, the airbag is regulated by the first regulating member in the spacing distance from the gas inlet port to the passenger-facing wall portion directly opposite the gas inlet port. At this stage, therefore, it is possible to prevent the airbag from unnecessarily protruding toward the passenger. At this time, moreover, the inflating gas admitted is regulated in its flow by the flow regulating cloth, so that the airbag can be expanded widely while being restricted from protruding toward the passenger. Therefore, even if the passenger approaches the airbag device at the beginning of inflation to narrow the clearance between the passenger and the airbag device, the airbag can be easily expanded between the passenger and the airbag device to protect the passenger properly.

Before the completion of inflation, moreover, the airbag is released from the regulation of the spacing distance by the first regulating member, and the spacing distance from the gas inlet port to the passenger-facing wall portion directly opposite the gas inlet port is restricted by the second regulating member to be a larger value than the spacing distance by the first regulating member. Up until the completion of inflation, therefore, the airbag can be prevented from unnecessarily protruding to the passenger. At this time, moreover, the flow of the admitted inflating gas into the airbag is regulated by the flow regulating cloth. Therefore, the airbag is expanded as wide as possible to complete the inflation while being suppressed from protruding to the passenger. Just before the completion of inflation of the airbag, more specifically, even if the passenger interferes with the passenger-facing wall portion, the passenger interferes with the passenger-facing wall portion after it has widely expanded so that the airbag does not apply any pushing force to one part of the passenger and thus protects the passenger.

In the airbag device of the aforementioned construction, therefore, the airbag can protect the passenger properly and also can be prevented from unnecessarily protruding toward the passenger from the beginning to the completion of inflation.

In the airbag device of the aforementioned construction, on the other hand, it is preferable that the airbag is constructed for the steering wheel of a vehicle, and that the flow regulating cloth regulates the flow of the inflating gas, when mounted on the vehicle, to the most forward and most rearward positions and along the ring face of the steering wheel.

With this construction of the airbag device, the airbag is inflated from the beginning to extend to the most forward and most rearward positions and along the ring portion of the steering wheel while being prevented from protruding to the passenger (driver). In other words, the airbag can be partially arranged from the beginning of inflation on the rear side of the ring portion of the steering wheel. Even if the driver approaches the ring portion, therefore, one portion of the airbag can be easily inserted into the narrow clearance between the abdomen of the driver and the rear side of the ring portion of the steering wheel.

In the airbag device of the aforementioned construction, moreover, it is preferable that the first regulating member ends regulation of the spacing distance by being broken somewhere between the joint portion joining it to the vehicle front-facing wall portion and the joint portion joining it to the passenger-facing wall portion.

With this construction of the airbag device, no needless gas leakage occurs from the airbag which has completed the inflation. This is because the regulation of the spacing distance in the first regulating member is ended by the breakage of the first regulating member itself. In the construction in which the first regulating member is sewn to the portion constructing the circumferential wall of the airbag by means of sewing thread and in which the regulation of the spacing distance is released by rupturing the sewing thread, the holes in the circumferential wall passed by the sewing thread may be enlarged. Therefore, the inflating gas may leak from those holes. If the first regulating member itself is ruptured, however, the holes in the circumferential wall passed by the sewing thread can be kept from becoming larger even if the first regulating member is sewn to the circumferential wall of the airbag.

In the airbag device of the aforementioned construction, moreover, it is preferable that the first regulating member and the second regulating member are formed of a continuous regulating fabric material having flexibility.

With this construction of the airbag device, the joint of the regulating members to the vehicle front-facing wall portion and the passenger-facing wall portion can be shared to reduce the number of components, as compared with the case in which the first and second regulating members are separately arranged. Moreover, the joining operations for the first and second regulating members can be simplified so that the number of manufacturing steps can be reduced and the cost can be lowered.

In the airbag device of the aforementioned structure, still moreover, it is preferable that the flow regulating cloth of the airbag includes a first flow regulating cloth for regulating the flow of the inflating gas from the beginning to a point midway in inflation, and a second flow regulating cloth for regulating the flow of the inflating gas till the completion of inflation, that the first flow regulating cloth is constructed to be the first regulating member, including a vehicle front-facing joint portion toward the engine to be jointed to the vehicle front-facing wall portion at the periphery of the gas inlet port, and a joint portion toward the passenger to be jointed to the passenger-facing wall portion, so as to connect the periphery of the gas inlet port in the vehicle front-facing wall portion and the passenger-facing wall portion, and that a portion between the engine side joint portion and the passenger side joint portion is broken before completion of inflation of the airbag.

With this construction of the airbag device, for the flow regulation of the inflating gas, the first flow regulating cloth can be used from the beginning to a point midway in inflation of the airbag, and the second flow regulating cloth can be used subsequently till the completion of inflation of the airbag. In accordance with the desired depth (i.e., the spacing distance from the gas inlet port to the passenger-facing wall portion) of the airbag, the flow direction, the flow rate and the flow velocity of the inflating gas can be adjusted, and expansion of the airbag properly over a wide area within the necessary time period of inflation can be realized. Moreover, the first flow regulating cloth plays the role of the first regulating member so that there is minimal increase in the number of components of the airbag even if the flow regulating is carried out by first and second flow regulating cloths.

In the airbag device of the aforementioned construction, still moreover, it is preferable that the first flow regulating cloth extends from the passenger side joint portion, and that the extended portion is jointed to the vehicle front-facing wall portion near the gas inlet port to provide the second regulating member.

With this construction of the airbag device, the number of components can be made smaller than that of the case in which the first and second regulating members are separately arranged, and the joining of the first and second regulating members can be simplified. Even if the flow regulating is done by the first and second flow regulating cloths, therefore, it is possible to minimize the increase in the number of manufacturing steps and the rise in the cost.

Still moreover, it is preferable that the airbag device further comprises: a case for housing the airbag when folded; and an annular retainer which can attach the airbag to the case by holding down the inner side of the airbag at the periphery of the gas inlet port, and that the vehicle front-facing joint portion in the first flow regulating cloth is jointed to the vehicle front-facing wall portion while being retained by the retainer.

With this construction of the airbag device, the joint of the vehicle front-facing joint portion in the first flow regulating cloth to the vehicle front-facing wall portion can be done not by means such as the sewing but merely by retaining it with the retainer. Therefore, the vehicle front-facing joint portion of the first flow regulating cloth toward the engine can be easily formed.

The fifth object of the invention can be achieved by an airbag device for a steering wheel comprising an airbag including a gas inlet port for allowing an inflating gas to enter, this airbag being folded and housed, wherein the airbag is formed by joining the edges of an vehicle front-facing wall portion having the gas inlet port and a passenger-facing wall portion directly opposite the gas inlet port, to each other, wherein the airbag includes an airbag body and a connecting member arranged in the airbag body, wherein the connecting member is jointed to the passenger-facing wall portion and to the periphery of the gas inlet port to there by connect the passenger-facing wall portion and the periphery of the gas inlet port, wherein the connecting member can maintain this connected state up to a point midway in the inflation of the airbag and can end this connected state before the completion of inflation of the airbag, and wherein the connecting member is arranged so that while the vehicle front-facing wall portion and the passenger-facing wall portion are expanded flat and superposed, the center of the joint with the passenger-facing wall portion is offset from the center of the joint with the periphery of the gas inlet port.

In the airbag device for the steering wheel of this construction, in connection with the film length of the vertical section centered at the gas inlet port in the airbag body, the film length at the portion of the airbag body in the offset direction with the joint of the passenger-facing wall portion with the connecting member as the center is shorter by the length of the offset than the film length in the opposite direction. In short, the film length of the portion of the airbag body to the offset direction from the joint with the passenger-facing wall portion and the film length to the opposite direction can be elongated by the length of the offset.

In the airbag device for the steering wheel of the aforementioned construction, moreover, at the beginning of operation, the airbag body begins to inflate with the passenger-facing wall portion and the periphery of the gas inlet port connected by the connecting member. Therefore, the airbag can be so inflated at the beginning as to enlarge the depth of the portion of the airbag body opposite the offset direction of the center of the joint of the passenger-facing wall portion with the connecting member, in which side the film length is enlarged. In the airbag device for the steering wheel of the aforementioned construction, more specifically, if the portion of the airbag to be quickly expanded is made to be on the side of the joint of the passenger-facing wall portion to the connecting member to the opposite of the offset direction of this joint, that portion can be quickly inflated in the first stage of inflation so that the cushioning effect of enlarged depth can be obtained.

In the airbag device for the steering wheel of the aforementioned construction, moreover, the connecting member connects the passenger-facing wall portion of the airbag body and the periphery of the gas inlet port. At the beginning of inflation of the airbag, therefore, the airbag body is prevented from protruding toward the driver. In other words, at the beginning of inflation of the airbag, the inflating gas flows in to the portion of the airbag body around the gas inlet port. Therefore, inflation is promoted at the portion around the gas inlet port in the airbag body. As the inflating gas further flows into the airbag body, moreover, the connection between the passenger-facing wall portion and the vicinity of the gas inlet port is broken to allow complete inflation of the airbag body.

In the airbag device for the steering wheel of the aforementioned construction, therefore, the predetermined portion around of the gas inlet port of the airbag can be inflated quickly to sufficient depth at the beginning of operation, thereby protecting the driver properly.

In the airbag device for the steering wheel of the aforementioned construction, on the other hand, it is preferable that the connecting member is arranged such that the center of the joint with the passenger-facing wall portion is offset toward the forward edge of the airbag body when mounted on the vehicle the connecting member extending from the center of the joint portion to the vicinity of the circumferential edge of the gas inlet port.

With this construction of the airbag device for the steering wheel, the length of the film over the airbag body toward the rear of the vehicle on the side of the joint of the passenger-facing wall portion and the connecting member opposite to the offset direction of the joint can be relatively elongated. Therefore, the airbag can be so inflated at the beginning as to enlarge the depth the portion of the airbag body toward the rear the vehicle. In other words, the portion of the airbag body toward the rear of the vehicle can be inflated faster so as to enlarge the depth there quickly while however being prevented from protruding to the driver. As a result, the airbag can be expanded and inflated quickly enough between the portion of the ring portion of the steering wheel furthest toward the rear of the vehicle and the abdomen of the driver to always provide cushioning. At the beginning of inflation of the airbag, therefore, it is possible to protect the abdomen of the driver properly.

In the airbag device for the steering wheel of the aforementioned construction, moreover, it is preferable that the connecting member is constructed of a flow regulating member for regulating the inflow direction of the inflating gas into the airbag body so as to prevent the protrusion of the airbag to the driver.

With this construction of the airbag device for the steering wheel, the inflating gas discharged from the inflator is guided into the airbag body while the flow direction is regulated by the flow regulating member. Therefore, it is possible to further suppress the protrusion of the airbag body to the driver. Here, the direction the inflating gas is desired to flow is not the direction to push the passenger-facing wall portion away from the gas inlet port but the direction parallel to the passenger-facing wall portion directly opposite the gas inlet port. In the airbag device for the steering wheel of this construction, also, the connecting member consists of a flow regulating member. It is, therefore, possible not only to regulate the flow direction of the inflating gas into the airbag body but also to control the depth of the airbag at the beginning of inflation thereby to regulate the protrusion of the passenger-facing wall portion to the driver. In other words, in the airbag device for the steering wheel of the aforementioned construction, the airbag can be manufactured merely by arranging the flow regulating member serving as the connecting member in the airbag body. This makes it unnecessary to arrange the connecting member and the flow regulating member separately in the airbag body. As a result, the airbag can be easily manufactured due to a reduced number of manufacturing steps and so lower the cost.

In the airbag device for the steering wheel of this construction, moreover, it is preferable that there are arranged in the airbag body a plurality of tethers for connecting the passenger-facing wall portion and the vehicle front-facing wall portion to regulate the spacing distance of the passenger-facing wall portion from the vehicle front-facing wall portion at the completion of inflation of the airbag.

With the aforementioned construction of the airbag device for the steering wheel, the airbag having completed its inflation is regulated in the spacing distance of the passenger-facing wall portion from the vehicle front-facing wall portion by the tethers so that the airbag is regulated from unnecessarily protruding to the driver even at the completion of inflation.

BRIEF DESCRIPTION OF THE DRAWINGS

FIGS. 17A and 17B are schematic sections for explaining the inflating procedure of the airbag in the airbag device of the third embodiment;

DESCRIPTION OF THE PREFERRED EMBODIMENTS

Figure 1:
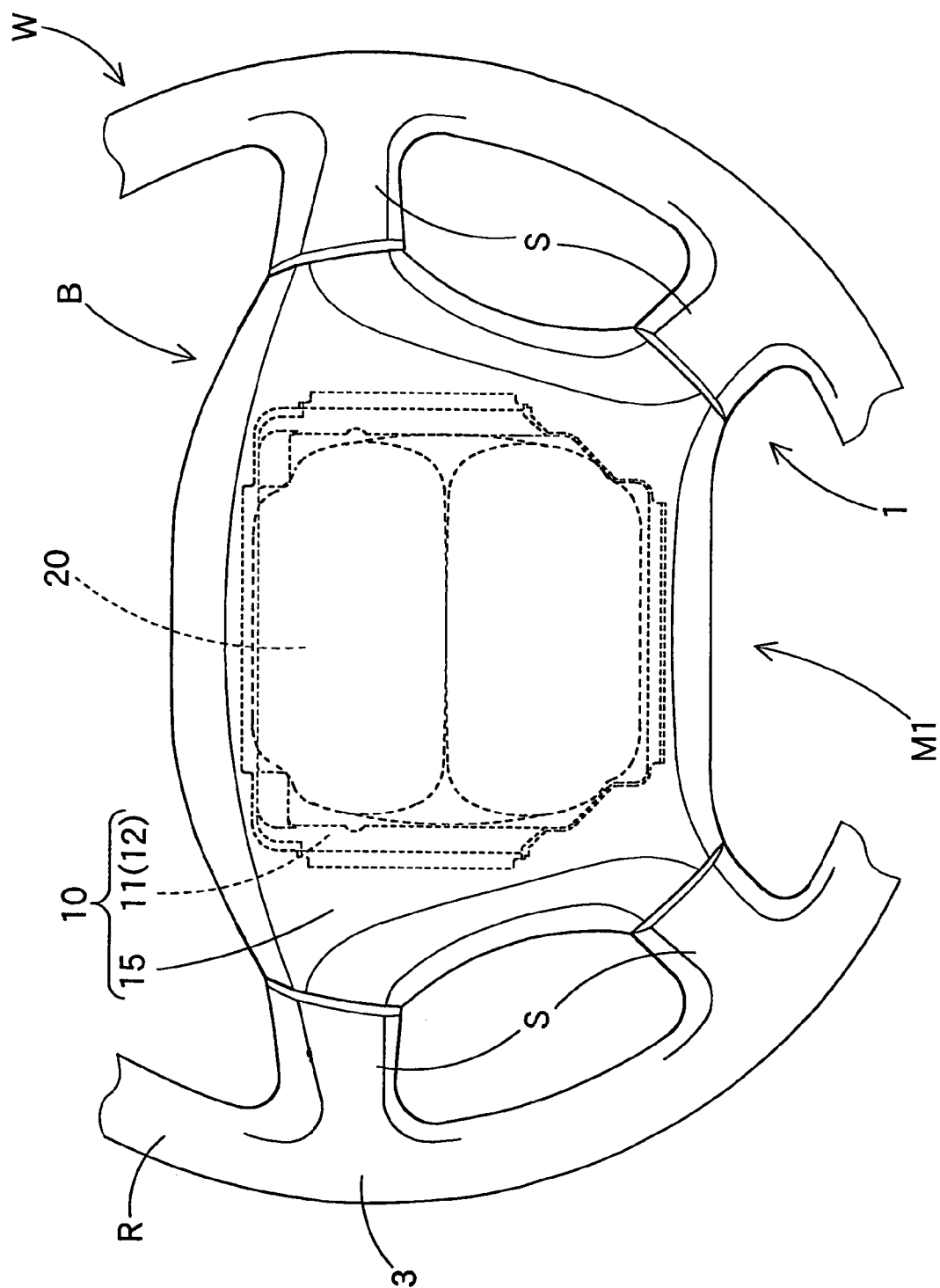
FIG. 1 is a top plan view showing a steering wheel in which an airbag device according to a first embodiment of the invention is used.

The invention will be described below by way of embodiments shown in the drawings. In addition, the invention is not limited to the embodiments. All modifications within the requirements of the claims and equivalents with respect to the requirements should be included in the scope of the claims.

One embodiment of the invention will be described with reference to the accompanying drawings.

First of all, the description will be made of an airbag device M1 capable of achieving the first and second objects of the invention and of airbag devices M2 and M3 capable of the first object of the invention.

Figure 2:
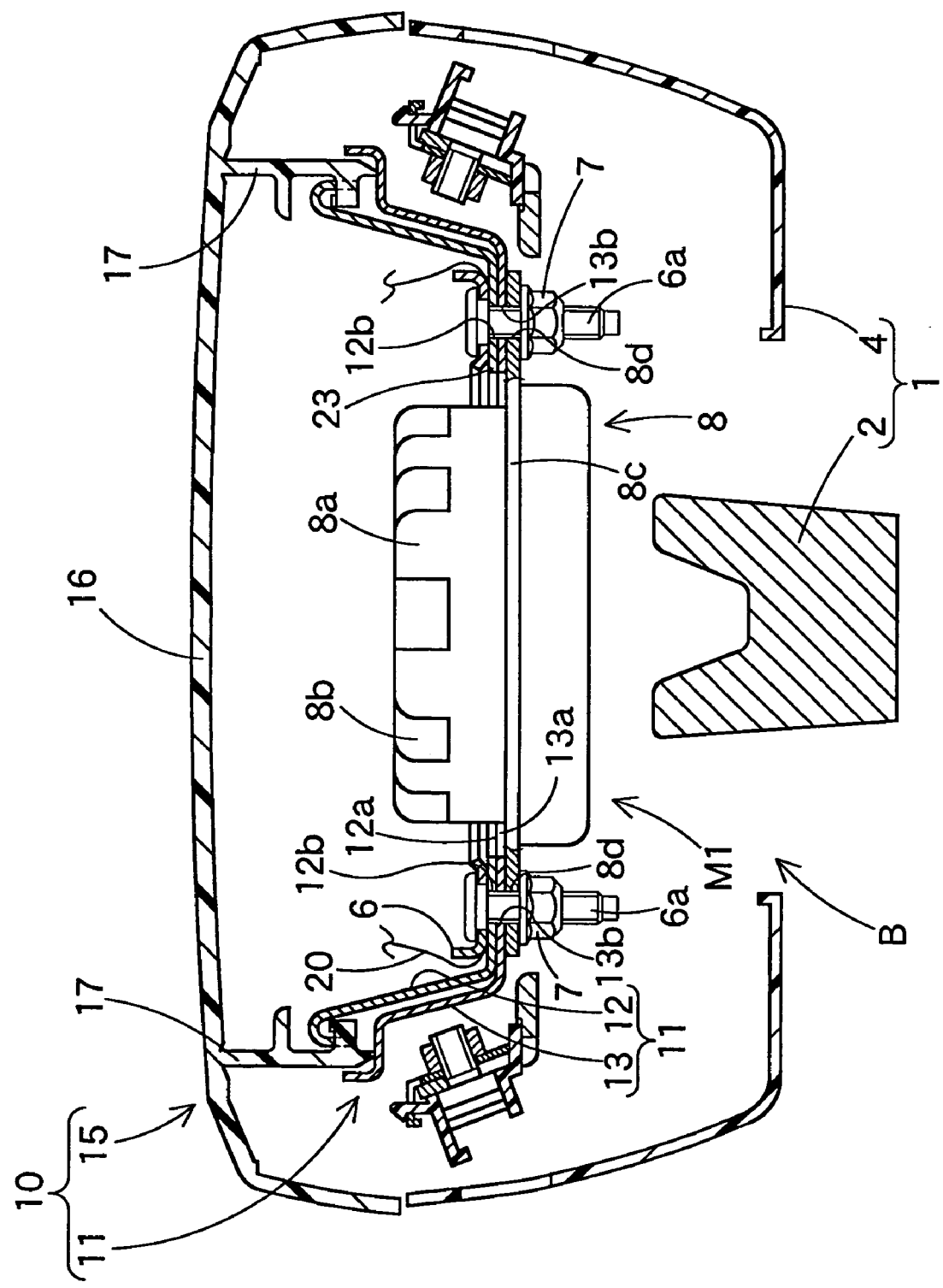
FIG. 2 is a schematic section of the steering wheel of the first embodiment.

FIGS. 1 and 2 show the airbag device M1 for a steering wheel according to the first embodiment of the invention. Here, the longitudinal, vertical and lateral directions in the first embodiment are in reference to the steering wheel W which is mounted on the vehicle, when the vehicle is steered straight forward, unless otherwise specified. Specifically, the longitudinal, vertical and lateral directions are defined such that the vertical direction is the axial direction of the steering shaft SS (as referred to FIG. 11), to which the steering wheel W is assembled, such that the longitudinal directions are the longitudinal directions of the vehicle perpendicular to the axis of the steering shaft SS, and such that the lateral directions are the lateral directions of the vehicle perpendicular to the steering shaft SS.

The airbag device M1 is arranged over a boss portion B at the center of the steering wheel W, as shown in FIGS. 1 and 2. The steering wheel W is provided with a ring portion R to be gripped when steered, the boss portion B arranged at the center and connected to the steering shaft SS (as referred to FIG. 11), and four spoke portions S connecting the boss portion B and the ring portion R. On the other hand, the steering wheel W is provided with the airbag device M1 and a steering wheel body 1 as components.

The steering wheel body 1 comprises a core 2 made of an aluminum alloy or the like, a coating layer 3 made of a synthetic resin, and a lower cover 4 made of a synthetic resin and arranged below the boss portion B. The core 2 is arranged to connect the individual portions of the ring portion R, the boss portion B and the spoke portions S. The coating layer 3 covers the core 2 positioned at the ring portion R, the individual spoke portions S in the vicinity of the ring portion R.

The airbag device M1 is provided, as shown in FIG. 2, with a folded airbag 20, an inflator 8 for feeding an inflating gas to the airbag 20, and a case 10 for housing and holding the airbag 20 and the inflator 8. The airbag 20 is provided with an airbag body 21 and a flow regulating cloth 36 serving as a flow regulating member.

The inflator 8 is provided with a generally cylindrical body 8a and a generally square flange portion 8c protruding from the outer circumference of the body 8a. The body 8a is provided in its upper portion with a plurality of gas discharge ports 8b for discharging the inflating gas. The plural gas discharge ports 8b are arranged at circumferentially equal spacings in the upper portion of the body 8a. In other words, the individual gas discharge ports 8b are arranged so as to radially discharge the inflating gas from the body 8a. In the flange portion 8c, there are formed through holes 8d for inserting bolts 6a which are protruded from a later-described retainer 6.

This retainer 6 is made of a generally square annular sheet metal. The retainer 6 is provided at its four corners with the bolts 6a protruding downward. This retainer 6 holds down the peripheries of later-described openings 23 and 37a of the airbag 20, and the bolts 6a protrude from the flange portion 8c of the inflator 8 after passing through the openings 23 and 37a and a later-described bag holder 11. By fastening nuts 7 on the individual bolts 6a, moreover, the airbag 20 is mounted on the bag holder 11 of the case 10 by the retainer 6. Here, this retainer 6 holds the edge of the opening 37a of the flow regulating cloth 36 on the periphery of the opening 23 of the airbag body 21. In other words, the edge of the opening 37a of the flow regulating cloth 36 is held by the retainer 6 to form the later-described vehicle front-facing joint portion 38 of the flow regulating cloth 36 toward the engine.

The case 10 comprises a bag holder 11 made of a sheet metal, and a pad 15 made of a synthetic resin and acting as the airbag cover.

The bag holder 11 comprises a holder plate 12 and a backup plate 13. The holder plate 12 is formed into a generally rectangular shape opened upward. The backup plate 13 clamps the pad 15 together with the holder plate 12. These plates 12 and 13 are provided with insertion holes 12a and 13a, and mounting holes 12b and 13b arranged around the insertion holes 12a and 13a. These insertion holes 12a and 13a are for insertion of the body 8a of the inflator 8 upward. The mounting holes 12b and 13b allow passage of the bolts 6a of the retainer 6. Moreover, the backup plate 13 is provided with the not-shown bracket to be connected to the core 2 of the steering wheel body 1.

The pad 15 is provided with a cover member portion 16 covering the boss portion B, and a sidewall portion 17 protruding downward in a generally square cylinder shape from the lower face of the edge of the cover member portion 16. This cover member portion 16 is provided, in the portion surrounded by the side wall portion 17, with the two door portions (although not designated) which open forward and rearward when the airbag 20 is inflated. Around these doors, the cover material is made thin so that it is easily torn when pushed by the airbag (not numbered) for opening the door portions smoothly. The side wall portion 17 is fixed by the bag holder 11 by being clamped near its lower end by the holder plate 12 and the backup plate 13 which comprise the bag holder 11.

Here in the case of the first embodiment, the folded airbag 20 is fixed on its lower face side by the holder plate 12 of the bag holder 11 and the body 8a of the inflator 8. On the other hand, the upper face side of the folded airbag 20 is regulated by the cover member portion 16 and the side wall portion 17 of the pad 15.

Figure 3:
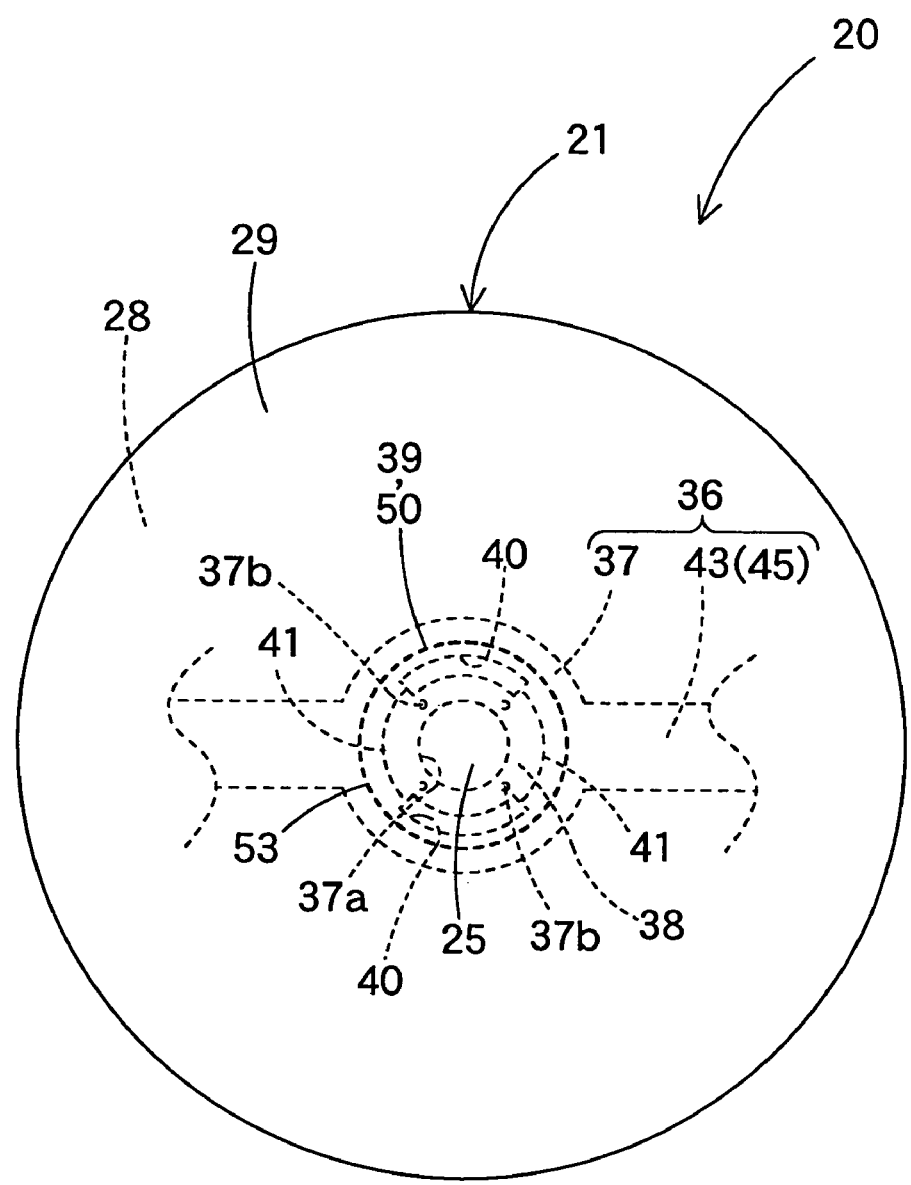
FIG. 3 is a top plan view of the expanded state of an airbag used in the first embodiment.
Figure 4:
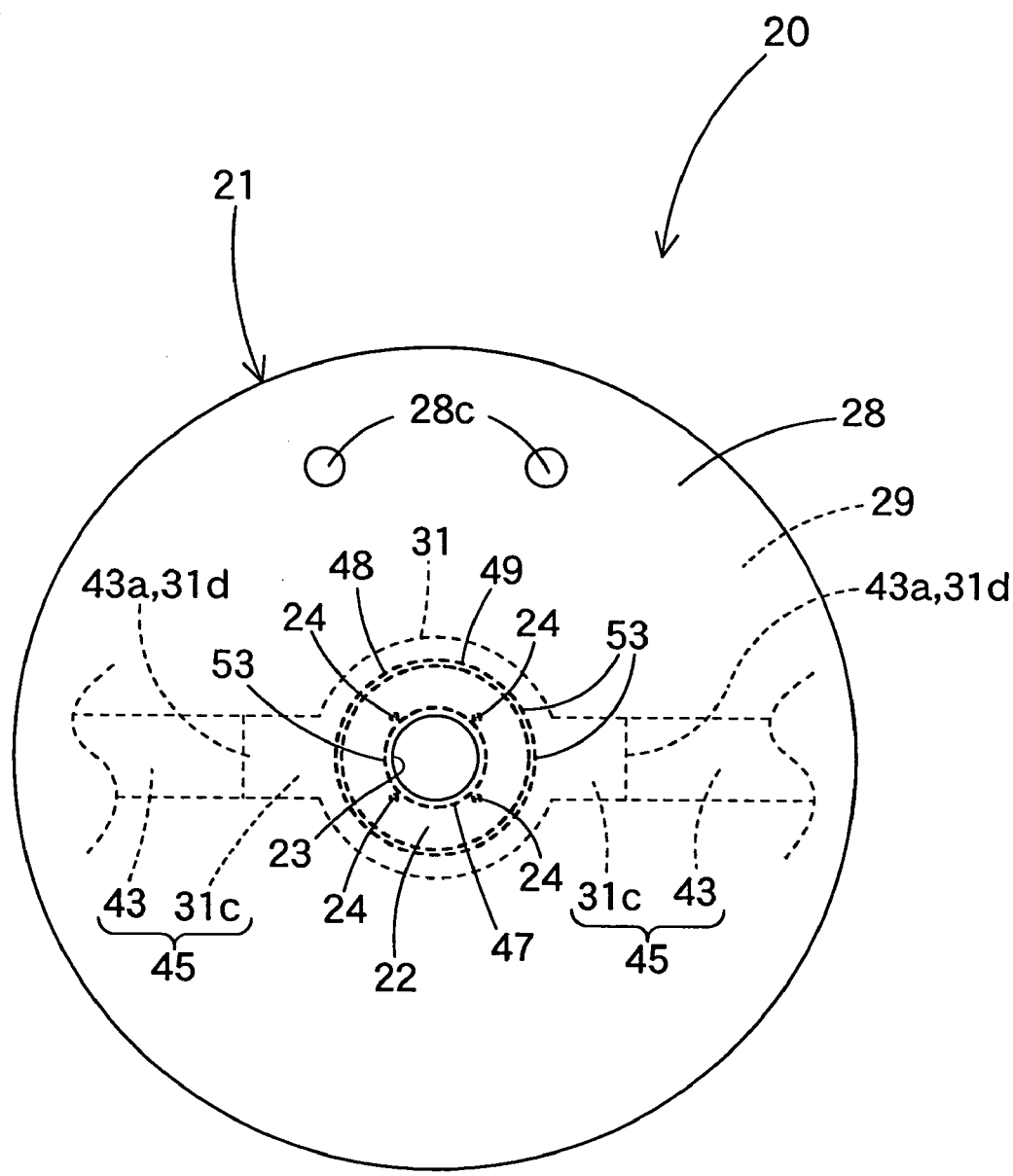
FIG. 4 is a bottom view of the expanded state of the airbag of the first embodiment.
Figure 5:
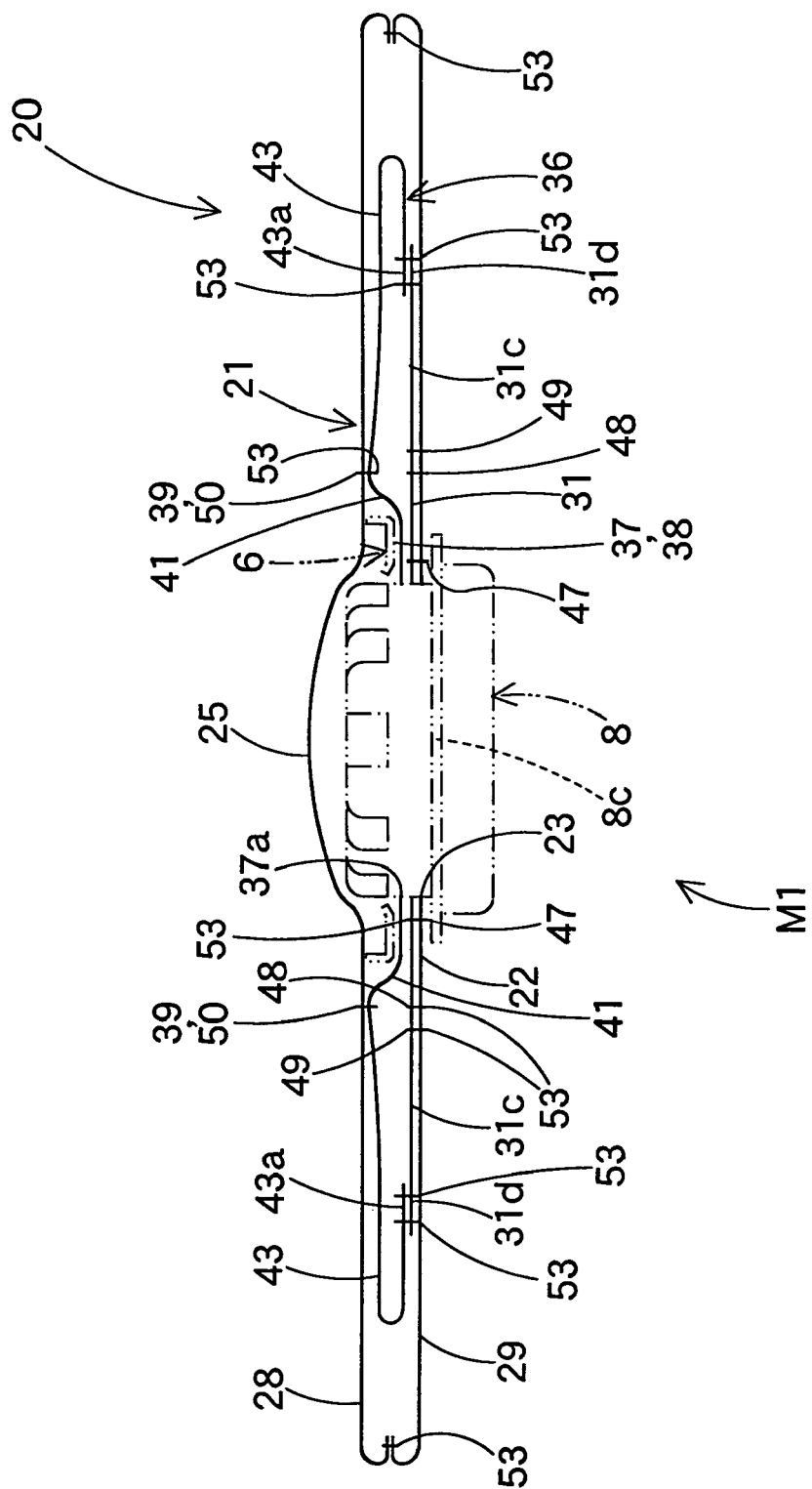
FIG. 5 is a schematic section of the expanded state of the airbag of the first embodiment.

The airbag 20 is provided, as shown in FIGS. 3 to 5, with the airbag body 21 and the flow regulating cloth 36 acting as the flow regulating member. The airbag body 21 forms into a bag shape when the inflating gas enters. The flow regulating cloth 36 is arranged to regulate the inflow direction of the inflating gas into the airbag body 21.

The airbag body 21 is formed of a woven fabric having flexibility such as polyamide or polyester. The airbag body 21 is provided with a vehicle front-facing wall portion 22 having a gas inlet port (or opening) 23, and a passenger-facing wall portion 25 arranged to be directly opposite the gas inlet port 23. The vehicle front-facing wall portion 22 is positioned on the side of the steering wheel W when the inflation of the airbag 20 is completed. The passenger-facing wall portion 25 is moved toward the passenger when the inflation of the airbag 20 is completed.

The gas inlet port 23 is a portion for causing the inflating gas discharged from the gas discharge ports 8b of the inflator 8 to flow into the airbag 20 by inserting the body 8a of the inflator 8 upward. In the periphery of the gas inlet port 23, on the other hand, there are formed four mounting holes 24 for inserting the bolts 6a formed at the retainer 6. Here, the bag holder 11 is arranged between the periphery of the gas inlet port 23 of the airbag 20 and the flange portion 8c of the inflator 8. However, the bag holder 11 is omitted from FIGS. 5, 7, 9 and 10.

Figure 6:
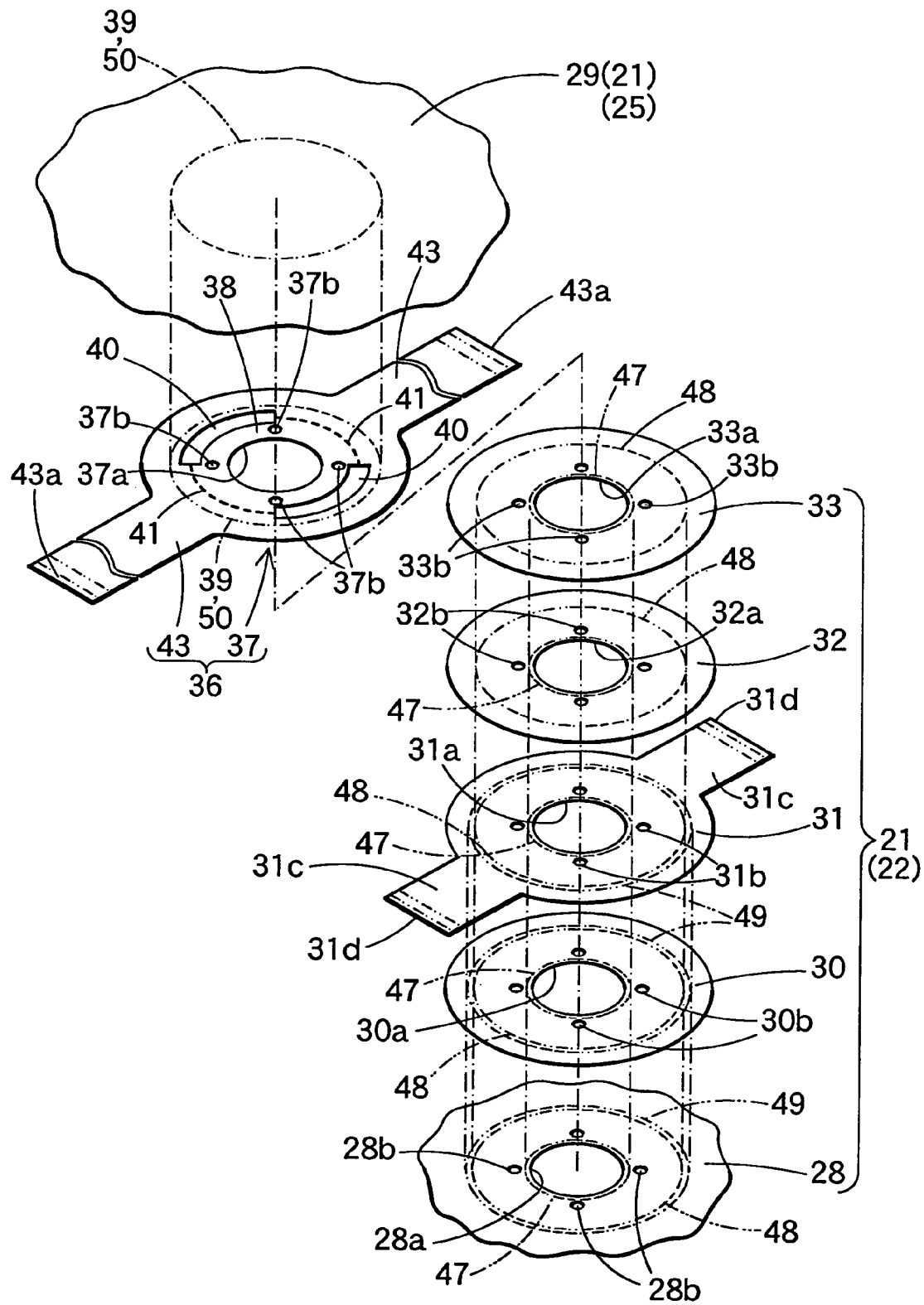
FIG. 6 is a schematic exploded perspective view showing component members at the time of manufacturing the airbag of the first embodiment.
Figure 7:
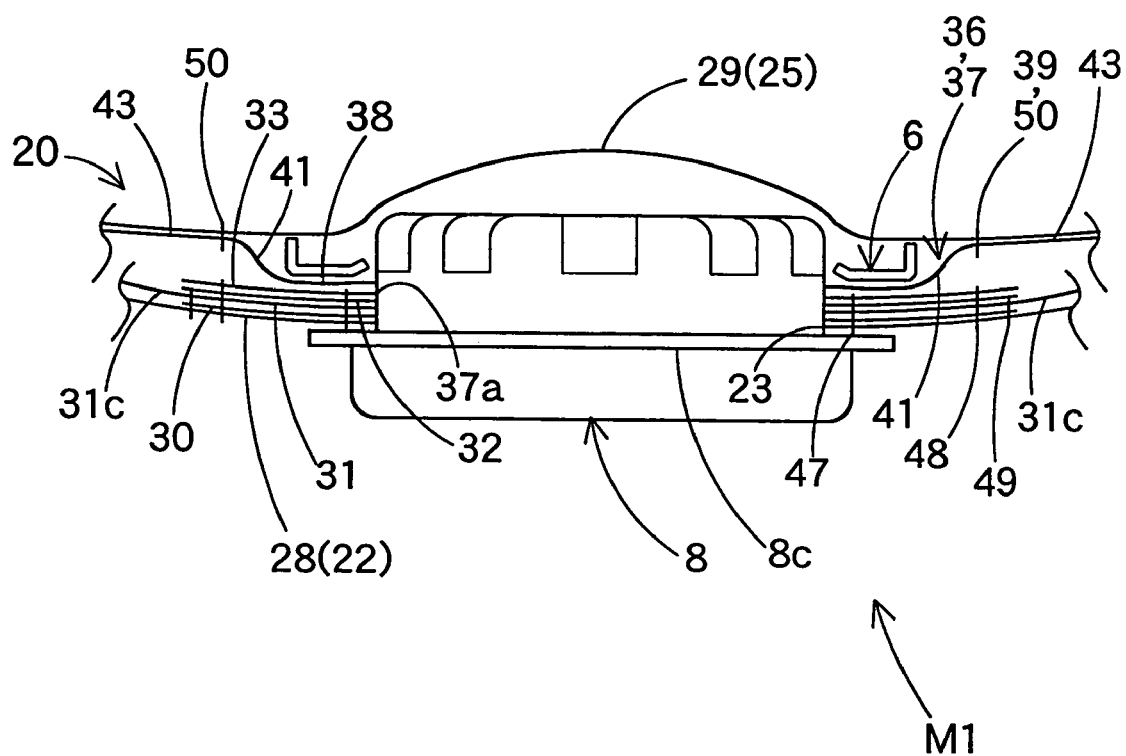
FIG. 7 is a schematic section showing the vicinity of the gas inlet port of the airbag of the first embodiment lateral the vehicle.

In the first embodiment, moreover, the airbag body 21 is provided, as shown in FIGS. 6 and 7, so that a circular body side base cloth 28 comprises the vehicle front-facing wall portion 22 and a circular passenger side base cloth 29 comprises the passenger-facing wall portion 25, and four reinforcing cloths 30, 31, 32 and 33 sewn to the vehicle front-facing base cloth 28 at the edge of the gas inlet port 23 opening. At the center of the vehicle front-facing base cloth 28, there is arranged a circular opening 28a for the gas inlet port 23. The reinforcing cloths 30, 31, 32 and 33 are arranged to enhance the strength of the periphery of the gas inlet port 23. The number of these reinforcing cloths 30, 31, 32 and 33 to be arranged can be suitably altered according to the output of the inflator 8. The body side base cloth 28 at the periphery of the opening 28a is provided with four mounting holes 28b forming the mounting holes 24. In the body side base cloth 28, moreover, there are formed vent holes 28c, as shown in FIG. 4.

The reinforcing cloths 30, 32 and 33 are individually formed into such generally annular shapes, with circular openings near their centers 30a, 32a and 33a corresponding to the gas inlet port 23, as shown in FIG. 6. In the peripheries of the individual openings 30a, 32a and 33a, moreover, there are individually formed mounting holes 30b, 32b and 33b at positions corresponding to the mounting holes 24.

The reinforcing cloth 31 is arranged between the reinforcing cloth 30 and the reinforcing cloth 32. Like the individual reinforcing cloths 30, 32 and 33, the reinforcing cloth 31 is provided near its center with a circular opening 31a corresponding to the gas inlet port 23. In the reinforcing cloth 31 at the periphery of the opening 31a in, there are formed mounting holes 31b which correspond to the mounting holes 24 as with the individual reinforcing cloths 30, 32 and 33. From the edge of the reinforcing cloth 31, there are extended two band-shaped extension portions 31c to be connected to the later-described tether portions 43 of the flow regulating cloth 36. The extension portions 31 are arranged symmetrically to the right and left.

Tethers 45 for regulating the spacing distance from the gas inlet port 23 to the portion of the passenger-facing wall portion 25 directly opposite the gas inlet port 23 when the airbag 20 has completed inflation are formed by the tether portions 43 and the extension portions 31c, which are connected to each other on the right and left sides.

The reinforcing cloths 30 and 31 are sewn to the vehicle front-facing base cloth 28 at three annular sewing locations 47, 48 and 49 with a sewing thread 53. Moreover, the reinforcing cloths 32 and 33 are sewn together with the reinforcing cloths 30 and 31 to the body side base cloth 28 at the two sewing locations 47 and 48.

The flow regulating cloth 36 is made, like the airbag body 21, of a woven fabric having flexibility such as polyamide or polyester. The flow regulating cloth 36 is provided, as shown in FIGS. 3 and 6, with a generally disc-shaped flow regulating cloth body 37 and two band-shaped tether portions 43 and 43 extending from the right and left sides of the circumference of the flow regulating cloth body 37. The flow regulating cloth body 37 is provided with the opening 37a for communicating with the gas inlet port 23 of the airbag body 21. In the periphery of the opening in the flow regulating cloth body 37, there are formed mounting holes 37b for through which the individual bolts 6a of the retainer 6 are passed. The body 8a of the inflator 8 is inserted upward into the opening 37a.

Moreover, the flow regulating cloth body 37 is provided with the vehicle front-facing joint portion 38 to be joined to the vehicle front-facing wall portion 22 in the vicinity of the gas inlet port 23 of the, and a passenger-facing joint portion 39 to be joined to the passenger-facing wall portion 25. By those joint portions 38 and 39 in the flow regulating cloth body 37, therefore, the wall portion 22 in the vicinity of the gas inlet port 23 in and the passenger-facing wall portion 25 are connected. In the case of the first embodiment, as has been described, the vehicle front-facing vehicle front-facing joint portion 38 is the whole periphery of the opening 37a. This whole periphery of the opening 37a is jointed vehicle front-facing joint portion to the vehicle front-facing wall portion 22, thus serving as the vehicle front-facing joint portion 38 while it is held down by the retainer 6. In the case of the first embodiment, the passenger side joint portion 39 is formed at an annular sewing location 50 surrounding the gas inlet port 23 communicating with the opening 37a. At the sewing location 50 the joint between the vicinity of the outer edge of the circular flow regulating cloth body 37 and the passenger-facing wall portion 25 is formed with these wing thread 53.

In the portion of the flow regulating cloth body 37 between the vehicle front-facing joint portion 38 and the passenger-facing joint portion 39, moreover, there are formed gas outlet ports 40. These gas outlet ports 40 allow the inflating gas discharged from the inflator 8 to flow out into the airbag body 21. The gas outlet ports 40a reopened at the front and rear of the periphery of the opening 37a into rectangles are curved along the circumferential edge of the opening 37a into arcuate shapes.

The flow regulating cloth body 37 breaks at the portion between the vehicle front-facing joint portion 38 and the passenger-facing joint portion 39 when the internal pressure of the airbag body 21 reaches a predetermined level, thus disconnecting the passenger-facing wall portion 25 and the vehicle front-facing wall portion 22. In the case of the first embodiment, roughly arcuate easily torn portions 41 and 41 are arranged between the gas outlet ports 40 and 40 so as to connect the gas outlet ports 40 and 40. Each easily torn portion 41 is formed by perforating the base cloth making the flow regulating cloth body 37. These easily torn portions 41 and 41 are torn when the internal pressure of the airbag body 21 reaches a predetermined level (about 10 to 20 KPa). When each easily torn portion 41 is torn, moreover, the passenger side joint portion 39 and the vehicle front-facing joint portion 38 of the flow regulating cloth body 37 are separated and so disconnect the passenger-facing wall portion 25 and the vehicle front-facing wall portion 22.

The tether portions 43 and 43 are formed into band shapes and are so extended as to protrude in the right and left directions from the circumferential edge of the flow regulating cloth body 37. These tether portions 43 and 43 regulate the inflated shape of the airbag body 21 by regulating the spacing distance of the passenger-facing wall portion 25 from the gas inlet port 23 when the air bag 20 is inflated. Moreover, each tether portion 43 is connected to the vicinity of the gas inlet port 23 by sewing its end portion 43a with the sewing thread 53 to the end portion 31d of the extension portion 31c in the reinforcing cloth 31 which is closer to the vehicle front-facing wall portion 22.

Here will be described manufacture of the airbag 20. First, in the flow regulating cloth 36 the opening 37a, the mounting holes 37b, the gas outlet ports 40 and the easily torn portions 41 are formed. Then, the flow regulating cloth body 37 is sewn at first to the passenger-facing base cloth 29 by means of the sewing thread 53. When sewing, the sewing location 50 (on the passenger side joint portion 39) is annular and on the outer side of the gas outlet ports 40. Then, the reinforcing cloths 30, 31, 32 and 33 are sewn to the vehicle front-facing base cloth 28 by means of these wing thread 53. Here, the openings 28a, 30a, 31a, 32a and 33a are preformed. At this time, the sewn portions 47, 48 and 49 are formed into the three annular shapes at the periphery of the gas inlet port 23. The sewn portion 47 arranged on the inner periphery is formed between the gas inlet port 23 and the mounting holes 24. The sewing locations 48 and 49 arranged on the outer periphery are formed outside the mounting holes 24. Moreover, at the sewing locations 47 and 48 the reinforcing cloths 30, 31, 32 and 33 are sewed to the vehicle front-facing base cloth 28. At the sewing location 49 only the reinforcing cloths 30 and 31 are sewed to the vehicle front-facing base cloth 28.

Next, the vehicle front-facing base cloth 28 and the reinforcing cloths 30, 31, 32 and 33 thus sewn are subjected to boring for the mounting holes 24. Here, the gas inlet port 23 may be formed simultaneously with this boring, and the openings 28a, 30a, 31a, 32a and 33a need not be formed before the sewing operations by forming. Here, the vent holes 28c may be formed either beforehand or simultaneously with the boring.

After this, the vehicle front-facing base cloth 28 and the passenger-facing base cloth 29 are so overlapped that their outer surfaces face each other, and are sewn together at their edges with the sewing thread 53. After these o edges are sewn, the airbag body 21 is inverted by using the gas inlet port 23 so that the sewing lines on the edges do not appear on the outer surface of the airbag 20. After this inversion, moreover, the end portions 31d and 31d of the extension portions 31c and 31c formed in the reinforcing cloth 31 and the end portions 43a and 43a of the tether portions 43 and 43 formed in the flow regulating cloth 36 are individually pulled out from the gas inlet port 23. The corresponding edges 31d and 43a are superposed and sewn together with the sewing thread 53. Moreover, the edges 43a and 43a of the tether portions 43 and 43 are joined through the extension portion 31c, to periphery of the gas inlet port 23.

Then, the airbag device M1 is assembled by using the airbag 20 thus manufactured. First, the airbag 20 is folded. In this embodiment, the retainer 6 is inserted through the openings 23 and 37a into the airbag 20 and is arranged between the passenger side base cloth 29 and the flow regulating cloth body 37. With the individual bolts 6a protruding from the mounting holes 37b and 24, moreover, the airbag 20 is folded through two steps, i.e., longitudinal and lateral folding steps.

Figure 8:
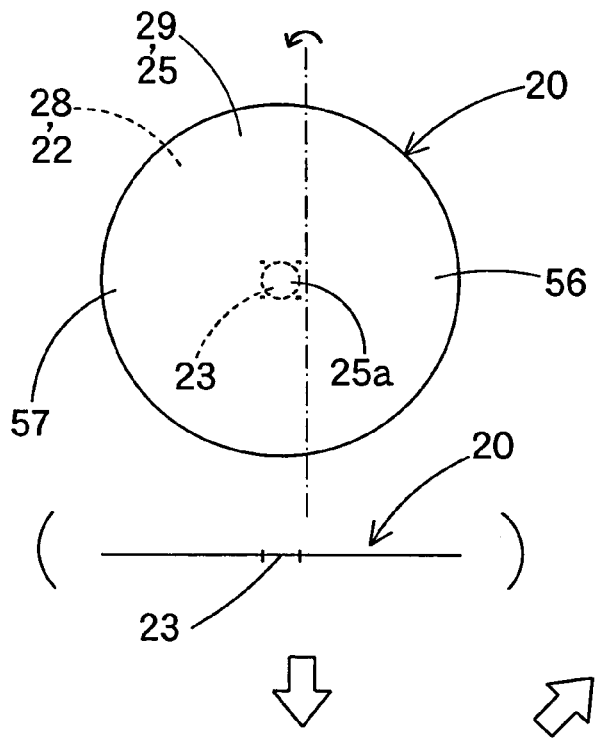
FIGS. 8A to 8D are schematic diagrams showing the steps of folding the airbag of the first embodiment.
Figure 8:
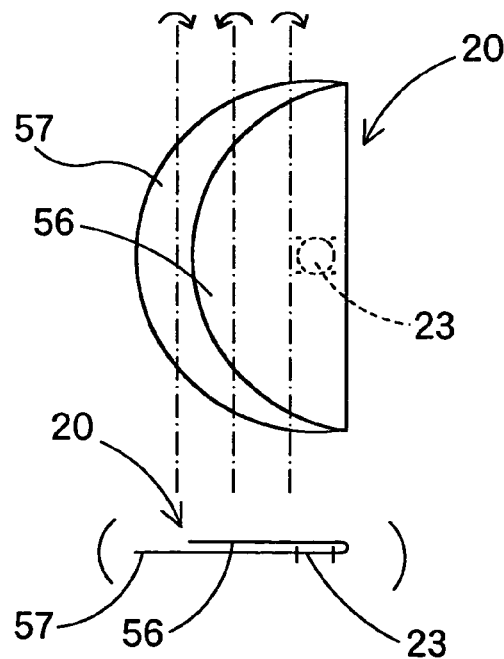
Figure 8:
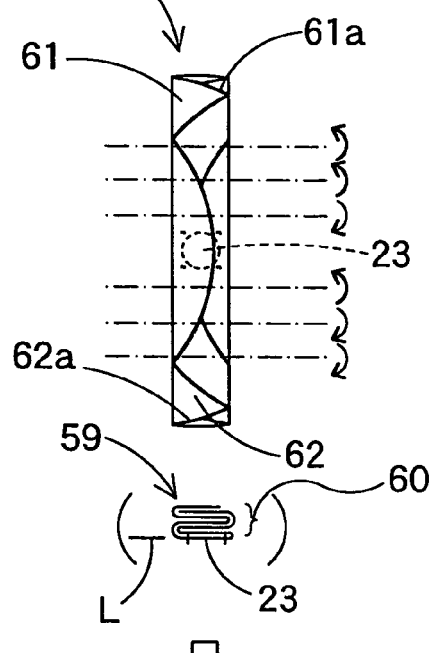
Figure 8:
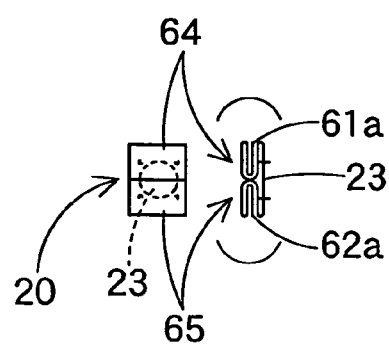

At the first step, specifically, the airbag 20 is spread out, superposing the passenger-facing base cloth 29 on the vehicle front-facing base cloth 28, as shown in FIG. 8A. At this time, a central portion 25a of the passenger-facing wall portion 25 is arranged opposite the gas inlet port 23. Then, the right and left side portions 56 and 57 perpendicular to the inflating gas regulated direction are so folded with longitudinal (front-to-rear) creases as to approach the gas inlet port 23. In this embodiment, the airbag 20 is folded with the longitudinal crease near the gas inlet port 23 so that its right side portion 56 lies on the passenger side base cloth 29. As shown in FIGS. 8B and 8C, moreover, the right portion 56 and the left portion 57 are folded alternately with longitudinal creases to form one folded portion 60 containing the right and left sides both folded into the form of a bellows, thereby completing the longitudinal folding. In short, the right portion 56 and the left portion 57 are folded on each other above the gas inlet port 23, in the direction perpendicular to the opening plane L of the gas inlet port 23. The longitudinally folded airbag 59 at the end of this first stage is elongated in the longitudinal direction, that is, the regulated direction of the inflating gas.

Next, the two longitudinal edge side portions 61 and 62 in the directions of the regulated inflating gas in the airbag 59 folded longitudinally in the first stage are folded with lateral creases so that they approach the gas inlet port 23. In the case of the embodiment, the front most portion 61 and the rear most portion 62 are individually folded back to have their edges 61a and 62a lying on the outside. In short, the front side portion 61 and the rear side portion 62 are folded so as to form two folded portions 64 and 65 adjacent to each other in the longitudinal direction, as shown in FIG. 8D. In the case of the embodiment, moreover, the two folded portions 64 and 65 are folded that they lie on the passenger-facing wall portion 25. This completes the lateral folding of the second stage and thereby completes the airbag 20 folding.

How the folded airbag 20 is housed in the case 10 will now be described. First of all, the individual bolts 6a of the retainer 6 protruding from the folded airbag 20 are passed through the individual mounting holes 12b formed in the holder plate 12 of the bag holder 11, and the airbag 20 is placed on the holder plate 12.

After this, the pad 15 is placed over the airbag 20 and retfixed to the holder plate 12. Moreover, the backup plate 13 is arranged below the holder plate 12, and the pad 15 is held on the bag holder 11 by clamping its side wall portion 17 between the holder plate 12 and the backup plate 13. At this time, the individual bolts 6a of the retainer 6 are passed through the mounting holes 13b formed in the backup plate 13.

After this, the body 8a of the inflator 8 is inserted upward into the insertion holes 12a and 13a of the bag holder 11 and the openings 23 and 37a. Simultaneously with this, the individual bolts 6a of the retainer 6 are protruded downward from the through holes 8d formed in the flange portion 8c of the inflator 8. After this, the nuts 7 are fastened on the individual bolts 6a to attach the airbag 20, the bag holder 11 and the inflator 8 integrally and thereby complete the assembly of the airbag device M1.

With the core 2 of the boss portion B of the steering wheel body 1 being fastened on the steering shaft SS of the vehicle, the not-shown bracket of the bag holder 11 can be used to mount the airbag device M1 in the steering wheel W.

If the inflating gas is discharged from the gas discharge ports 8b of the inflator body 8a after the steering wheel W is mounted on the vehicle, the folded airbag 20 ruptures the pad 15 at the predetermined position and inflates to a large size.

Figure 9:
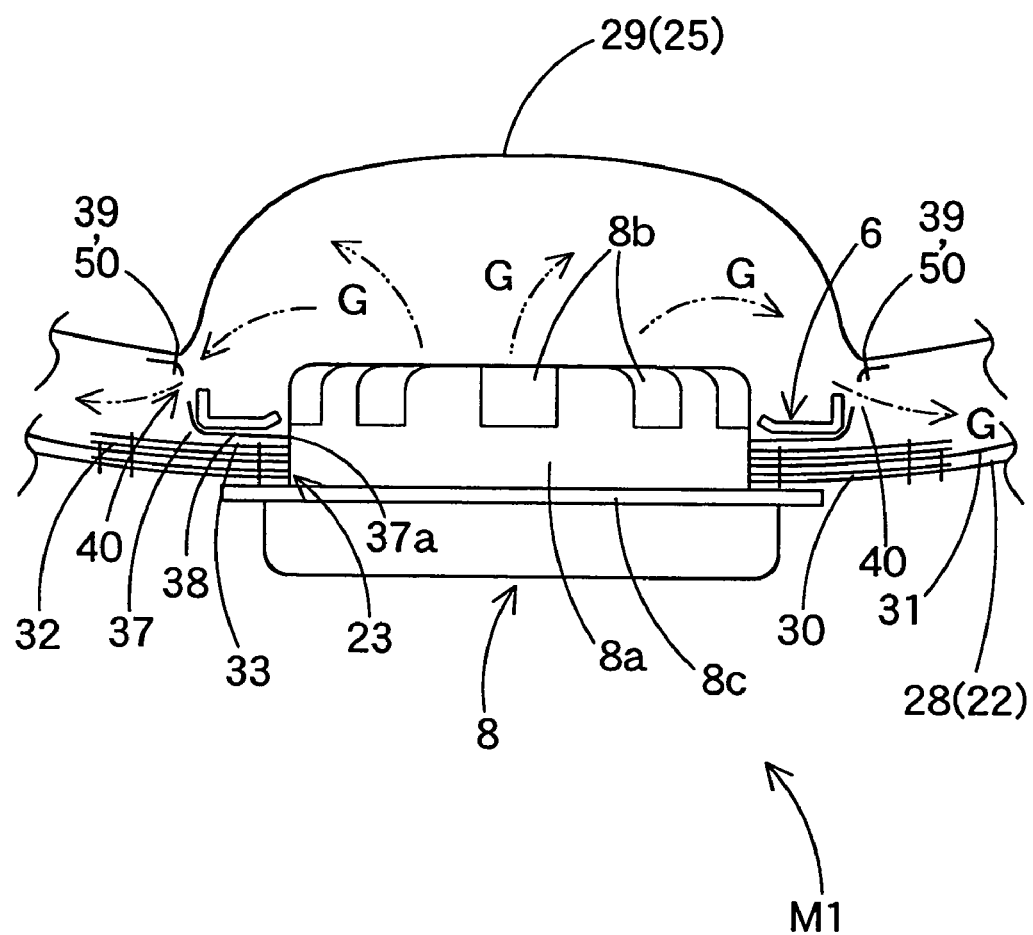
FIG. 9 is a schematic section showing the inflation starting state of the airbag in the airbag device of the first embodiment, the cross section along a line longitudinal to the vehicle.

In the airbag device M1 of the first embodiment at the beginning of this action, the inflating gas G discharged from the gas discharge ports 8b of the inflator body 8a is for a time stored between the passenger-facing wall portion 25 (the passenger side base cloth 29) and the flow regulating cloth body 37 acting as the flow regulating member, as shown in FIG. 9. After this, the inflating gas G is directionally controlled to flow from the gas outlet ports 40 and 40 formed in the flow regulating cloth body 37 into the rearward and forward portions of the airbag body 21.

Figure 10:
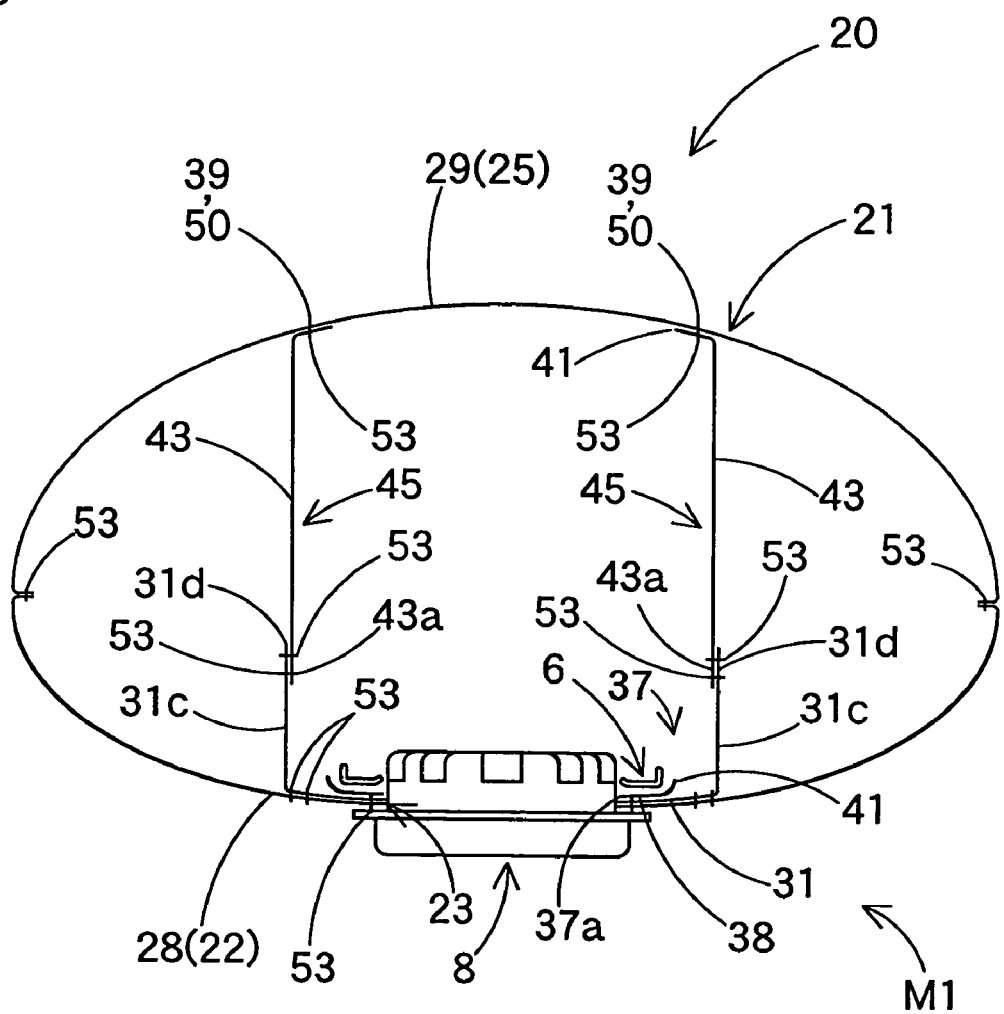
FIG. 10 is a schematic section showing the state of the airbag when inflation is completed in the airbag device of the first embodiment and taken laterally of the vehicle.

When the inflating gas G flows into the airbag body 21 so that the internal pressure of the airbag body 21 reaches a predetermined level, moreover, a predetermined or higher tension is built up between the passenger-facing joint portion 39 and the vehicle front-facing joint portion 38 in the flow regulating cloth body 37 thereby to rupture the easily torn portions 41 and 41. Thus, the passenger-facing wall portion 25 and the vicinity of the gas inlet port 23 are disconnected. The inflating gas G discharged from the gas discharge ports 8b in the body 8a of the inflator 8 then flows radially in all directions from the gas inlet port 23 without being regulated, so that the airbag 20 completes its inflation, as shown in FIG. 10. At this time, the airbag 20 is caused end its inflation with the spacing distance of the passenger-facing wall portion 25 from the gas inlet port 23 regulated by the tethers 45 and 45.

In the airbag device M1 of the first embodiment here described, when activated, the folded and housed airbag 20 is expanded and inflated with the inflow of the inflating gas G being regulated by the flow regulating cloth body 37 using the flow regulating cloth 36 as the flow regulating member, and the regulation of the flow of the inflating gas G into the airbag 20 is ended before the completion of the inflation of the airbag 20 by the breakage of the flow regulating cloth body 37.

In the airbag 20, specifically, the flow of the inflating gas G is regulated from the beginning to a point midway in inflation by the flow regulating cloth body 37. Therefore, the airbag 20 can be inflated widely in the flow directions of the inflating gas G forward and rearward, thereby suppressing any unnecessary protrusion of the passenger-facing wall portion 25 toward the passenger (or driver D). Before the completion of inflation of the airbag 20, moreover, the regulation of the flow of the inflating gas G into the airbag 20 is released by the rupture of the flow regulating cloth body 37. Thereafter, the inflating gas G flows freely into the airbag 20 so that the completion of inflation of the airbag 20 is promoted. As a result, the time period from the beginning to the completion of the inflation of the airbag 20 can be shortened.

In the airbag device M1 of the first embodiment, therefore, it is possible to suppress the protrusion of the airbag 20 toward the passenger D at the beginning of inflation and to shorten the time period from the beginning to the completion of inflation of the airbag 20.

In the case of the first embodiment, moreover, the airbag 20 which has completed inflation is regulated by the tethers 45 and 45 with regard to the distance from the gas inlet port 23 to the portion of the passenger-facing wall portion 25 directly opposite the gas inlet port 23. Therefore, the airbag 20 can be prevented even after the completion of inflation from unnecessarily protruding toward the passenger D.

Figure 11:
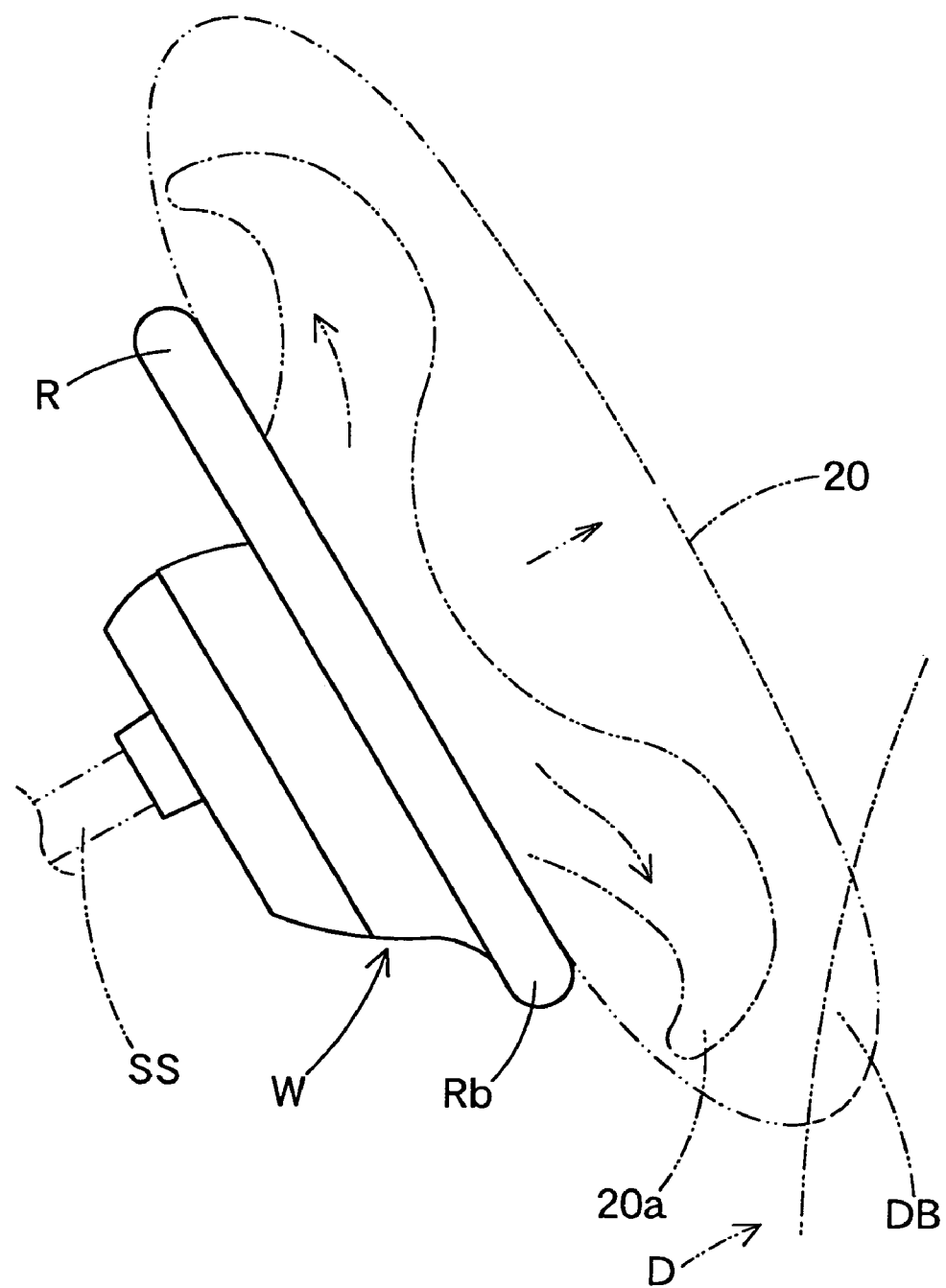
FIG. 11 is a schematic side view showing the inflating procedure of the airbag in the airbag device of the first embodiment.

In the case of the first embodiment, on the other hand, the ring portion R of the steering wheel W is arranged in the plane normal to the steering shaft SS. Moreover, the airbag 20 regulates the flow of the inflating gas G toward the rearward and forward directions perpendicular to the steering shaft SS. As a result, the flow of the inflating gas G is regulated, when the airbag 20 is mounted on the vehicle, to the rearward and forward directions of the vehicle along the plane of the ring portion R of the steering wheel W. Therefore, the rear portion 20a of the airbag 20 can be arranged from the beginning of inflation to inflate toward the rearward portion Rb of the ring portion R of the steering wheel W, while being suppressed in its protrusion toward the passenger D. Even if the driver D is close to the ring portion R, as shown in FIG. 11, the portion 20a of the airbag 20 can easily invade into the narrow gap between the abdomen portion DB of the driver D and the rear portion Rb of the ring portion R of the steering wheel W.

In the first embodiment, moreover, the regulation of the flow of the inflating gas G is ended by the breakage of the flow regulating cloth body 37 itself of the flexible flow regulating cloth 36 arranged in the airbag 20. Therefore, there occurs no needless gas leakage from the airbag 20 which has completed inflation. With the construction in which the flow regulating cloth is sewn to a portion forming the peripheral wall of the airbag by using sewing thread so that the regulation of the gas flow is released by rupturing the sewing thread, the holes of the peripheral wall which were left by the sewing thread are enlarged. Therefore, the inflating gas may leak from those holes. In the first embodiment, however, the ruptures occur at the portion 41 of the flow regulating cloth body 37 removed from vehicle front-facing wall portion 22 and the passenger-facing wall portion 25. Even if the flow regulating cloth body 37 is sewn to the passenger side base cloth 29 of the airbag 20 as in the passenger side joint portion 39, therefore, it is possible to prevent the holes of the base cloth 29, which were left by the sewing thread 53, from becoming larger.

In the case of the first embodiment, moreover, the easily torn portions of the flow regulating cloth body 37 are preformed easily torn portions 41 comprising prearranged slits. Therefore, the flow regulating cloth body 37 can be properly torn. Here in the first embodiment, tearing of the flow regulating cloth body 37 makes use of the tension to be applied to the flow regulating cloth body 37. By using the heat of the inflating gas G, for example, the connecting portions between the slits in the easily torn portions 41 may be molten to rupture the flow regulating member.

In the case of the first embodiment, still moreover, the flow regulating cloth body 37 with the flow regulating cloth 36 as the flow regulating member is provided with the vehicle front-facing joint portion 38 and the passenger-facing joint portion 39. In addition, the flow regulating cloth body 37 connects the passenger-facing wall portion 25 and the vehicle front-facing wall portion 22 at the periphery of the gas inlet port 23 to each other. Before the completion of inflation of the airbag 20, i.e., before the tearing of the easily torn portions 41 between the vehicle front-facing joint portion 38 and the passenger side joint portion 39, therefore, the distance between the vehicle front-facing wall portion 22 at the periphery of the gas inlet port 23 of the and the passenger-facing wall portion 25 can be limited to a small value. As a result, the airbag 20 can prevent the passenger-facing wall portion 25 from unnecessarily protruding toward the passenger D from the beginning to a point midway in inflation regardless of the flow direction of the inflating gas G. Because the tethers 45 and 45 are arranged in the airbag 20, unnecessary protrusion of the passenger-facing wall portion 25 toward the passenger D is prevented, even after completion of the inflation after the breakage of the flow regulating cloth body 37.

Here, the extent of protrusion of the airbag 20 (or the depth of the airbag 20) toward the passenger D at the beginning of inflation can be adjusted since this is the length between the vehicle front-facing joint portion 38 and the passenger side joint portion 39. In case the extent of protrusion at the beginning of inflation is enlarged, for example, the passenger-facing joint portion 39 may be brought closer to the outer circumferential edge of the flow regulating cloth body 37. If the general disc shape of the flow regulating cloth body 37 is enlarged at this time to bring the passenger-facing joint portion 39 closer to its outer circumferential edge, it is possible to enlarge the extent of protrusion of the airbag 20 more at the beginning of inflation. In case the extent of protrusion at the beginning of inflation is to be reduced, on the contrary, the passenger side joint portion 39 may be brought closer to the opening 40 in the case of the first embodiment.

In the first embodiment, moreover, the flow regulating cloth 36 serving as the flow regulating member is formed of a single fabric material extending from the vehicle front-facing joint portion 38 to the passenger-facing joint portion 39. Merely by using the single flow regulating cloth 36, therefore, it is possible to manufacture an airbag 20 which can regulate not only the gas flow at the beginning of inflation but also the extent of protrusion (or the depth of the airbag 20) to the passenger D at the beginning of inflation. In other words, it is possible to manufacture such an airbag 20 conveniently with a reduced number of manufacturing steps and thus lower cost, which can regulate the gas flow at the beginning of inflation and the extent of protrusion (or the depth of the airbag 20) toward the passenger D at the beginning of inflation. If this point however is not a concern, the flow regulating cloth can of course be formed of two fabrics, a member on the side of the vehicle front-facing joint portion 38 and a member on the side of the passenger side joint portion 39.

In the first embodiment, still moreover, the airbag device M1 comprises a case 10 for housing the folded airbag 20, and an annular retainer 6 which can put the airbag 20 in such a state that it is mountable in the case 10 while holding down the inner side of the airbag 20 at the periphery of the gas inlet port 23. Moreover, the vehicle front-facing joint portion 38 of the flow regulating cloth body 37 is joined to the vehicle front-facing wall portion 22 by the retainer 6. In other words, the vehicle front-facing joint portion 38 in the flow regulating cloth body 37 can be joined to the vehicle front-facing wall portion 22 not by using joining means such as the sewing but merely holding it down with the retainer 6. It is, therefore, possible to form the vehicle front-facing joint portion 38 of the flow regulating cloth body 37 easily.

In the first embodiment, moreover, the tether portions 43 and 43 capable of regulating the shape of the airbag 20 at the time of inflation completion are integrated with the flow regulating cloth 36. Therefore, the tethers 45 and 45, which can regulate the shape of the airbag 20 at the time of inflation completion by regulating the distance from the gas inlet port 23 to the passenger-facing wall portion 25, need not be separately attached to the airbag 20. In other words, the end portions of the tethers 45 can be jointed to the passenger-facing wall portion 25 not by separately joining the end portions of the tethers 45 toward the passenger-facing wall portion 25 to the passenger-facing wall portion 25 but merely by jointing the flow regulating cloth body 37 to the passenger-facing wall portion 25. As a result, the airbag 20 having the tethers 45 and 45 can be manufactured with a reduced number of manufacturing steps and at lowered cost.

Especially in the case of the first embodiment, the reinforcing cloth 31 sewn to the vehicle front-facing wall portion 22 is provided with the extension portions 31c, and the end portions 43a of each tether portion 43 pointed toward the the vehicle front-facing wall portion 22 are joined to the vehicle front-facing wall portion 22 by sewing them to the extension portions 31c. Even if the passenger-facing joint portion 39 of the flow regulating cloth 36 is sewn to the passenger-facing wall portion 25. Even if the reinforcing cloth 31 which is provided with the extension portions 31c is sewed to the vehicle front-facing wall portion 22, therefore, the end portions 43a of the tether portions 43 and the extension portions 31c can be pulled out through the gas inlet port 23 to the outside of the airbag 20 and then can be easily sewn to each other. As a result, the tethers 45 can be easily formed.

Even if the above-specified features are not incorporated, the end portions 43a of the individual tether portions 43 may be joined or sewn directly to the vicinity of the outer circumferential edge of the reinforcing cloth 33 in lieu of forming the extension portions 31c at the reinforcing cloth 31 which is closer to the vehicle front-facing wall portion 22. Alternatively, the tethers 45 may be constructed not by forming the individual tether portions 43 but by extending the extension portions 31c further and by jointing or sewing their leading edges to the passenger-facing wall portion 25.

In the airbag device M1 of the first embodiment, on the other hand, the airbag 20 is folded in the first and second stages so that it can carry out the following actions. At the beginning of inflation of the airbag 20, specifically, the portion 25a of the passenger-facing wall portion 25 directly opposite the gas inlet port 23 is raised by the inflating gas. However, the airbag 20 is folded in the first stage tin to one folded portion 60 in which the right portion 56 and the left portion 57 generally perpendicular to the regulated direction of the inflating gas are superposed on each other. Therefore, the folded portion 60 at the first step is not expanded to eliminate the creases but raised together with the portion 25a of the passenger-facing wall portion 25 directly opposite the gas inlet port 23, and tends to maintain its folded state. This is because friction is generated with movement of the folded portion 60 by the mutual contact of the surfaces of the folded right and left portions 56 and 57 of the first step, which constitutes resistance to the unfolding. Then, the inflating gas is caused by the gas outlet ports 40 and 40 of the flow regulating cloth 36 to flow in the regulated direction into the airbag 20. Therefore, the airbag 20 is so expanded at first in the regulated direction of the inflating gas as to unfold the folded portions 64 and 65 folded in the second stage. After this, the airbag 20 is inflated to unfold the folded portion 60 of the first stage thereby to complete the inflation. In the airbag device M1 of the first embodiment, more specifically, the folded portions 64 and 65 folded in the second stage are expanded widely and quickly in the regulated direction of the inflating gas in the airbag 20, and then the portions 56 and 57 in the right and left directions perpendicular to the inflow direction for the inflating gas are expanded to complete the inflation.

In the airbag device M1 of the first embodiment, therefore, the flow regulating effect of the inflating gas by the flow regulating cloth 36 arranged in the airbag body 21 can be enhanced so that the airbag 20 expands widely and quickly at the beginning of inflation in the regulated direction of the inflating gas.

If the area of the passenger-facing wall portion 25 directly opposite the gas inlet port 23 protrudes a great deal toward the driver at the time of inflation of the airbag 20, the portions 41 and 41 break to disconnect the passenger-facing wall portion 25 and the vicinity of the gas inlet port 23. In the airbag 20 in the airbag device M1 of the first embodiment, however, the portion 25a of the passenger-facing wall portion 25 directly opposite the gas inlet port 23 is prevented at the beginning of inflation from greatly protruding by the folded portion 60 of the first stage. When the airbag 20 is widely expanded in the regulated direction of the inflating gas, therefore, the portions 41 and 41 of the flow regulating cloth 36 are broken. Even if the flow regulating cloth 36 is provided with the easily torn portions 41, these portions 41 are not torn before breakage is necessary.

In the airbag device M1 of the first embodiment, moreover, at the beginning of inflation of the airbag 20, the portion 25a of the passenger-facing wall portion 25 directly opposite the gas inlet port 23 is raised by the inflating gas when this gas flows in. Then, the two folded portions 64 and 65 of the second stage are expanded away from each other. This is because the two folded portions 64 and 65 are folded toward each other along the regulated directions of the inflating gas. Thus, these two folded portions 64 and 65 are quickly unfolded without interfering with each other. Therefore, it is possible to undo the folded state of the second stage in the airbag 20. As a result, the airbag 20 can be expanded more quickly.

Figure 12:
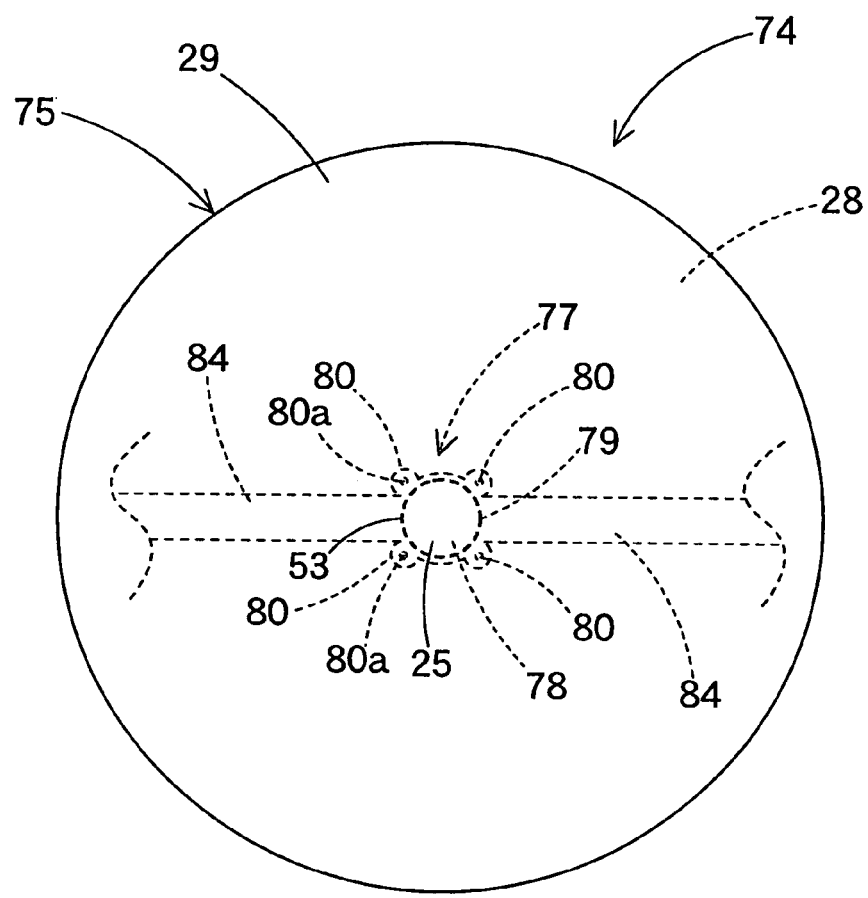
FIG. 12 is a top plan view of the expanded state in an airbag of a second embodiment.

In the first embodiment, the body 37 of the flow regulating cloth 36 is provided with the opening 37a communicating with the gas inlet port 23, and the periphery of the opening 37a is joined to the vehicle front-facing wall portion 22. However, an airbag 74 of the airbag device M2 shown in FIGS. 12 to 14 may be constructed such that a flow regulating cloth body 78 covers the gas inlet port 23.

This airbag 74 is provided for the steering wheel and comprises an airbag body 75 and a flow regulating cloth 77 acting as the flow regulating member for regulating the flow direction of the inflating gas into the airbag body 75. This airbag body 75 has a construction similar to that of the airbag body 21 in the aforementioned airbag 20 so that its description will be simplified by designating the same individual portions with the same reference numerals.

Figure 13:
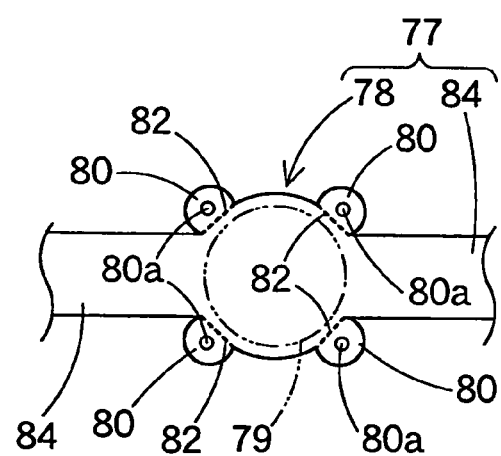
FIG. 13 is a top plan view of a flow regulating member in the airbag of the second embodiment.
Figure 14:
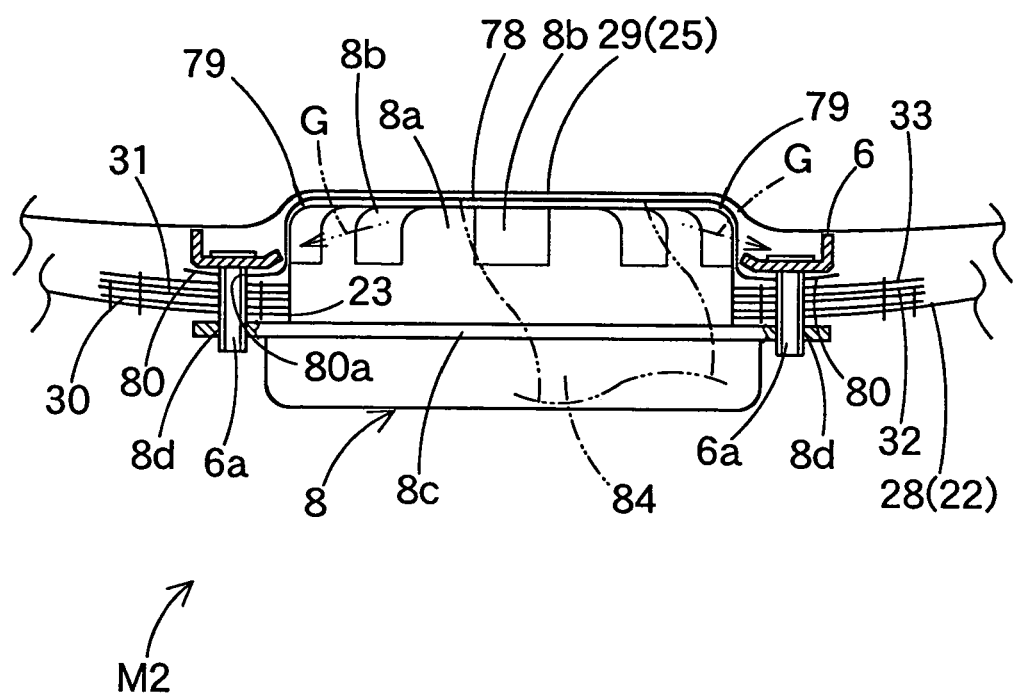
FIG. 14 is a schematic section showing the vicinity of an opening of the airbag of the second embodiment.

The flow regulating cloth 77 is provided, as shown in FIG. 13, with the generally disc-shaped flow regulating cloth body 78 and band-shaped tether portions 84 and 84 formed to protrude from the edge of the body 78 at the right and left. The flow regulating cloth body 78 is provided with an annular passenger-facing joint portion 79 arranged near the flow regulating cloth body's outer edge. The passenger-facing joint portion 79 is joined to the passenger-facing wall portion 25 by sewing it to the passenger side base cloth 28 comprising the passenger-facing wall portion 25. In the flow regulating cloth body 78, moreover, connecting member portions 80 formed to protrude outward from the edge are arranged at four locations radially at equal intervals. In each of the connecting member portions 80, there is formed a mounting hole 80a through which the bolt 6a of the retainer 6 passes. In the airbag 74 of the embodiment, as shown in FIG. 14, the retainer 6 is arranged on the upper sides of the connecting member portions 80. By mounting and fixing the connecting member portions 80 as well as the vehicle front-facing wall portion 22 on the bag holder 11 by means of the retainer 6, moreover, the flow regulating cloth body 78 is joined to the vehicle front-facing wall portion 22 at the periphery of the gas inlet port 23. In other words, the individual connecting member portions 80 comprise the vehicle front-facing joint portion 80 which is retained by the retainer 6 and jointed to the vehicle front-facing wall portion 22. Moreover, the inner portions of the individual connecting member portions 80 in the flow regulating cloth body 78 cover the gas inlet port 23 and cover the upper face side of the inflator body 8a when the inflator 8 is mounted and fixed. In the boundaries between the individual connecting member portions 80 and the flow regulating cloth body 78, moreover, there are arranged easily torn portions 82 which are constructed by forming slits or perforations, as shown in FIG. 13. The tether portions 84 and 84 are sewn at their end portions, as the tether portions 43 in the aforementioned flow regulating cloth 36, to the end portions 31d and 31d of the extension portions 31c and 31c in the reinforcing cloth 31.

In the airbag device M2 using the airbag 74 thus constructed, the upper side of the inflator body 8a is covered with the body 78 of the flow regulating cloth 77, and the passenger-facing wall portion 25 is arranged in the vicinity of the inflator 8 by sewing the passenger side base cloth 29 and the body 78. As a result, the inflating gas G flows, when discharged from the gas discharge ports 8b of the inflator body 8a, from the body 78 along the passenger side base cloth 29 into the airbag body 75, as shown in FIG. 14. When the internal pressure of the airbag body 75 reaches a predetermined level, moreover, the individual easily torn portions 82 formed between the individual connecting member portions 80 and the body 78 are torn, which disconnects the passenger-facing wall portion 25 and the periphery of the gas inlet port 23, and the airbag body 75 then completes its inflation. In other words, even with the airbag 74 being thus constructed, too, the inflow direction of the inflating gas G can be controlled by the single flow regulating cloth 77, and the depth of the airbag 74 at the beginning of inflation can be controlled to regulate the protrusion of the passenger side base cloth 29 toward the passenger by the single flow regulating cloth 77. Moreover, the airbag 74 is regulated in shape of inflation completion by the tether portions 84 so that the protrusion of the passenger side base cloth 29 toward the passenger can be regulated even when inflation is completed.

In this airbag 74, moreover, the body 78 of the flow regulating cloth 77 is arranged to cover the gas inlet port 23 and the body 8a of the inflator 8. Therefore, the flow regulating cloth body 78 can protect the area of the passenger-facing wall portion 25 directly opposite the gas inlet port 23, against the inflating gas G.

Here, the first and second embodiments of the airbag invention M1 and M2 for the steering wheel. As shown in FIGS. 15 to 18, however, the invention may also be applied to an airbag device M3 for a passenger's seat according to a third embodiment. This airbag device M3 is arranged in an instrument panel (hereafter abbreviated "panel") in front of the passenger's seat.

This airbag device M3 is provided, as shown in FIG. 17A, with a folded airbag 100, an inflator 94 for feeding the airbag 100 with the inflating gas, a cover member 98 for covering the folded airbag 100, and a case 92. This case 92 houses the folded airbag 100 and the inflator 94 and holds the cover member 98.

The case 92 is formed of a sheet metal into a generally rectangular shape and is provided with a bag housing portion 92a on its upper side and an inflator housing portion 92c on its lower side. The bag housing portion 92a houses the folded airbag 100. The inflator housing portion 92c houses the inflator 94. A step portion 92b is formed in the bottom portion of the bag housing portion 92a. Moreover, the airbag 100 is mounted and fixed on the step portion 92b by having the periphery of the later-described gas inlet port 102a of the airbag held down by a retainer 96. In the inflator housing portion 92c, there is formed a mounting portion 92d to which nuts are fixed for mounting this housing on the vehicle body.

The cover member 98 is made of a synthetic resin and is so arranged and fixed on the case 92 as to close the opening 90a of the panel 90. The cover member 98 is provided with two door portions 98a, which are opened forward and rearward respectively when the airbag 100 is inflated.

The airbag 100 is provided with an airbag body 101 and a flow regulating cloth 113 acting as the flow regulating member. Both the airbag body 101 and the flow regulating cloth 113 are formed of a woven fabric having flexibility such as polyamide or polyester.

Figure 15:
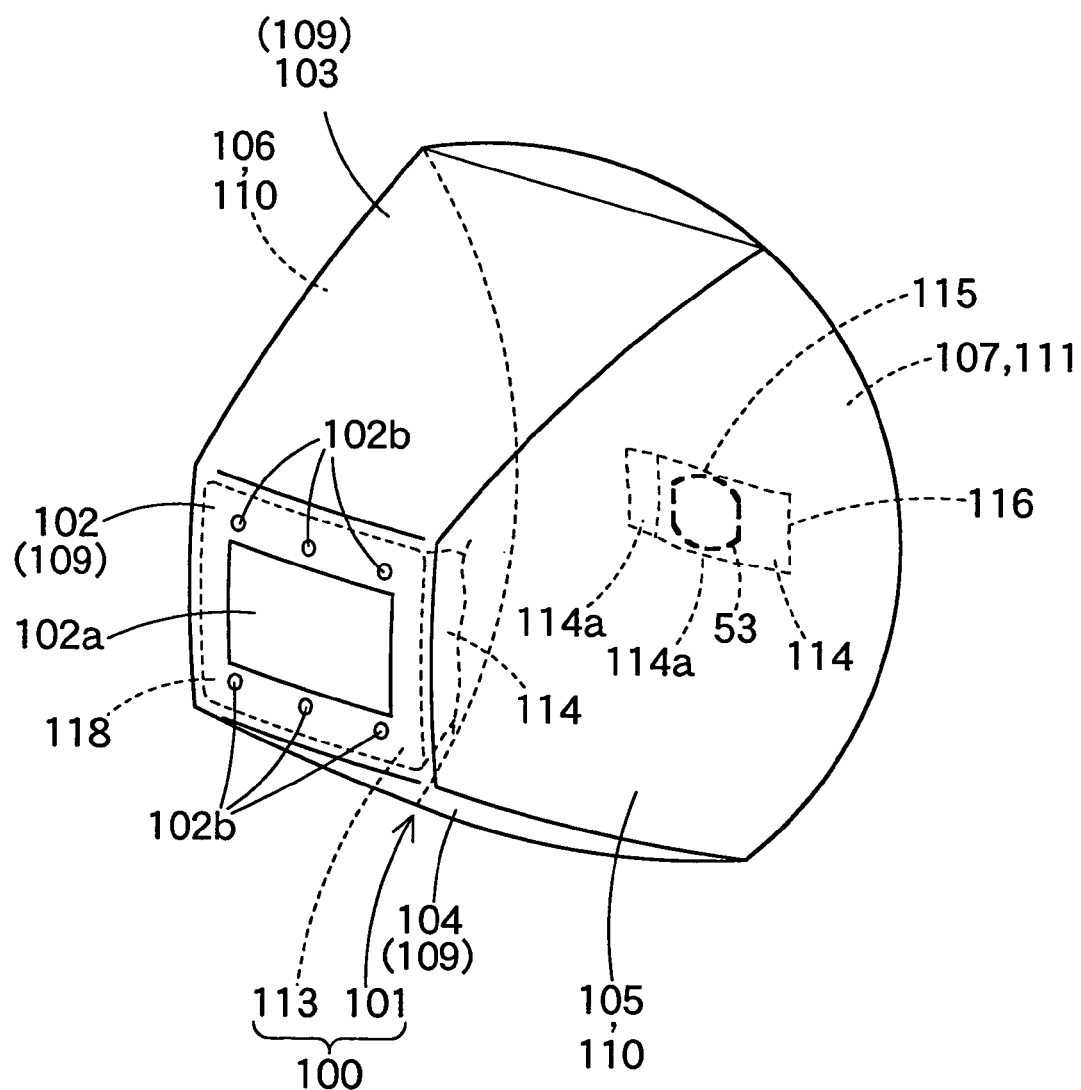
FIG. 15 is a perspective view showing an airbag in an airbag device of a third embodiment when inflation is completed.
Figure 16:
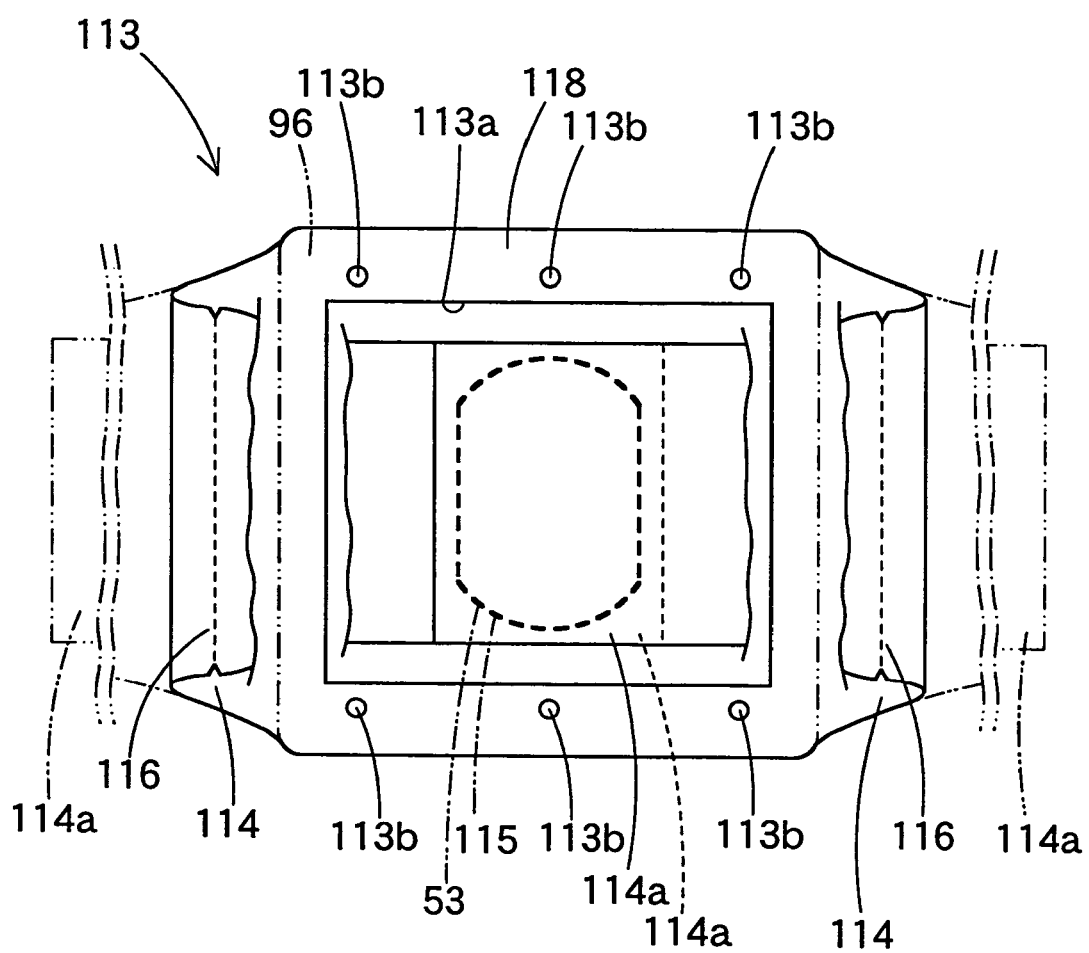
FIG. 16 is a partially broken top plan view of a flow regulating cloth to be used in the airbag of the third embodiment.

The airbag body 101 comprises, as shown in FIG. 15, a vehicle front-facing wall portion 102, an upper wall portion 103, a lower wall portion 104, a passenger-facing wall portion 107, and right and left side wall portions 105 and 106. The vehicle front-facing wall portion 102 is provided with the gas inlet port 102a, which is opened generally in a rectangular shape for the inflating gas to flow in. The upper wall portion 103 extends from the upper edge of the vehicle front-facing wall portion 102 toward the passenger. The lower wall portion 104 extends from the lower edge of the vehicle front-facing wall portion 102 toward the passenger. The passenger-facing wall portion 107 is connected to the passenger facing ends of the upper wall portion 103 and the lower wall portion 104 and is arranged to be directly opposite the gas inlet port 102a. In the periphery of the gas inlet port 102a of the vehicle front-facing wall portion 102, there are formed mounting holes 102b through which are passed a plurality of bolts 96a (as referred to FIG. 17) extending from the retainer 96. Moreover, the airbag body 101 of the third embodiment comprises four base cloths of three shapes 109, 110, 110 and 111, that is: the first base cloth 109 forming the upper wall portion 103, the vehicle front-facing wall portion 102 and the lower wall portion 104; the two second base cloths 110 forming the right and left side wall portions 105 and 106 individually; and the third base cloth 111 forming the passenger-facing wall portion 107.

The flow regulating cloth 113 as the flow regulating member is provided with a rectangular opening 113a for communicating with the gas inlet port 102a. On the periphery of the opening 113a in the flow regulating cloth 113, there are arranged flow regulating band members 114 and 114 extending along the right and left sides of the flow regulating cloth. Moreover, the flow regulating bands 114 are superposed at their two end portions 114a and this superposed area is sewn to the passenger-facing wall portion 107 by means of the sewing thread 53. In other words, the leading end portions 114a of the flow regulating band members 114 are sewn to form a passenger side joint portion 115 to be jointed to the passenger-facing wall portion 107. In the periphery of the opening 113a, there are formed a plurality of mounting holes 113b through which are passed the individual bolts 96a of the retainer 96. Moreover, the periphery of the opening 113a serves as the vehicle front-facing joint portion 118, which is held down by the retainer 96 and jointed to the vehicle front-facing wall portion 102. In each band member 114, moreover, easily torn portions 116 are formed by arraying a plurality of slits.

This flow regulating cloth 113 is sewn in advance to the third base cloth 111 at the superposing end portions 114a of the band members 114 and 114. Then, the edges of the individual base cloths 109, 110 and 111 are sewn to one another to manufacture the airbag 100. Next, the retainer 96 is arranged in the airbag 100, and the individual bolts 96a are passed through the mounting holes 113b of the flow regulating cloth 113 and the mounting holes 102b of the vehicle front-facing wall portion 102. In this state, moreover, the airbag 100 is folded and is housed in the bag housing portion 92a of the case 92 having the inflator 94 housed therein. At this time, the individual bolts 96a of the retainer 96 are protruded from the step portion 92b of the case 92, and nuts are fastened on the individual bolts 96a. As a result, the vehicle front-facing joint portion 118 of the flow regulating cloth 113 can be jointed to the vehicle front-facing wall portion 102 of the airbag body 101, and the airbag 100 can be held in the case 92.

The inflator 94 and the airbag 100 are housed in the case 92, and the cover member 98 is mounted on the case 92. After this, the case 92 is mounted and fixed on the vehicle so that the airbag device M3 can be mounted on the vehicle. If the inflator 94 is activated, moreover, the folded airbag 100 is so inflated as to push and open the door portions 98a and 98a of the cover member 98 and to protrude from the opening 90a of the panel 90, as shown in FIGS. 17A and 17B.

At this time, the inflating gas G is regulated in its flow toward the front and rear of the vehicle by the right and left flow regulating band members 114 and 114 of the flow regulating cloth 113 between the vehicle front-facing joint portion 118 and the passenger side joint portion 115. Thereafter, the airbag 100 is inflated along the outer surface of the panel 90 to the front and rear of the vehicle. At this time, it is natural that the individual flow regulating band members 114 of the flow regulating cloth 113 serve to regulate the spacing distance of the passenger-facing wall portion 107 from the gas inlet port 102a through their vehicle front-facing joint portions 118 and the passenger side joint portion 115. Therefore, the airbag 100 can be prevented from unnecessarily protruding to the passenger (or the passenger on the front passenger seat).

Figure 18:
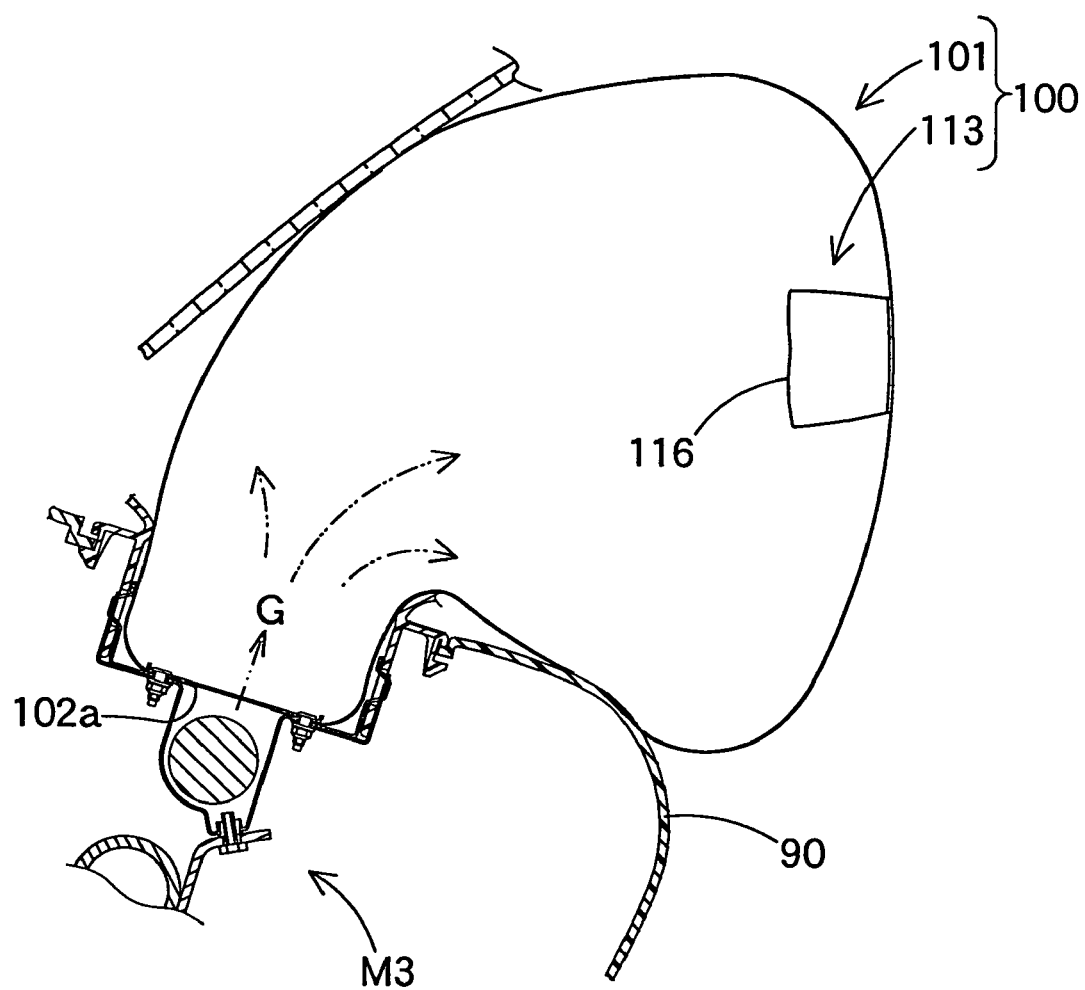
FIG. 18 is a schematic section of the airbag in the airbag device of the third embodiment when inflation is completed.

If the individual flow regulating band members 114 are torn at easily torn portions 116, moreover, the airbag 100 can complete its inflation while allowing the inflating gas G to freely flow in from the gas inlet port 102a without being regulated, as shown in FIG. 18.

Here in this airbag device M3 for the front passenger's seat, the passenger side joint portion 115 of the flow regulating cloth 113 is arranged to close the gas inlet port 102a of the airbag body 101. As in the flow regulating cloth body 37 of the airbag device M1 of the first embodiment, however, the flow regulating cloth near the opening 113a may be enlarged and made to serve as the passenger-facing wall portion 107 so that the passenger side joint portion 115 does not close the gas inlet port 102a. Here, as with the airbag device M1, the gas outlet ports are arranged between the vehicle front-facing joint portion 118 and the passenger side joint portion 115.

In the airbag 100 of the third embodiment, moreover, the end portions 114a of the individual flow regulating band members 114 of the flow regulating cloth 113 are jointed to the passenger-facing wall portion 107. However, the end portions 114a need not be jointed to the passenger-facing wall portion 107 but may be sewn to each other. In this modification, the passenger side joint portion 115 is not provided, but the flow of the inflating gas G from the gas inlet port 102a can be regulated by the flow regulating band members 114 and 114 which are arranged to close the gas inlet port 102a. If the easily torn portions 116 are torn before the completion of inflation, moreover, it is possible to promote the completion of inflation of the airbag.

Here will be described an airbag device M4 capable of achieving the third object of the invention.

The airbag device M4 of the fourth embodiment is provided for the steering wheel like the foregoing airbag devices M1 and M2, and has a construction similar to that of the aforementioned airbag device M1 excepting the airbag 220. Therefore, common members are given the same reference numerals.

Figure 19:
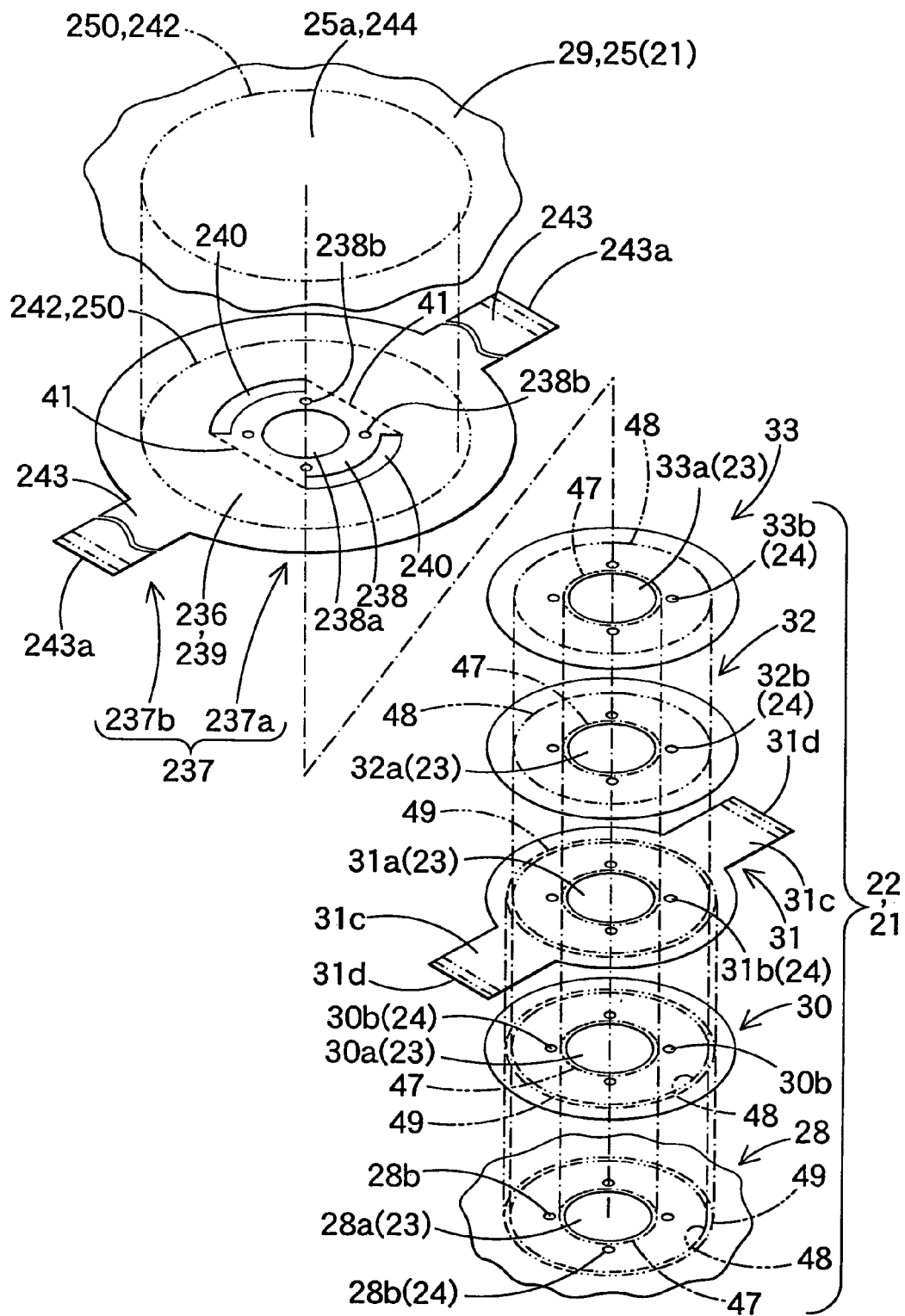
FIG. 19 is a schematic exploded perspective view showing component members at the time of manufacturing an airbag in an airbag device of a fourth embodiment.
Figure 20:
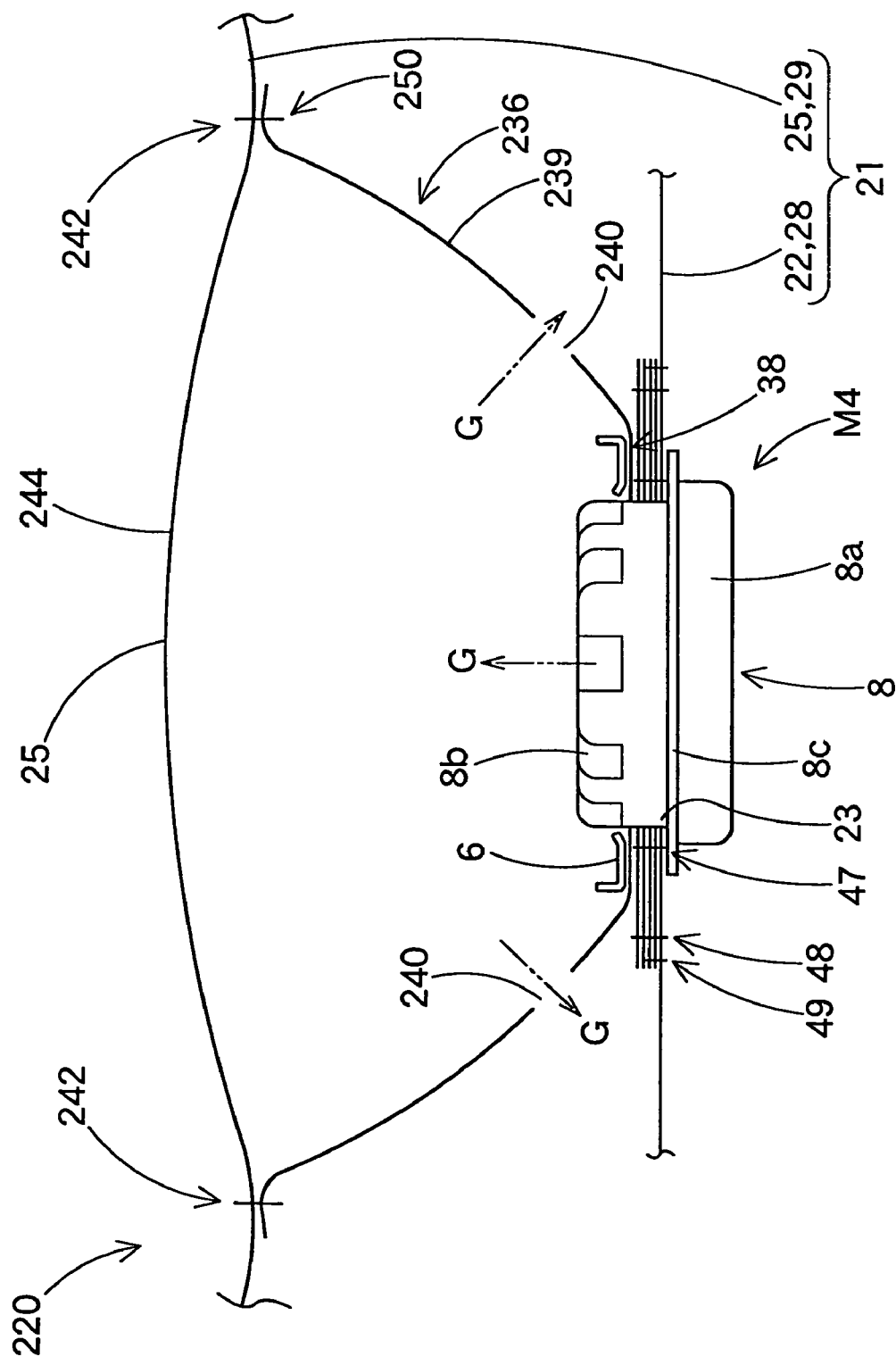
FIG. 20 is a schematic section showing the inflation starting state of the airbag in the airbag device of the fourth embodiment, the cross section taken along a line longitudinal to the vehicle.
Figure 21:
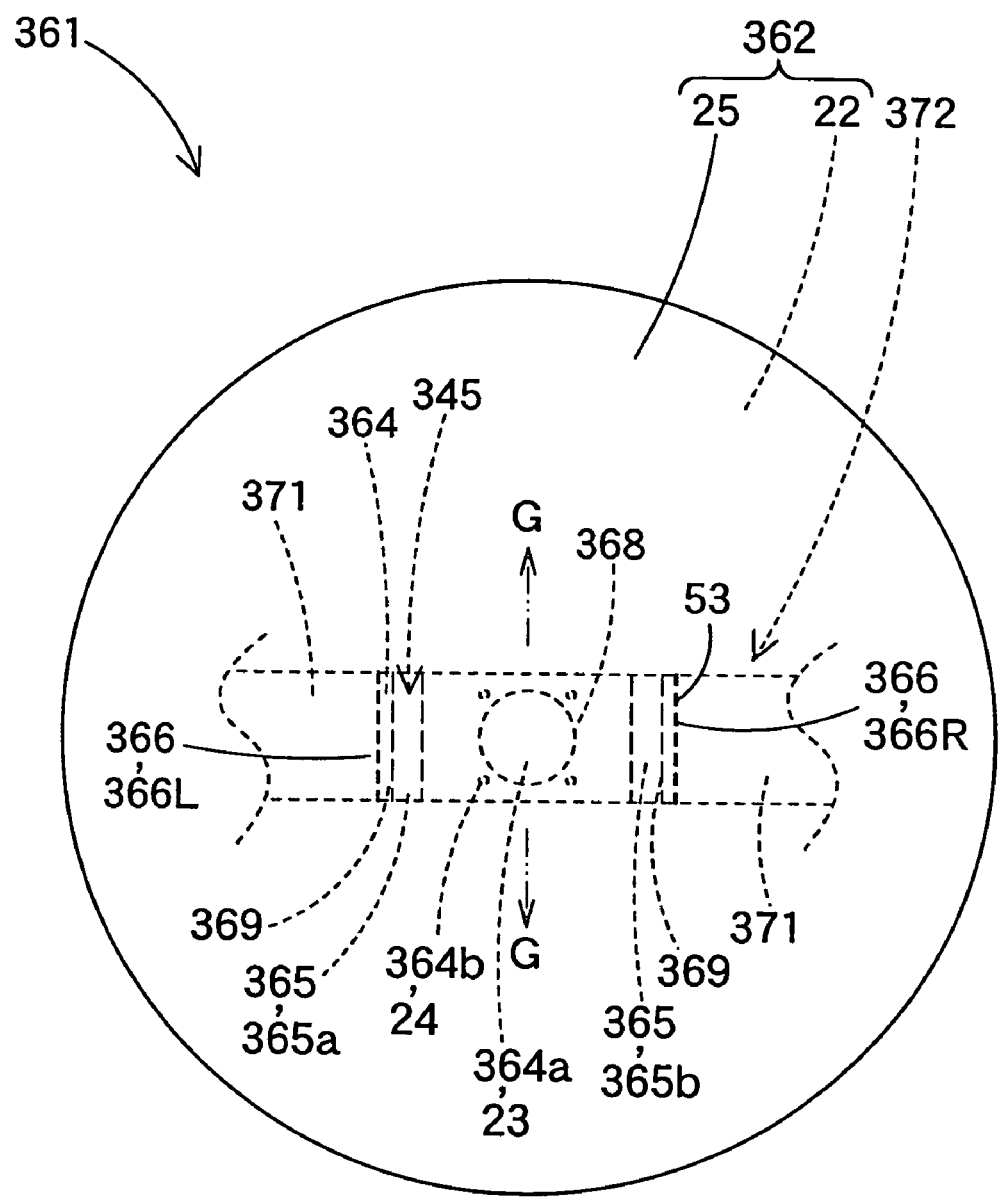
FIG. 21 is a top plan view of the expanded state of an airbag in an airbag device of a fifth embodiment.

The airbag 220 is provided with an airbag body 221 and an auxiliary inflation portion 236 to be arranged in the airbag body 221, as shown in FIGS. 19 and 20. Here, the airbag body 221 has a construction similar to that of the airbag body 21 of the airbag 20 in the foregoing airbag device M1. Therefore, the description will be omitted by designating the common members by the common reference numerals.

The auxiliary inflation portion 236 is formed of an inflation portion cloth member 237 made of a woven fabric having flexibility such as polyamide or polyester, as in the airbag body 221. This inflation portion cloth member 237 is provided, as shown in FIG. 19, with a generally disc-shaped flat plate portion 237a, and band-shaped portions 237b and 237b extending in a band shape from the flat plate portion 237a to the right and left. The individual band-shaped portions serve as tethers 243.

Toward the center of the flat plate portion 237a, moreover, there is arranged a vehicle front-facing joint portion 238 to be joined to the vehicle front-facing wall portion 22 in the airbag body 221. At the center of the vehicle front-facing joint portion 238, there is formed an opening 238a for communicating with the gas inlet port 23 of the airbag body 221. In the periphery of the opening 238a, moreover, there are formed four mounting holes 238b through which will be passed the individual bolts 6a of the retainer 6. The body 8a of the inflator 8 is inserted upward into the opening 238a like the opening 37a of the airbag 20 in the aforementioned airbag device M1. Moreover, the whole periphery of the opening 238a is joined by being held down by the retainer 6 to the vehicle front-facing wall portion 22 and thus becomes the vehicle front-facing joint portion 238.

Toward the outer circumference of the flat plate portion 237a, there is arranged a passenger side joint portion 242 to be sewn and jointed to the passenger-facing wall portion 25 by means of the sewing thread 53. A sewing location 250 at which to the passenger side joint portion 242 is in an annular shape around the gas inlet port 23. Moreover, the sewing location 250 is arranged to surround the portion 25a of the passenger-facing wall portion 25 directly opposite the gas inlet port 23. This passenger side joint portion 242 is formed toward the outer circumference of the flat plate portion 237a of the single inflation portion cloth member 237. Specifically, the passenger side joint portion 242 is arranged around both the gas inlet port 23 and the vehicle front-facing joint portion 238 formed near the center of the flat plate portion 237a. Here in the case of the fourth embodiment, the sewing location 250 is sized to have an external diameter of 300 mm, and the passenger-facing wall portion 25 is sized to have an external diameter of 680 mm when expanded flat.

Between the vehicle front-facing joint portion 238 in the flat plate portion 237a and the passenger side joint portion 242, moreover, there is formed a cylindrical wall portion 239 which forms the circumferential wall when the auxiliary inflation portion 236 is inflated. Here in the auxiliary inflation portion 236 at the time of inflation completion, as shown in FIG. 20, the circumferential wall portion 239 rises to form a downward tapering tubular shape joined at the bottom to the annular-shaped vehicle front-facing joint portion 238 on the periphery of the gas inlet port 23. On the other hand, the passenger side ceiling wall portion 244 of the auxiliary inflation portion 236 is formed of the portion 25a of the passenger-facing wall portion 25 directly opposite the gas inlet. Moreover, the tapering tubular circumferential wall portion 239 forms the partition with the airbag body 221.

In this circumferential wall portion 239, there are formed gas outlet ports 240 and the easily torn portions 41. The gas outlet ports 240 and the easily torn portions 41 have constructions similar to those of the gas outlet ports 40 and the easily torn portions 41, as arranged in the airbag 20 of the aforementioned airbag device M1, and their description will be omitted. Here, the areas of openings of the gas outlet ports 240 and 240 in the airbag 220 of the fourth embodiment are set at such a size as can reserve the inflow of the inflating gas once and can retain the internal pressure for the cushioning action even at a low temperature. When the portions 41 are ruptured, moreover, the portions between the vehicle front-facing joint portion 238 and the passenger side joint portion 242 are broken to end the inflated state of the auxiliary inflation portion 236.

The tethers 243 and 243 are formed from the right and left side band-shaped portions 237b of the inflation portion cloth member 237, as has been described. Moreover, the individual tethers 243 are joined by sewing their end portions 243a to the end portions 31d of the extension portions 31c in the reinforcing cloth 31 on the side of the vehicle front-facing wall portion 22 by means of the sewing thread 53, thereby being brought closer to the gas inlet port 23. Moreover, the tethers 243 and 243 regulate the spacing distance of the portion 25a of the passenger-facing wall portion 25 directly opposite the gas inlet port 23 from the gas inlet port 23 by regulating the shape of the airbag body 221 when inflation is completed. Here, the spacing distance from the gas inlet port 23 to the directly opposite portion 25a by the tethers 243 is set longer than that at the time of regulation of the circumferential wall portion 238.

The airbag 220 of the fourth embodiment can be manufactured like the airbag 20 in the airbag device M1 of the first embodiment. Moreover, the airbag 220 can be folded and mounted on the vehicle like the airbag 20 in the airbag device M1.

At the beginning of the operation of the airbag device M4, moreover, the inflating gas G discharged from the gas discharge ports 8b of the inflator body 8a fills first the auxiliary inflation portion 236 surrounded by the vehicle front-facing joint portion 238, the circumferential wall portion 239 and the ceiling wall portion 244, as shown in FIG. 20, to inflate the auxiliary inflation portion 236. Simultaneously with this, the inflating gas G flows from the gas outlet ports 240 and 240 into the airbag body 221 in the forward and rearward directions.

When the inflating gas G flows into the airbag body 221 so that the internal pressure of the airbag body 221 reaches a predetermined level, moreover, a predetermined or higher tension is built up between the passenger side joint portion 242 and the vehicle front-facing joint portion 238 within the cylindrical wall portion 239 so that the easily torn portions 41 and 41 are torn to disconnect the passenger-facing wall portion 25 and the vicinity of the gas inlet port 23. Thereafter, the inflating gas G from the gas discharge port 8b in the body 8a of the inflator 8 flows radially from the gas inlet port 23 without being directionally regulated, so that the airbag body 221 completes its inflation. At this time, the airbag body 221 completes the inflation with the interval between the portion 25a of the passenger-facing wall portion 25 directly opposite the gas inlet port and the gas inlet port 23 regulated by the tethers 243 and 243.

In the fourth embodiment, as described above, at the beginning of expansion of the airbag 220, the auxiliary inflation portion 236 completes its inflation while causing the inflating gas G to flow out from the gas outlet ports 240 and 240 to the airbag body 221, as shown in FIG. 20. Although the entering inflating gas G has a smaller volume at a low temperature at this time, the gas outlet ports 240 and 240 are not excessively wide, so that the amount of flow of the inflating gas G out into the airbag body 221 is small. Therefore, the auxiliary inflation portion 236 can raise the internal pressure and can inflate to retain the cushioning action thereby to protect the passenger (or the driver).

After this, the auxiliary inflation portion 236 ends its inflated state by breaking at the portions 41 and 41 which are removed from both the vehicle front-facing wall portion 22 and the passenger-facing wall portion 25 comprising the outer wall of the airbag body 221. From this partially inflated state in which the inflating gas G from the gas outlet port 23 has already been admitted, the airbag body 221 completes the inflation, by further admitting the inflating gas G smoothly and promptly. At the time of this end of regulation of inflation, the auxiliary inflation portion 236 is broken at the easily torn portions 41 removed from the outer wall of the airbag body 221. Therefore, the airbag body 221 can complete its inflation without affecting the sewing location 250, although the passenger side joint portion 242 of the auxiliary inflation portion 236 is joined by sewing to the passenger-facing wall portion 25 of the airbag body 221.

In other words, the airbag 220 can be conveniently manufactured without the need to apply a seal material to the joint portions 238 and 242 joining the auxiliary inflation portion 236 and the airbag body 221.

In the airbag device M4 of the fourth embodiment in which the auxiliary inflation portion 236 capable of protecting the passenger (or the driver) at a low temperature is arranged in the airbag 220, therefore, the unnecessary gas leakage from the airbag 220 can be prevented in such a way that the airbag 220 can be manufactured with a reduced number of steps and at a lower cost.

In the fourth embodiment, moreover, the auxiliary inflation portion 236 causes the inflating gas G, when inflated, to flow out forward and rearward from the gas outlet ports 240 and 240 opened in the front and rear of the circumferential wall portion 239 to the airbag body 221. Therefore, the auxiliary inflation portion 236 plays the role of the flow regulating member for controlling the flow of the inflating gas G. By this flow of the inflating gas G, the airbag body 221 can be expanded widely in these two longitudinal directions while being prevented from protruding to the passenger (or to the driver). Even if the passenger is close to the airbag device M4 at the beginning of inflation so that there is narrow spacing between the passenger and the airbag device M4, therefore, the airbag body 221 can be easily expanded and arranged between the passenger and the airbag device M4. By the subsequent inflation of the airbag body 221, the cushioning effect can be enhanced to protect the passenger over the wide area of the airbag body 221.

In the fourth embodiment, therefore, the auxiliary inflation portion 236 of the airbag 220 can be used as the flow regulating member. In other words, it is possible to manufacture the airbag 220 without increase in the number of components of the airbag 220 while preventing the airbag body 221 from protruding to the passenger at the beginning of inflation.

Especially in the case of the fourth embodiment, the airbag 220 is constructed for the steering wheel. Moreover, the inflating gas G flowing from the auxiliary inflation portion 236 serving as the flow regulating member flows forward and rearward perpendicular to the axis of the steering shaft SS and forward and backward over the ring portion R of the steering wheel W. Therefore, the airbag body 221 has its rearward portion extended from the beginning of inflation over the rear portion Rb of the ring portion R of the steering wheel W, like the airbag 20 in the aforementioned airbag device M1. As a result, the airbag 220 of the fourth embodiment can attain effects similar to those of the airbag 20 in the airbag device M1 of the first embodiment.

In the fourth embodiment, on the other hand, the outer wall portion 239 joins the passenger side joint portion 242 and the vehicle front-facing joint portion 238 at the upper and lower ends to the passenger-facing wall portion 25 and the vehicle front-facing wall portion 22 before the completion of inflation of the airbag body 221, i.e., before the auxiliary inflation portion 236 is deflated. Therefore, the distance between the periphery of the gas inlet port 23 of the vehicle front-facing wall portion 22 and the portion 25a of the passenger-facing wall portion 25 directly opposite the gas inlet port can be kept within a small value in the airbag body 221. As a result, the airbag body 221 can prevent the passenger-facing wall portion 25 from unnecessarily protruding to the passenger from the beginning to a point midway in inflation regardless of the flow direction of the inflating gas G.

If the above points are not of concern, the auxiliary inflation portion 236 need not be joined to the passenger-facing wall portion 25. In this case, the the auxiliary inflation portion 236 may be deflated by tearing the periphery of the gas outlet ports 240, 240 as the internal pressure of the auxiliary inflation portion rises.

In the fourth embodiment, on the other hand, a plurality of (two in the embodiment) gas outlet ports 240 are aligned radially along the circumferential wall portion 239. Moreover, the easily torn portions 41 of the auxiliary inflation portion 236 in the form of slits are preformed between the gas outlet ports 240 and 240. Therefore, the auxiliary inflation portion 236 is properly broken at the easily torn portions 41. Moreover, the easily torn portions 41 connect the gas outlet ports 240 and 240 when torn so that the circumferential wall portion 239 of the auxiliary inflation portion 236 can be vertically separated efficiently and quickly. As a result, the airbag body 221 can complete its inflation promptly by admitting the inflating gas G smoothly and quickly.

The gas outlet ports 240 and 240 of the auxiliary inflation portion 236 are arranged in plurality so that the flow of the inflating gas G to be fed from the gas outlet ports 240 and 240 to the airbag body 221 can be set in the two longitudinal directions outward from the gas inlet port 23 and away from each other. It is quite natural that the airbag body 221 at the beginning of inflation can be more widely expanded.

Here in the fourth embodiment, the gas outlet ports 240 and 240 are arranged in the front of and at the rear of the circumferential wall portion 239. The same effects may be achieved by arranging the gas outlet ports 240 and 240 to the right and left of the circumferential wall portion 239 or by arranging three or more gas outlet ports aligned in the circumferential direction of the circumferential wall portion 239.

On the other hand, the portions 41 are broken through the tension applied to the circumferential wall portion 239. By using the heat of the inflating gas G, however, the material between the slits in the easily torn portions 41 may be partially molten to break the circumferential wall portion 239.

In the fourth embodiment, moreover, in the auxiliary inflation portion 236 of the airbag 220 the cylindrical circumferential wall portion 239 extending from the vehicle front-facing wall portion 22 at the periphery of the gas inlet port 23 of is joined to the passenger-facing wall portion 25 of the airbag body 221. Moreover, the portion 25a of the passenger-facing wall portion 25 in the airbag body 221 directly opposite the gas inlet port is used as the ceiling wall portion 244 of the auxiliary inflation portion 236 on the passenger side. Therefore, in the auxiliary inflation portion 236 of the fourth embodiment a member at the passenger-facing side of the circumferential wall of the auxiliary inflation portion 236 can be omitted, in contrast with the case in which there is separately provided a member for covering the portion of the circumferential wall portion 239 on the passenger side.

If the above points are not of concern, the ceiling wall portion 244 of the auxiliary inflation portion 236 maybe formed separately from the passenger-facing wall portion 25. In this case, the ceiling wall portion 244 and the passenger-facing wall portion 25 have to be separately connected by means of a connection member so that the easily torn portions 41 of the circumferential wall portion 239 may be ruptured, before the completion of inflation of the airbag body 221. Moreover, the expanded shape of the auxiliary inflation portion 236 may be formed into a sphere, the topmost area of which is joined directly to the passenger-facing wall portion 25 by sewing means or the like. In this case, too, the easily torn portions 41 are formed at portions apart from the passenger-facing wall portion 25, e.g., in one circumferential line around the gas inlet port 23 in the outer wall of the auxiliary inflation portion 236. In this way it is possible to prevent the gas leakage from the portion jointed to the passenger-facing wall portion 25.

In the auxiliary inflation portion 236 of the fourth embodiment, moreover, the circumferential wall portion 239 is formed so that its passenger side joint annular portion 244 is further from the axis of the gas inlet port 23 than the vehicle front-facing joint portion 238. Therefore, the auxiliary inflation portion 236 is a frustrum converging downward, wider on the side of the ceiling wall portion 244 (or on the passenger side) than on the side of the gas inlet port 23. Moreover, the ceiling wall portion 244 is the passenger-facing wall portion 25 of the airbag body 221 itself. Therefore, the auxiliary inflation portion 236 can protect the passenger interfering with the inflation of the airbag at the beginning ostage, directly in a wide area with enhanced cushioning effect.

With the auxiliary inflation portion 236 being bulged into a frustrum converging downward, on the other hand, the gas outlet ports 240 and 240 formed in the circumferential wall portion 239 discharge the inflating gas G to the airbag body 221 while being directed slightly downward toward the vehicle front-facing wall portion 22. Therefore, the airbag body 221 can be inflated while at the same time suppressing the protrusion toward the passenger.

In the fourth embodiment, moreover, there are arranged in the airbag 220 the tethers 243 and 243 for connecting the vehicle front-facing wall portion 22 and the passenger-facing wall portion 25. Like the aforementioned airbag device M1, therefore, the airbag body 221 can be prevented from unnecessarily protruding toward the passenger at the completion of inflation.

In the fourth embodiment, moreover, the tethers 243 and 243 are formed into integral units extended from the circumferential wall portion 239 of the auxiliary inflation portion 236. In other words, the tethers 243 need not to be separately attached to the airbag 220. Like the airbag 20 in the aforementioned airbag device M1, therefore, the airbag 220 having the tethers 243 and 243 can be manufactured with a reduced number of steps and at a lower cost.

In the fourth embodiment, on the other hand, the vehicle front-facing joint portion 238 and the leading ends of the tethers 243 and 243 are formed of the single inflation portion cloth member 237. By using only one inflation portion cloth member 237, therefore, it is possible to conveniently manufacture the airbag 220 which includes an auxiliary inflation portion 236 and which can regulate the shape of the airbag body 221 at the two stages, i.e., from the beginning to a point midway in inflation and from that point to the completion of inflation.

In the fourth embodiment, still moreover, the vehicle front-facing joint portion 238 is held down by the retainer 6 and so is joined to the vehicle front-facing wall portion 22. Like the airbag 20 in the aforementioned airbag device M1, therefore, it is possible to form the vehicle front-facing joint portion 238 of the circumferential wall portion 239 easily.

Here in the fourth embodiment, the capacity of the auxiliary inflation portion 236 of the airbag 220 can be altered by adjusting the length between the vehicle front-facing joint portion 238 and the passenger side joint portion 242. For a larger capacity, for example, the passenger side joint portion 242 may be brought closer to the outer circumferential edge of the disc-shaped flat plate portion 237*a*. At this time, the protrusion to the passenger can also be increased as the capacity of the auxiliary inflation portion 236 increases. If the entire disc portion of the flat plate portion 237*a* is enlarged as well as bringing the passenger side joint portion 242 closer to its outer circumferential edge, moreover, it is possible to enlarge the capacity of the auxiliary inflation portion 236 and the protrusion to the passenger all the more. When the capacity of the auxiliary inflation portion 236 and the protrusion to the passenger are to be reduced, on the contrary, the external diameter of the passenger side joint portion 242 may be reduced.

Here, the fourth embodiment has been described on the airbag device M4 for the steering wheel, but the invention may also be applied to an airbag device for a passenger's seat.

Next will be described an airbag device M5 capable achieving the fourth object of the invention.

Like the aforementioned airbag devices M1, M2 and M4, the airbag device M5 of the fifth embodiment is provided for the steering wheel and has a construction similar to that of the aforementioned airbag device M1 excepting an airbag 361. Therefore, common members are given the same reference numerals.

The airbag 361 is provided with an airbag body 362, a flow regulating cloth material 372 and a second flow regulating cloth 345. Here, the airbag body 362 has a construction similar to that of the airbag body 21 in the aforementioned airbag device M1. Therefore, common members are given the same reference numerals.

The flow regulating cloth material 372 is made, like the airbag body 362, of a woven fabric having flexibility such as polyamide or polyester. The flow regulating cloth material 372 is provided with a first flow regulating cloth 364 and two second regulating members 371 and 371. Moreover, a flow regulating cloth material 372 is formed into a band shape having uniform width. In the first flow regulating cloth 364, at the center of the flow regulating cloth material 372 and at two portions of the flow regulating cloth material 372 longitudinally spaced from the center, there are arranged passenger side joint portions 366 where the passenger side base cloth 29 of the passenger-facing wall portion 25 is sewn. These two passenger side joint portions 366 (366L and 366R) are arranged on either side of a later-described opening 364*a*. Moreover, the individual passenger side joint portions 366 are both linear at a right angle to the flow regulating cloth material 372.

On the other hand, the portions to the inside of the passenger side joint portions 366L and 366R in the first flow regulating portion 364 comprise the body 365 of the flow regulating cloth 364 which is the first regulating member 365. In the center of the body 365, there are formed the opening 364*a* and four mounting holes 364*b* around the opening 364*a*. This opening 364*a* is formed into a circular shape similar to the gas inlet port 23 through which the inflator body 8*a* can pass. Moreover, the entire periphery of the opening 364*a* comprises the vehicle front-facing joint portion 368 which is held down by the retainer 6 and so joined to the vehicle front-facing wall portion 22. Between the vehicle front-facing joint portion 368 and the individual passenger side joint portions 366L and 366R, on the other hand, there are arranged easily torn portions 369 and 369. These individual easily torn portions 369 are formed linearly by slits or perforations. Moreover, the individual easily torn portions 369 are arranged parallel to the passenger side joint portions 366. These easily torn portions 369 are torn when the internal pressure of the airbag body 362 reaches a predetermined level (10 to 20 KPa). When the portions 369 are torn, moreover, the passenger side joint portions 366 and the vehicle front-facing joint portion 368 in the body 365 are disconnected. Before the breakage of the individual portions 369 of the body 365, this body 365 regulates the distance from the gas inlet port 23 to the portion 25*a* of the passenger-facing wall portion 25 directly opposite the gas inlet port 23. Therefore, the body 365 constructs the first regulating member 365.

Figure 22:
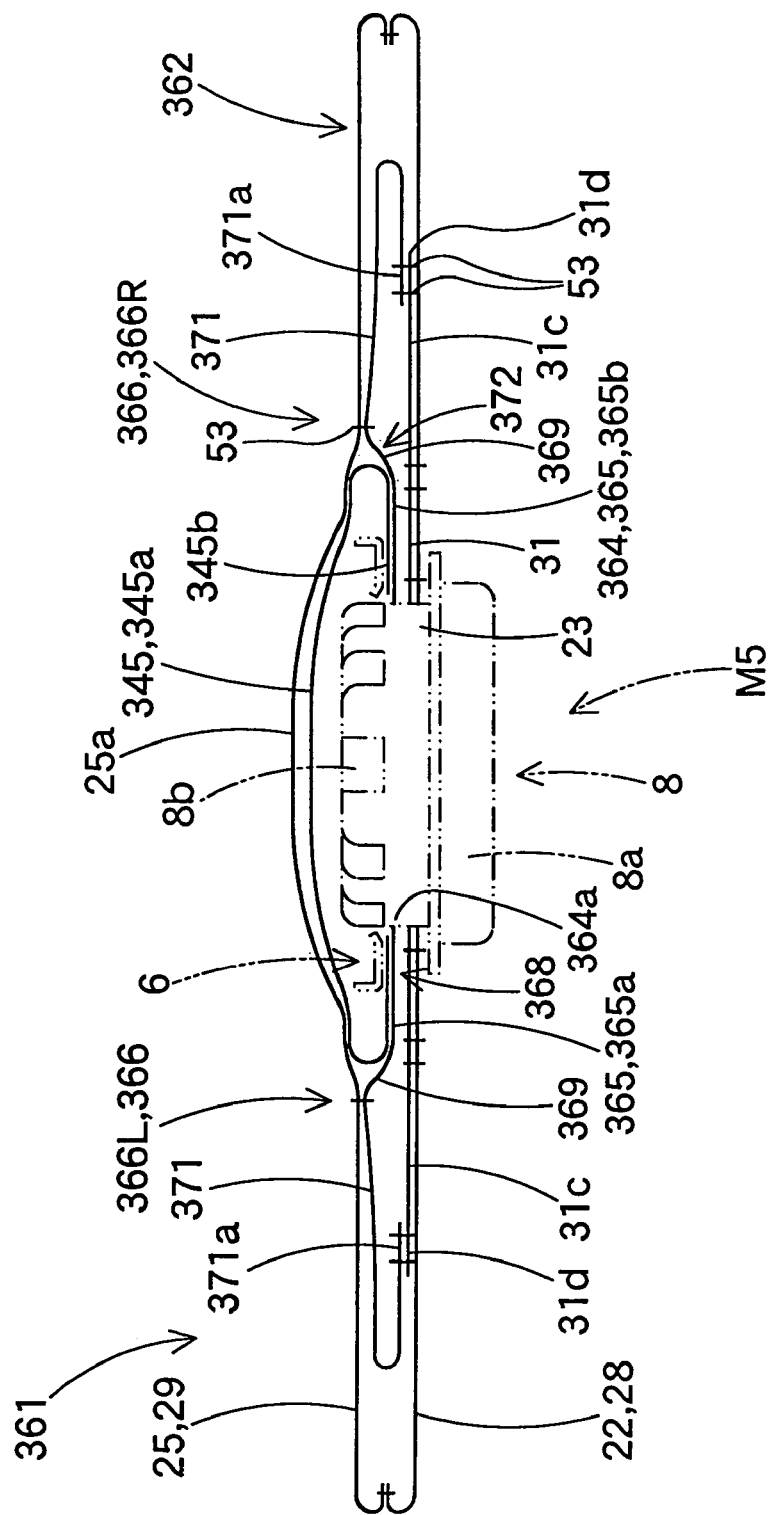
FIG. 22 is a schematic section of the expanded state in the airbag of the fifth embodiment.

The second regulating members 371 of the flow regulating cloth material 372 extend from the sewing location 53 to edge portions 371*a*. These second regulating members 371 and 371 are made longer in the longitudinal direction of the cloth material 372 than the first regulating member 365. Moreover, the individual second regulating members 371 are sewn at their edge portions 371*a* to the edge portions 31*d* of the edge portions 31*d* of the reinforcing cloth 31*c*, as shown in FIG. 22.

The second flow regulating cloth 345 is formed of a rectangular woven fabric having a flexibility such as polyamide or polyester. The second flow regulating cloth 345 is provided at its two right and left longitudinal ends with joint portions 345*b* to be jointed to the vehicle front-facing wall portion 22. In the joint portions 345*b*, there are formed (not-shown) mounting holes through which are passed the bolts of the retainer 6. Moreover, the is joined to the periphery of the gas inlet port 23 of the vehicle front-facing wall portion 22 by folding down the joint portions 345*b* at the right and left sides of the second flow regulating cloth 345 and by arranging the retainer 6 on the upper faces of the folded sides, as shown in FIG. 22. At this time, the joint portions 345*b* are joined to the vehicle front-facing wall portion 22 with the periphery of the opening 364*a* of the first flow regulating cloth 364 interposed.

Moreover, the body 345*a* between the right and left joint portions 345*b* and 345*b* of the second flow regulating cloth 345 covers over the gas inlet port 23 and the opening 364*a*. The body portion 345*a* is in a band shape with the two right and left ends joined to the vehicle front-facing wall portion 22. Therefore, the body 345*a* causes the inflating gas from the inflator 8 to flow to the two longitudinal sides.

The airbag 361 of the fifth embodiment can be manufactured like the airbag 20 in the airbag device M1 of the first embodiment. Moreover, the airbag 361 can be folded and mounted on the vehicle like the airbag 20 in the airbag device M1.

When the inflating gas is discharged from the gas discharge ports 8*b* of the inflator body 8*a*, moreover, the airbag device M5 of the fifth embodiment acts in the following manner from the beginning to a point midway in inflation of the airbag 361.

Figure 23:
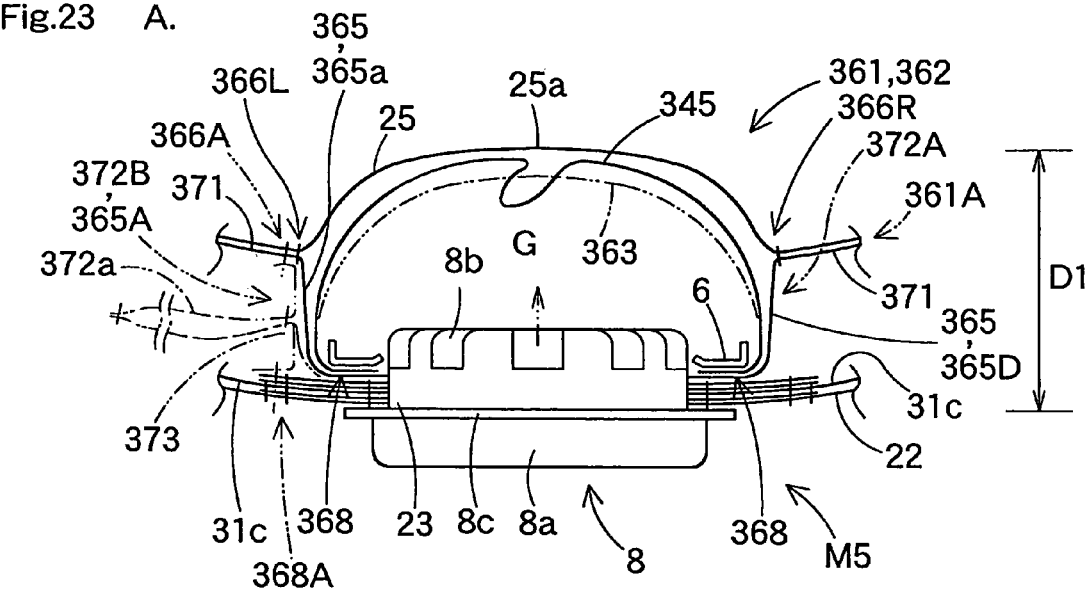
FIGS. 23A and 23B are schematic partial sections for explaining the inflating procedure of the airbag in the airbag device of the fifth embodiment.
Figure 23:
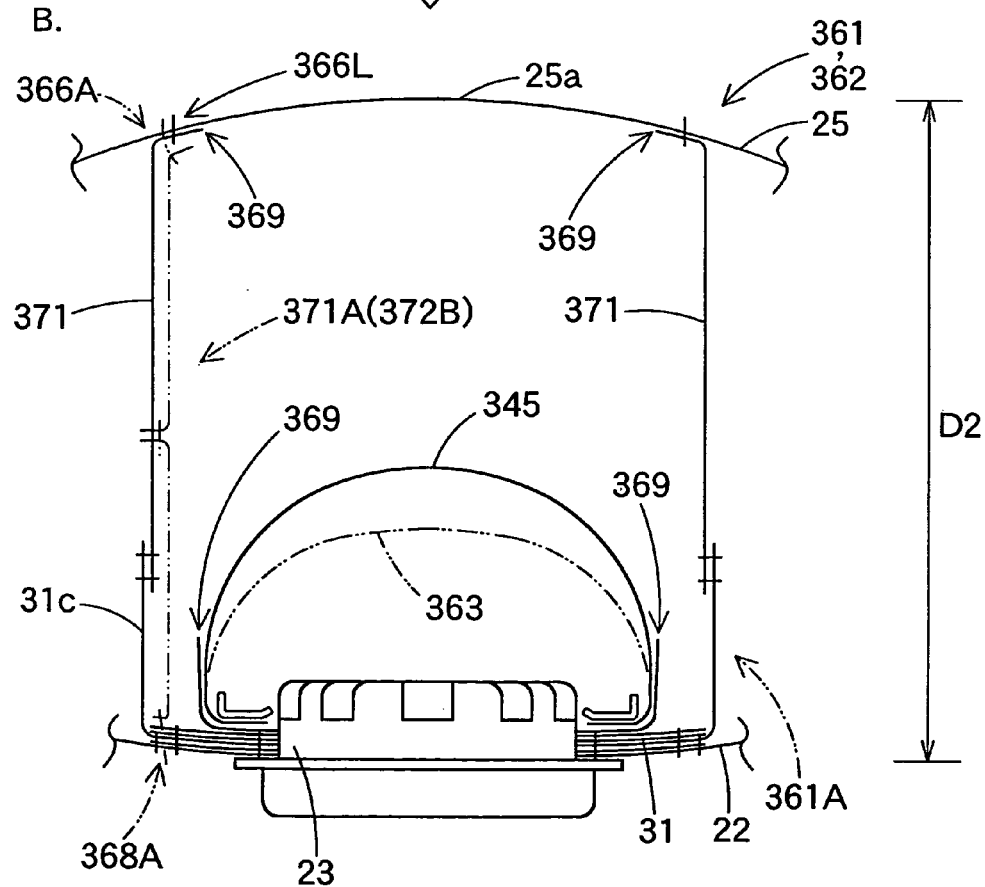

First of all, a portion 365*a* located between the left of the vehicle front-facing joint portion 368 and the passenger side joint portion 366L in the body 365 of the first flow regulating cloth 364 and a portion 365*b* located between the right of the vehicle front-facing joint portion 368 and the passenger side joint portion 366R in the body 365 extend in the vertical direction. Moreover, the first regulating member 365 is such constructed by these portions 365*a* and 365*a* to regulate the spacing distance D1 from the gas inlet port 23 to the portion 25*a* of the passenger-facing wall portion 25 directly opposite the gas inlet port, as shown in FIG. 23A. Therefore, an unnecessary protrusion to the passenger (or the driver) can be suppressed. On the other hand, the inflating gas G is so guided by the portions 365*a* and 365*b* of the body 365 to flow into the airbag body 362 in the width directions of the flow regulating material 372 toward the two longitudinal ends of the vehicle. Therefore, the two longitudinal sides of the airbag body 362 are expanded widely while the airbag is prevented from protruding to the driver.

When the internal pressure of the airbag body 362 reaches a predetermined level, moreover, the portions 369 and 369 are torn so that the passenger-facing wall portion 25 and vehicle front-facing wall portion 22 in the vicinity of the gas inlet port 23 are disconnected. Further, the body 345*a* of the second flow regulating cloth 345 is expanded.

After this, the inflating gas G flowing into the airbag body 362 is so regulated by the body 345*a* of the second flow regulating cloth 345 as to flow into the airbag body 362 toward the airbag's two longitudinal sides. Then, the airbag 361 completes its inflation while elongating the second regulating members 371 and 371, as shown in FIG. 23B. At this time, the airbag 361 completes its inflation such that the spacing distance from the gas inlet port 23 to the portion 25*a* of the passenger-facing wall portion 25 directly opposite the gas inlet port is limited to D2 by the second regulating members 371 and 371. In short, the airbag 361 completes its inflation by expanding its width as much as possible while suppressing the protrusion to the driver. Even if the driver interferes with the passenger-facing wall portion 25 just before the completion of inflation of the airbag 361, therefore, the interference with the driver is made with the passenger-facing wall portion 25 being widely expanded, so that the airbag 361 can protect the driver without any of its pushing force applied to the passenger.

Therefore, the airbag device M5 of the fifth embodiment can protect the passenger properly with the airbag 361 while suppressing unnecessary protrusion to the passenger from the beginning to a point midway in inflation.

In the fifth embodiment as well, the two flow regulating cloths 364 and 345 of the airbag 361 regulate the inflating gas G to the two longitudinal sides perpendicular to the axis of the steering shaft. As a result, the flow regulating cloths 364 and 345 regulate, when mounted on the vehicle, the flow of the inflating gas G in the two longitudinal directions of the vehicle along the plane of the ring portion of the steering wheel. Therefore, the airbag 361 is inflated, like the airbag 20 in the foregoing first embodiment, to extend to the two longitudinal directions of the plane of the ring portion. Moreover, the airbag 361 of the fifth embodiment can also perform actions similar to those of the airbag 20 in the foregoing first embodiment.

In the airbag 361 of the fifth embodiment, on the other hand, the regulation of the spacing distance D1 in the first regulating member 365 is released by tearing the easily torn portions 369 of the first regulating member 365. Like the airbag 20 of the foregoing first embodiment, therefore, there is no needless gas leakage from the airbag 361 which has completed its inflation.

In the fifth embodiment, the flow regulating cloth of the airbag 361 is provided with the first flow regulating cloth 364 for regulating the flow of the inflating gas G from the beginning to a point midway in inflation, and the second flow regulating cloth 345 for regulating the flow of the inflating gas G until the completion of inflation. Moreover, the first flow regulating cloth 364 is the first regulating member 365.

For the flow regulation of the inflating gas G, therefore, it is possible to use the first flow regulating cloth 364 from the beginning to a point midway in inflation of the airbag 361 and to use the second flow regulating cloth 345 till the subsequent completion of inflation of the airbag 361. In this airbag device M5, more specifically, the flow rate of the inflating gas G can be adjusted to correspond to the depth of the airbag 361 (i.e., the spacing distances D1 and D2 from the gas inlet port 23 to the portion 25*a* of the passenger-facing wall portion 25 directly opposite to the gas inlet port).

It is also possible to properly retain the width of the expanded airbag 361 according to the time elapsed since start of inflation. This is because, when the flow of the inflating gas G in the airbag device M5 is being regulated by the body 365 of the first flow regulating cloth 364, the inflating gas G can be accelerated to flow to the two longitudinal sides of the airbag to expand them quickly. This is also because, flow flow is being regulated by the second flow regulating cloth 345, the completion of inflation of the airbag body 362 as a whole can be promoted by increasing the rate of feeding the inflating gas G to the two longitudinal sides.

In the fifth embodiment, moreover, the first flow regulating cloth 364 plays the role of the first regulating member 365. Thus, even if the flow regulating cloth comprises a first flow regulating cloth 364 and a second flow regulating cloth 345, therefore, it is still possible to minimize the increase in the number of components of the airbag 361.

Here in the fifth embodiment, the second flow regulating cloth 345 is constructed to guide the flow of the inflating gas to the two longitudinal sides. If desired, of course, the second flow regulating cloth 345 may naturally be constructed to feed the inflating gas G in a direction different from the flow direction of the first flow regulating cloth 364, such as to the two transverse sides or backward. In this modification, at the beginning of inflation of the airbag, the second flow regulating cloth may be holed or have arch portions for passing the inflating gas while keeping its flow regulating function, so that it may not obstruct the flow regulated by the first flow regulating cloth.

In the fifth embodiment, moreover, the single flow regulating cloth material 372 comprises the first flow regulating cloth 364 and the second flow regulating member 371. As compared with the case in which the first and second regulating members are separately arranged, therefore, it is possible to make the number of components smaller. Moreover, the joints of the first and second regulating members 365 and 371 to the passenger-facing wall portion 25 are both provided by the joint portions 366. Therefore, it is possible to simplify the joining of the first and second regulating members 365 and 371 to the passenger-facing wall portion 25. Even if the flow regulating cloth comprises first and second flow regulating cloths 364 and 345, therefore, it is possible to minimize the increase in the number of steps of and the rise in the cost for manufacturing the airbag 361.

Here in the fifth embodiment, the edge portions 31c of the reinforcing cloth 31 sewn to the vehicle front-facing wall portion 22, are sewn to the edge portions 371a of the second regulating members 371 extended toward the vehicle front-facing wall portion 22, so that the second regulating members 371 are jointed to the side of the vehicle front-facing wall portion 22. Like the use of tethers 45 in the airbag 20 of the afore mentioned first embodiment, therefore, it is easy to join the second regulating member 371 to the vehicle front-facing wall portion 22.

If the above points are not of concern, a plurality of second regulating members may be made separately from the first regulating member 365 and the reinforcing cloth 31, and the lower and upper edges joined respectively to the vehicle front-facing wall portion 22 and the passenger-facing wall portion 25. In this case, further, the edges of the second regulating members maybe integrated at the vehicle front-facing wall portion 22 and the passenger-facing wall portion 25 for joint use.

In the fifth embodiment, on the other hand, the flow regulating cloth 364 is held to the vehicle front-facing wall portion 22 by the retainer 6 to form joint portion 368. Like the airbag 20 of the foregoing first embodiment, therefore, it is possible to form the vehicle front-facing joint portion 368 of the first flow regulating cloth 364 easily. In the case of the fifth embodiment, on the other hand, the second flow regulating cloth 345 is also jointed to the vehicle front-facing wall portion 22 by the retainer 6. Therefore, the second flow regulating cloth 345 can be easily arranged in the airbag 361.

Here in the fifth embodiment, it is also feasible to arrange a flow regulating cloth 363 (as referred to double-dotted lines in FIGS. 23A and 23B) which is shorter to the right and left of the passenger than the second flow regulating cloth 345. In this case, at the time of regulating the spacing distance of the first regulating member 365, not the body 365 but the expanded flow regulating cloth 363 regulates the flow of the inflating gas.

Specifically, the airbag 361A having the flow regulating cloth 365 comprises the single flow regulating cloth 363 and the two pairs of first and second regulating members 365a, 365b, 371 and 371 in the airbag 361A. The airbag 361 thus constructed cannot regulate the flow of the inflating gas in two stages, differently at the beginning of inflation and before the completion of inflation, but can attain actions and effects similar to those of the airbag 361. In this airbag 361A, moreover, the first and second regulating members 365 and 371 are made of a continuous regulating member 372A having flexibility. In this airbag 361A, therefore, it is also possible to use the joints of the regulating member 372A to the vehicle front-facing wall portion 22 and the passenger-facing wall portion 25 to join two members. As compared with the case in which the first and second regulating members are separately arranged, therefore, it is possible to reduce the number of components. Moreover, the works of joining the first and second regulating members 365 and 371 can be simplified to reduce the number of steps of and lower the cost for manufacturing the airbag 361A.

Here, the first and second regulating members may be constructed into a regulating cloth material 372B, as indicated by double-dotted lines in FIG. 23A, when they are made of a continuous regulating member having flexibility. This regulating cloth material 372B is provided with a tuck 372a with easily broken sewing thread 373 at a portion between a vehicle front-facing joint portion 368A and a passenger side joint portion 366A at the lower and upper ends respectively when it is vertically elongated. Moreover, the regulating cloth material 372B is the first regulating member 365A before the sewing thread 373 is broken. By the breakage of the first regulating member 365A with the breakage of the sewing thread 373, the cloth material 372B is elongated and becomes the second regulating member 371A.

Here, the fifth embodiment has been described on the airbag device M5 for the steering wheel, but the invention may also be applied to an airbag device for a passenger's seat.

An airbag device M6 of a sixth embodiment is provided for the steering wheel and has a construction similar to that of the foregoing airbag device M1 except for the airbag 420. Therefore, common members are given the same reference numerals.

Figure 24:
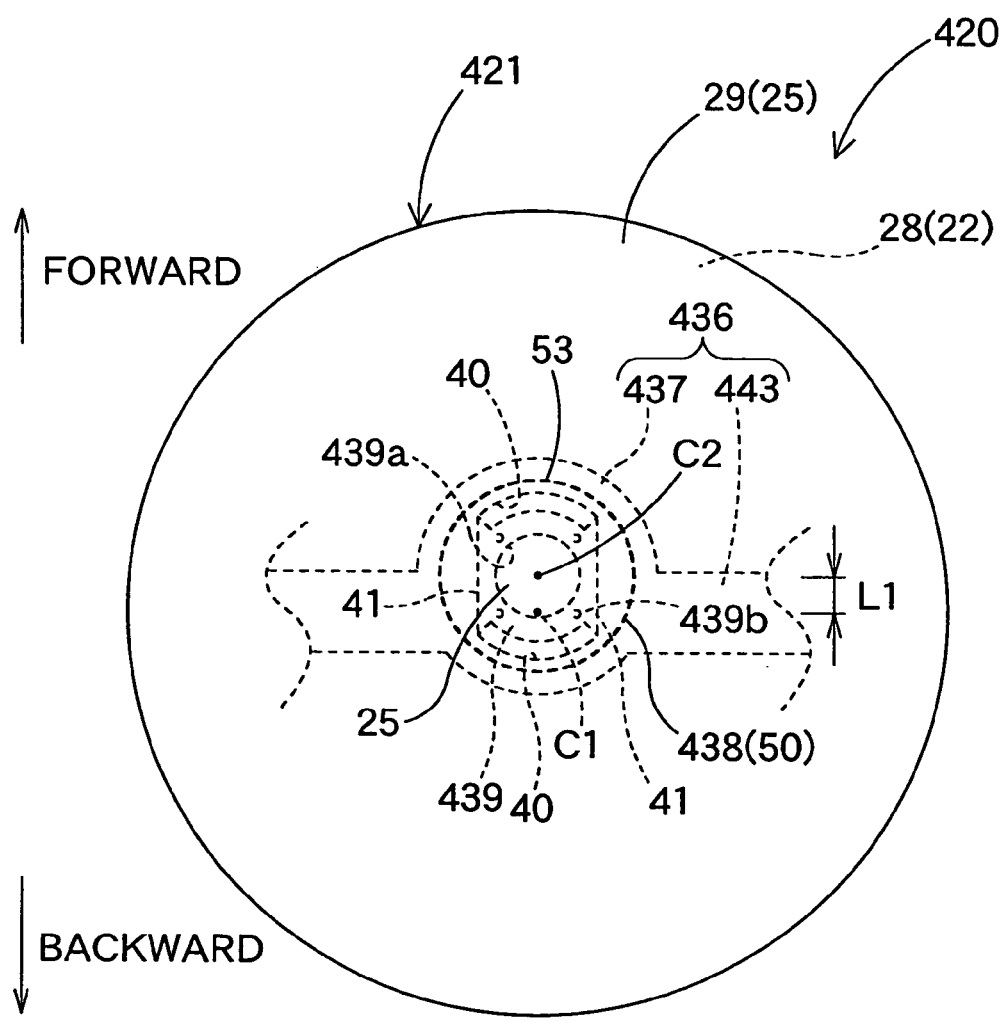
FIG. 24 is a top plan view of the expanded state of an airbag in an airbag device of a sixth embodiment.

The airbag 420 is provided, as shown in FIG. 24, with an airbag body 421 and a connecting member 436. Here, the airbag body 421 has a construction similar to that of the airbag body 21 of the airbag 20 in the aforementioned airbag device M1. Therefore, the description will be omitted by designating the common members by the common reference numerals.

Like the airbag body 421, the connecting member 436 is made of a woven fabric having flexibility such as polyamide or polyester. The connecting member 436 is provided, as shown in FIG. 24, with a generally circular connecting portion main body 437, and two band-shaped tether portions (or tethers) 443 and 443 extending from the circumferential edge of the connecting portion main body 437. The connecting portion main body 437 is joined to the passenger-facing wall portion 25 (or the passenger side base cloth 29) and to the vehicle front-facing wall portion 22 at the periphery of the gas inlet port 23 in. In other words, the connecting portion main body 437 connects the passenger-facing wall portion 25 and the periphery of the gas inlet port 23. When the internal pressure of the airbag body 421 reaches a predetermined level, moreover, the connecting portion main body 437 separates from the passenger-facing wall portion 25 and from the periphery of the gas inlet port 23.

Specifically, the connecting portion main body 437 is joined to the passenger-facing wall portion 25 by sewing it to the passenger side base cloth 29 at an annular joint portion 438 (or the sewing location 50) arranged near the outer circumferential edge of the connecting portion main body 437. This joint portion 438 is so arranged that the center of its annular shape C2 is offset by L1 to the front of the vehicle from the center of the passenger side base cloth 29 (i.e., the axis of the center Cl of the gas inlet port 23 in the body side base cloth 28), as shown in FIG. 24, when it is expanded flat and the body side base cloth 28 and the passenger side base cloth 29 are superposed. In the inner portion of the joint portion 438 in the connecting portion main body 437, moreover, there is arranged a joint portion 439 joining with the periphery of the gas inlet port 23. Like the airbag 20 in the aforementioned airbag device M1, the joint portion 439 is joined to the circumferential edge of the gas inlet port 23 by using the retainer 6. The joint portion 439 is provided with a circular opening 439a through which the inflator body 8a can pass, and mounting holes 439b formed in the periphery of the opening 439a for through which the bolts 6a of the retainer 6 can pass.

The opening 439a in the joint portion 439 is aligned at its center with the center C2 of the joint portion 438 joining the connecting portion main body 437 and the passenger side base cloth 29. When the airbag 420 is mounted and fixed on the (not-shown) bag holder together with the retainer 6 to join the joint portion 439 to the vicinity of the gas inlet port 23, moreover, the center of the joint portion 439 (or the center of the opening 439a) is aligned with the center Cl of the gas inlet port 23. In the airbag 420 of the sixth embodiment, more specifically, when the airbag 420 is mounted and fixed on the bag holder together with the retainer 6, the length of the film in vertical cross section centering the gas inlet port 23 in the airbag body 421, is longer in its rear side portion 456 by L1 than in its front side portion 455 (FIG. 25 and FIG. 26A) This is because, in the airbag 420, the center C2 in the joint portion 438 between the connecting portion main body 437 and the passenger side base cloth 29 is offset forward by L1 from the center C1 in the joint portion 439 between the connecting portion main body 437 and the periphery of the gas inlet port 23 (or the opening center of the gas inlet port 23).

In the connecting portion main body 437, on the other hand, the gas outlet ports 40 for allowing the inflating gas discharged from the inflator 8 to flow out into the airbag body 421, and the easily torn portions 41 are arranged between the joint portions 438 and 439. These gas outlet ports 40 and easily torn portions 41 have constructions similar to those of the gas outlet ports 40 and the easily torn portions 41 in the airbag 20 in the aforementioned airbag device M1. Therefore, common members are given the same reference numerals. In short, the connecting portion body 437 acts as the flow regulating member, too. When the easily torn portions 41 are torn, moreover, the joint portion 438 and the joint portion 439 in the connecting portion body 437 are separated so that the passenger side base cloth 29 (or the passenger-facing wall portion 25) and the periphery of the gas inlet port 23 are disconnected.

The tether portions 443 and 443 are formed in a band shape and extended to protrude laterally from the circumferential edge of the connecting portion main body 437. The tether portions 443 regulate, at the time of inflation of the airbag 420, the spacing distance of the passenger-facing wall portion 25 from the gas inlet port 23 and so regulate the inflated shape of the airbag body 421. Moreover, the tether portions 443 are so offset (FIG. 24) rearward from the center of the connecting portion main body 437 that their center line extending left to right extends through the center C1 of the gas inlet port 23 when the airbag 420 is expanded flat.

The airbag 420 of the sixth embodiment can be manufactured like the airbag 20 in the airbag device M1 of the first embodiment. Moreover, the airbag 420 is folded longitudinally and laterally with the retainer 6 arranged between the passenger side base cloth 29 and the connecting portion body 437.

Figure 25:
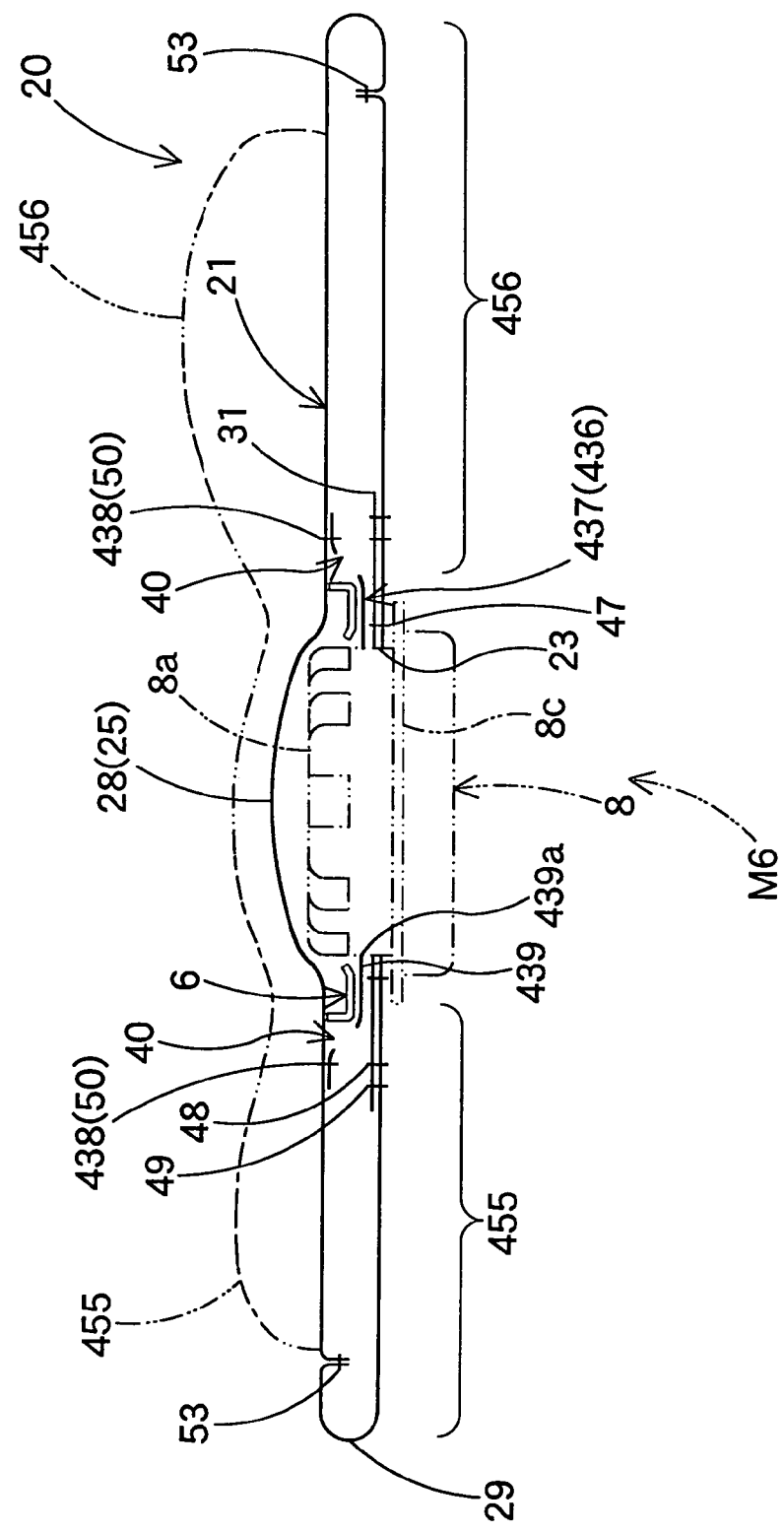
FIG. 25 is a schematic section showing the state, in which a retainer is inserted into the airbag of the sixth embodiment, and taken longitudinally of the vehicle.
Figure 26:
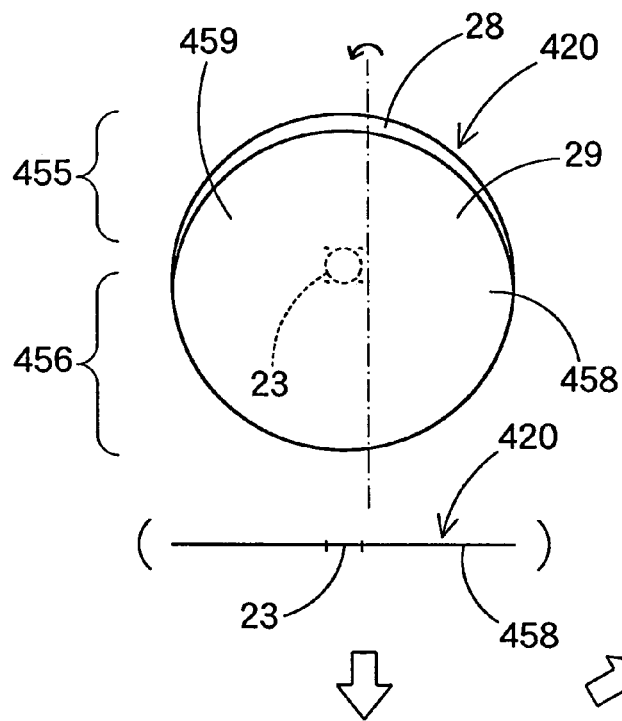
FIGS. 26A to 26D are schematic views showing the steps of folding the airbag of the sixth embodiment.
Figure 26:
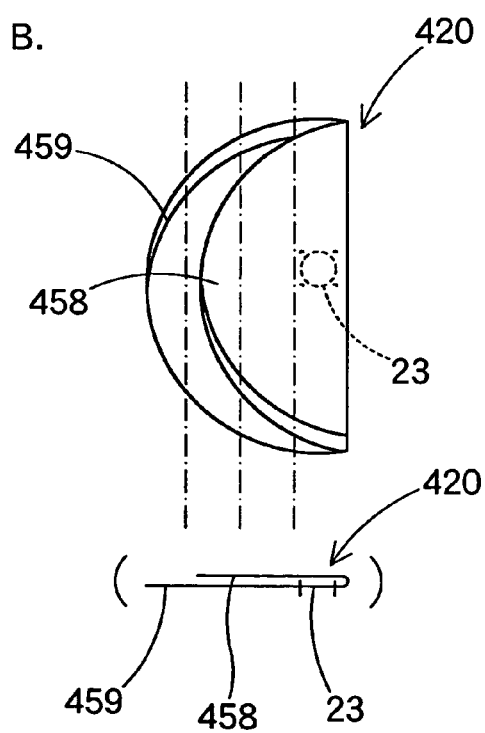
Figure 26:
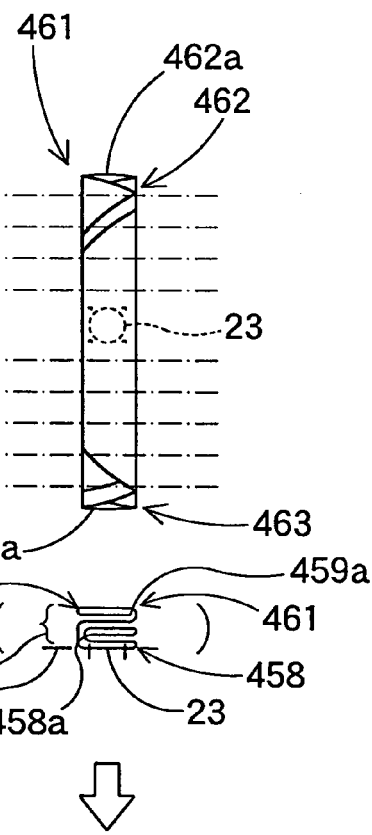
Figure 26:
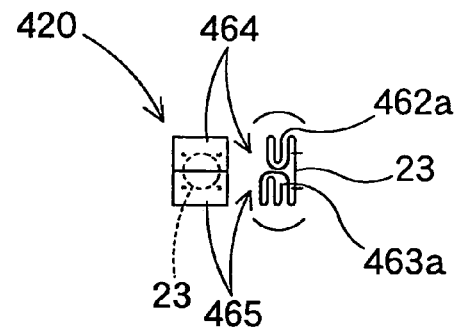

Specifically, with the retainer 6 arranged inside the airbag, as shown in FIG. 26A, the airbag 420 is expanded flat so that the passenger side base cloth 29 is superposed over the body side base cloth 28. At this time, the passenger side base cloth 29 and the body side base cloth 28 are arranged with a longitudinal displacement. Then, the airbag body 421 is laid flat (FIGS. 25 and 26A) so that the length of the film of the rear side portion 456 is longer than that of the front side portion 455. This is because the joint portion 438 between the connecting portion body 437 and the passenger side base cloth 29 has its center C2 offset forward in the airbag body 421 (FIG. 24).

After this, as shown in FIGS. 26B and 26C, the right side portion 458 of the airbag 420 is so folded at first with longitudinal creases that it lies on the passenger side base cloth 29. Next, the left side portion 459 of the airbag 420 is so folded with longitudinal creases that it lies on the right side portion 458. Specifically, the right side portion 458 and the left side portion 459 are folded on each other over the gas inlet port 23 progressively superposing in a direction normal to the opening plane L of the gas inlet port 23, thereby to arrange one folded portion 460. At this time, the right-most edge portion 458a and the left-most edge portion 459a of the right side portion 458 and the left side portion 459 respectively are folded back toward the gas inlet port 23 so that they are not exposed to the upper side, that is, the passenger side.

Thereafter, the front side portion 462 and the rear side portion 463 of a longitudinally folded airbag 461 are folded (as referred to FIGS. 26C and 26D) with lateral creases so that the edges approach the gas inlet port 23. In the case of the sixth embodiment, the front side portion 462 and the rear side portion 463 are s folded in bellows form so that their end portions 462a and 463a are on either side of the gas inlet port 23. In other words, the front side portion 462 and the rear side portion 463 are so folded as to form two folded portions 464 and 465 next to each other and lined up in the longitudinal direction, as shown in FIG. 26D.

Moreover, the airbag 420 thus folded can be mounted on the vehicle like the airbag 20 in the airbag device M1.

In the airbag device M6 of the sixth embodiment, the airbag body 421 is formed by sewing the circumferential edges of the body side base cloth 28 and the passenger side base cloth 29, which are given generally identical contours. With the body side base cloth 28 and the passenger side base cloth 29 laid flat over each other, moreover, the joint portion 438 joining the connecting member 436 and the passenger-facing wall portion 25 (or the passenger side base cloth 29) is arranged such that the its center C2 is offset by L1 from the center C1 of the joint portion 439 joining the connecting member 436 and the vicinity of the circumferential edge of the gas inlet port 23 (FIG. 24).

Therefore, the vertical cross section through the gas inlet port 23 in the airbag body 421 has the following film length. The length of the film of the vehicle front-facing (forward) portion 455 of the airbag body 421 in the offset direction of the center C2 of the joint portion 438 joining the connecting member 436 and the passenger side base cloth 29 is shorter by the offset L1 than that of the vehicle rear-facing (rearward) portion 456 opposite to the offset direction. In other words, the length of the film of the rearward portion 456 of the airbag body 421 opposite the offset direction of the center C2 of the joint portion 438 joining the connecting member 436 and the passenger side base cloth 29 can be elongated by the offset L1 (FIG. 25).

In the airbag device M6 of the sixth embodiment, moreover, the airbag body 421 begins to inflate at first with the passenger side base cloth 29 and the vicinity of the gas inlet port 23 being connected by the connecting member 436. At the beginning of inflation of the airbag 420, therefore, the airbag 420 can be inflated, as indicated by double-dotted lines in FIG. 25, to enlarge the depth of the rearward portion 456 of the airbag body 421 which is then enlarged in the film depth in the area opposite the offset direction of the center C2 of the joint portion 438 joining the connecting member 436 and the passenger side base cloth 29. In the airbag device M6 of the sixth embodiment, in other words, the center C2 of the joint portion 438 joining the connecting member 436 and the passenger side base cloth 29 is offset in the opposite direction from center of the portion of the airbag body 421 which is desired to be promptly expanded (in this case the rear side portion 456). Therefore, the airbag 420 can be so promptly inflated at the beginning as to retain the cushioning effect by expanding the rearward portion 456 quickly.

In the airbag device M6 of the sixth embodiment, on the other hand, the connecting member 436 connects the passenger side base cloth 29 and the periphery of the gas inlet port 23 of the airbag body 421. At the beginning of inflation of the airbag 420, therefore, the airbag body 421 is prevented from protruding toward the driver. At the beginning of inflation of the airbag 420, more specifically, the inflating gas flows toward the portion around the gas inlet port 23 of the airbag body 421 to promote the inflation of the portion around the gas inlet port 23 of the airbag body 421. When the inflating gas further flows into the airbag body 421 so that the internal pressure of the airbag body 421 reaches a predetermined level, moreover, the portions 41 and 41 in the connecting portion body 437 are broken. Then, the passenger side base cloth 29 and the vicinity of the gas inlet port 23 are disconnected so that the airbag body 421 can complete its inflation.

In the airbag device M6 of the sixth embodiment, therefore, the predetermined portion around the gas inlet port 23 of the airbag 420 at the beginning of inflation can be quickly inflated deeply to protect the driver properly.

In the airbag device M6 of the sixth embodiment, moreover, the offset direction of the center C2 of the joint portion 438 joining the connecting member 436 and the passenger side base cloth 29 is shifted forward. At the beginning of inflation, therefore, the airbag 420 can be inflated to first enlarge the depth of the rearward portion 456 in the airbag body 421. In other words, the rearward portion 456 is quickly inflated so that the depth there is increased quickly while the airbag is prevented from protruding toward the driver. As a result, the airbag 420 can be quickly inflated between the ring portion of the steering wheel and the abdomen of the driver, with sufficient depth to protect the abdomen properly at the beginning of inflation of the airbag 420.

In the airbag device M6 of the sixth embodiment, moreover, the gas outlet ports 40 and 40 are so arranged that the connecting portion main body 437 of the connecting member 436 may act as the flow regulating member. Therefore, the connecting portion main body 437 performs actions similar to those of the flow regulating cloth body 37 in the airbag device M1 of the first embodiment. In the airbag device M6 of the sixth embodiment, on the other hand, the tethers 443 and 443 are integrated with the connecting member 436 so that no separate tether need be added, and it is possible to reduce the number of steps of and lower the cost for manufacturing the airbag 420.

In the airbag device M6 such that the edge portions 458a and 459a of the right side portion 458 and the left side portion 459 are folded back to the gas inlet port 23. When the right side portion 458 and the left side portion 459 are unfolded at the time of expanding and inflating the airbag 420, their right-most edge portion 458a and left-most edge portion 459a are difficult to open toward the driver so that the airbag 420 can be widely expanded while being prevented from protruding to the driver.

What is claimed is:

1. An airbag device comprising an airbag inflated by admitting an inflating gas and including an outer wall at the completion of inflation and an auxiliary inflation portion arranged within said airbag body, wherein said airbag body includes a gas inlet port through which inflating gas can enter, wherein said auxiliary inflation portion communicates with said gas inlet port and inflates to protect a passenger before the completion of inflation of said airbag body, wherein said auxiliary inflation portion includes gas outlet ports for allowing the inflating gas flowing at the time of inflation to flow out to said airbag body and is constructed to end its inflated state by breaking at a portion removed from the outer wall of said airbag body before the completion of inflation of said airbag body, wherein said auxillary inflation portion can inflate to retain the cushioning action to protect the passenger by raising an internal pressure therein, before the completion of inflation of the airbag body, wherein the outer wall of said airbag body includes a vehicle front-facing wall portion having said gas inlet port, and a passenger-facing wall portion directly opposite said gas inlet port, wherein the auxiliary inflation portion of said airbag is joined to said passenger-facing wall portion and can regulate the spacing distance of said passenger-facing wall portion from said gas inlet port so as to prevent the protrusion of said airbag body toward the passenger at the beginning of inflation, and wherein the regulation of said spacing distance is ended by the breakage of said auxiliary inflation portion, thereby allowing completion of the inflation of said airbag body.

2. An airbag device according to claim 1,
wherein the auxiliary inflation portion of said airbag is such a flow regulating member as can control the outflow direction of the inflating gas from said gas outlet ports into said airbag body so as to prevent said airbag body from protruding toward the passenger at the beginning of inflation.

3. An airbag device according to claim 1,
wherein the auxiliary inflation portion of said airbag is formed into such a cylindrical shape with a circumferential wall portion in which are arranged said gas outlet ports, the circumferential wall portion extending from the periphery of the gas inlet port of said vehicle front-facing wall portion to the portion of the passenger-facing wall portion directly facing said gas inlet port,
wherein the edge of said circumferential wall portion torward the passenger-facing wall portion is joined to said passenger-facing wall portion, and
wherein said portion of said passenger-facing wall portion directly opposite the gas inlet port is the ceiling wall portion of said auxiliary inflation portion.

4. An airbag device according to claim 3,
wherein said circumferential wall portion is formed so that the annular line of the joint portion joining the passenger-facing wall portion is further from the axis of the gas inlet port than the axis of the joint portion joining said vehicle front-facing wall portion.

5. An airbag device according to claim 1,
wherein said airbag includes tethers for regulating the distance of said passenger-facing wall portion from said gas inlet port at the completion of inflation of said airbag body.

6. An airbag device comprising an airbag inflated by admitting an inflating gas and including an outer wall at the completion of inflation and an auxiliary inflation portion arranged within said airbag body,
wherein said airbag body includes a gas inlet port through which inflating gas can enter,
wherein said auxiliary inflation portion communicates with said gas inlet port and inflates to protect a passenger before the completion of inflation of said airbag body,
wherein said auxiliary inflation portion includes gas outlet ports for allowing the inflating gas flowing at the time of inflation to flow out to said airbag body and is constructed to end its inflated state by breaking at a portion removed from the outer wall of said airbag body before the completion of inflation of said airbag body,
wherein the outer wall of said airbag body includes a vehicle front-facing wall portion having said gas inlet port, and a passenger-facing wall portion directly opposite said gas inlet port,
wherein the auxiliary inflation portion of said airbag is joined to said passenger-facing wall portion and can regulate the spacing distance of said passenger-facing wall portion from said gas inlet port so as to prevent the protrusion of said airbag body toward the passenger at the beginning of inflation,
wherein the regulation of said spacing distance is ended by the breakage of said auxiliary inflation portion, thereby allowing completion of the inflation of said airbag body,
wherein the auxiliary inflation portion of said airbag is formed into such a cylindrical shape with a circumferential wall portion in which are arranged said gas outlet ports, the circumferential wall portion extending from the periphery of the gas inlet port of said vehicle front-facing wall portion to the portion of the passenger-facing wall portion directly facing said gas inlet port,
wherein the edge of said circumferential wall portion toward the passenger-facing wall portion is joined to said passenger-facing wall portion, and
wherein said portion of said passenger-facing wall portion directly opposite the gas inlet port is the ceiling wall portion of said auxiliary inflation portion.

7. An airbag device according to claim 6,
wherein the auxiliary inflation portion of said airbag is such a flow regulating member as can control the outflow direction of the inflating gas from said gas outlet ports into said airbag body so as to prevent said airbag body from protruding toward the passenger at the beginning of inflation.

8. An airbag device according to claim 6,
wherein said circumferential wall portion is formed so that the annular line of the joint portion joining the passenger-facing wall portion is further from the axis of the gas inlet port that the axis of the joint portion joining said vehicle front-facing wall portion.

9. An airbag device according to claim 6,
wherein said airbag includes tethers for regulating the distance of said passenger-facing wall portion from said gas inlet port at the completion of inflation of said airbag body.

* * * * *